US008672566B2

(12) United States Patent
Iwao et al.

(10) Patent No.: US 8,672,566 B2
(45) Date of Patent: Mar. 18, 2014

(54) NODE APPARATUS AND COMMUNICATION METHOD

(75) Inventors: Tadashige Iwao, Kawasaki (JP); Yuji Takahashi, Kawasaki (JP); Syunsuke Koga, Fukuoka (JP); Yuri Noguchi, Kawasaki (JP); Masato Miyake, Fukuoka (JP); Tatsuya Toyozumi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 108 days.

(21) Appl. No.: 13/288,462

(22) Filed: Nov. 3, 2011

(65) Prior Publication Data
US 2012/0051252 A1  Mar. 1, 2012

Related U.S. Application Data

(63) Continuation of application No. PCT/JP2009/002055, filed on May 11, 2009.

(51) Int. Cl.
*H04L 12/28* (2006.01)

(52) U.S. Cl.
USPC ............ 400/401; 370/400; 370/252; 370/392

(58) Field of Classification Search
None
See application file for complete search history.

(56) References Cited

U.S. PATENT DOCUMENTS

| 7,787,480 B1* | 8/2010 | Mehta et al. ................ 370/401 |
| 7,872,992 B2* | 1/2011 | Ukita et al. ................. 370/256 |
| 2005/0058084 A1 | 3/2005 | Hester et al. |
| 2008/0317046 A1 | 12/2008 | Kimura et al. |
| 2012/0106552 A1* | 5/2012 | Iwao et al. ................... 370/392 |
| 2013/0021945 A1* | 1/2013 | Yura et al. .................... 370/254 |

FOREIGN PATENT DOCUMENTS

| JP | 11-191782 | 7/1999 |
| JP | 2002-271399 | 9/2002 |
| JP | 2003-273964 | 9/2003 |
| JP | 2004-320248 | 11/2004 |
| JP | 2006-526937 | 11/2006 |
| JP | 2006-340165 | 12/2006 |
| JP | 2009-33557 | 2/2009 |
| RU | 2316125 C2 | 9/2006 |
| WO | 2004/114690 A1 | 12/2004 |
| WO | 2007/029337 A1 | 3/2007 |
| WO | 2007/108054 A1 | 9/2007 |

OTHER PUBLICATIONS

International Search Report for PCT/JP2009/002055, mailed Jun. 16, 2009.

(Continued)

*Primary Examiner* — Duc C Ho
(74) *Attorney, Agent, or Firm* — Staas & Halsey LLP

(57) ABSTRACT

A first node apparatus includes: ports; a storage device; and receiving, updating, and transmitting circuits. The storage device stores: information associating, with first identification information identifying a first frame, information distinguishing a first port having been used as a destination port when the first node apparatus has transmitted the first frame; and information associating, with each node apparatus, state information indicating whether frame transmission from each port is feasible. The receiving circuit receives, from a second node apparatus, a second frame including second identification information. When the second identification information is identical with the first, the updating circuit updates the state information associated with a node apparatus being a destination of the second frame to make the state information indicate frame transmission from the first port is not feasible. The transmitting circuit selects a second port from which transmission of the second frame is feasible, and transmits the second frame.

9 Claims, 24 Drawing Sheets

(56) References Cited

OTHER PUBLICATIONS

T. Iwao et al., "Multipurpose Practical Sensor Network: S-wire", Fujitsu, vol. 57, No. 3, May 2008, pp. 285-290.

International Preliminary Report on Patentability issued Dec. 12, 2011 in corresponding International Patent Application No. PCT/JP2009/002055.

Japanese Office Action mailed Feb. 5, 2013 for corresponding Japanese Application No. 2011-513122.

Takeo Uchino et al., "Performance Evaluation of Backpressure Congestion Control for ATM Switch with Input Queueing", Technical Report of IEICE, vol. 95, No. 328, Oct. 1995, pp. 49-54.

Notice of Rejection Ground for JP Application No. 2011-513122; mailed Nov. 6, 2012.

Office Action issued May 31, 2013 in corresponding Russian Patent Application No. 2011149464.

\* cited by examiner

151

| PORT NUMBER | PAUSE STATE | COUNTER |
|---|---|---|
| $PN_1$ | $PS_1$ | $Count_1$ |
| $PN_2$ | $PS_2$ | $Count_2$ |
| ⋮ | ⋮ | ⋮ |
| $PN_x$ | $PS_x$ | $Count_x$ |

F I G. 7

153

| MAC ADDRESS | NODE ID |
|---|---|
| $MAC_1$ | $NID_1$ |
| $MAC_2$ | $NID_2$ |
| ⋮ | ⋮ |
| $MAC_b$ | $NID_b$ |

F I G. 9

154

| PAUSE STATE | COUNTER | PAUSE START TIME |
|---|---|---|
| SS | SCount | StartTime |

FIG. 10

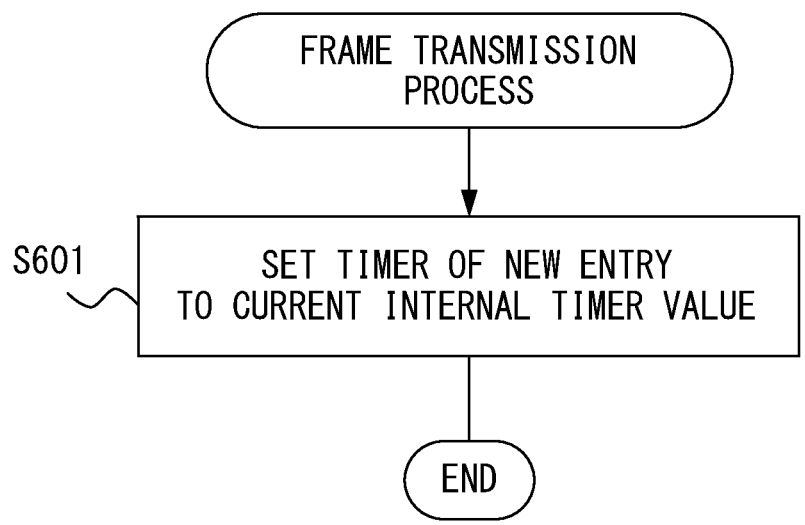
F I G. 1 5

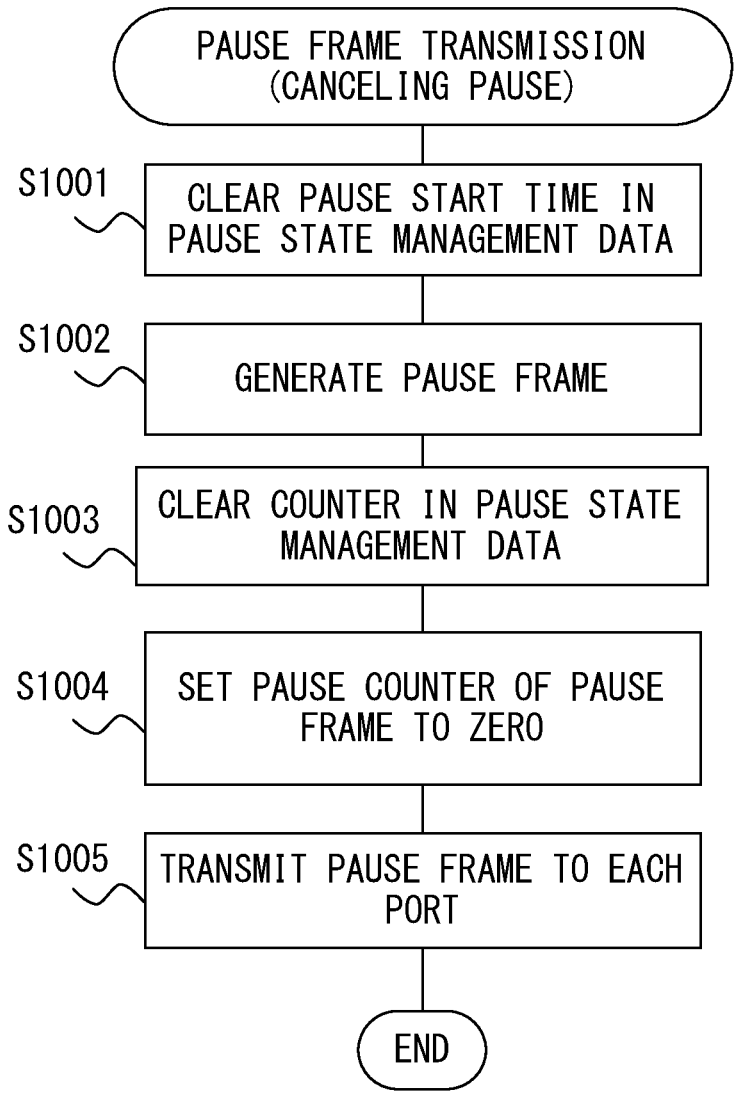
F I G. 1 9

NODE APPARATUS AND COMMUNICATION METHOD

CROSS-REFERENCE TO RELATED APPLICATION

This is a continuation of PCT application PCT/JP2009/002055, which was filed on May 11, 2009, and the entire contents of which are incorporated herein by reference.

FIELD

The embodiments disclosed herein relate to a node apparatus and a communication method.

BACKGROUND

With regard to communication in a network, various techniques have been developed from various viewpoints, such as control in case of occurrence of a fault, redundancy for fault tolerance, and routing control.

For instance, in order to facilitate reduction in network cost and quickly determine a fault, the following communication system has been disclosed. That is, a transmitter-side router A continuously transmits, to a receiver-side router B, packets including user packets at time intervals shorter than a fault determination time that is agreed to by the router B in advance. The router B includes a timer expiring in the fault determination time.

In a case where a network between the routers A and B is normal, the router B receives a packet before expiration of the timer. By using this, the router B judges that the network is normal and resets the timer if it receives a packet before expiration of the timer. If the timer expires before reception of a packet, the router B can judge that the network is not normal and therefore determines that a fault occurs. Such application of the determination by the timer to transmission and reception of packets including user packets enables quick determination of a fault in the network, while avoiding network duplication and while facilitating reduction in cost.

The following telephony system has also been disclosed in order to solve a problem that a conventional Internet telephony system is incapable of distinguishing whether voice packets are not received due to silence compression or the voice packets cannot be received owing to occurrence of abnormality in the Internet.

That is, after a call state has been established between telephones, a calling-side media gateway periodically transmits a monitoring packet to a called-side media gateway via the Internet. When receiving the monitoring packet, the called-side media gateway transmits a response packet to the calling-side media gateway via the Internet. When the number of times at which response or monitoring packets to be received fail to be periodically inputted reaches a prescribed threshold, the two media gateways issue a non-packet-receipt notification to a call agent. When receiving the non-packet-receipt notification, the call agent controls the two media gateways to execute a disconnection process.

The following communication path switching control system has also been disclosed in order to solve a problem that, even if a communication path is switched by a router, apparatuses other than the router cannot recognize that the communication path has been switched.

The communication path switching control system includes a first IPGW (Internet Protocol GateWay) for accommodating and connecting a first PBX (Private Branch eXchange), and a first router responsible for a communication interface between a network and the first IPGW. When detecting a line fault in a communication path currently in use among a plurality of communication paths in the network, the first router searches for a communication path for bypassing the line fault from among the plurality of communication paths, and switches its connection to the searched-for communication path. The first router includes a switching information notification section that notifies, upon switching of the connection to the searched-for communication path, the first IPGW of path switching information pertaining to the communication path to which the connection has been switched. The first IPGW includes a line control section that performs, when detecting the path switching information from the switching information notification section, a line control on the first PBX according to the path switching information.

Incidentally, in recent years, ad hoc networks have become a focus of attention. As to optimal routing in an ad hoc wireless communication network, the following system and method have been disclosed for calculating an optimal route at a node.

That is, routing metric used in the system and the method, if carefully chosen, can provide stability to a network and also provide features like self-healing and load balancing. A routing metric is calculated as a scalar number based upon a number of factors, such as the number of hops, a data rate, link quality, and a device type. Each factor can be determined by evaluation of hallo messages, or other routing messages as required.

Not only wireless ad hoc networks but also wired ad hoc networks have been researched, and application thereof to a sensor network has also been attempted.

For instance, in a wired sensor network referred to as "S-wire", each node apparatus is connected to a plurality of node apparatuses in a wired manner, and data communication and power supply are performed in a wired manner. Advantages of the wired system include a feature that the sensors can be embedded in earth, water, a structure and the like and a feature that a breakage and the like can be detected.

Some documents, such as those in the following list, are known.
Japanese Laid-Open Patent Publication No. 2003-273964
Japanese Laid-Open Patent Publication No. 2002-271399
Japanese Laid-Open Patent Publication No. 2006-340165
Japanese Laid-Open Patent Publication No. 2006-526937
Tadashige Iwao, Kenji Yamada, Koji Nomura, and Takeshi Hosokawa, "Multipurpose Practical Sensor Network: S-wire" journal *FUJITSU*, May 2006 (Vol. 57, No. 3), pp. 285-290

SUMMARY

A first node apparatus in a network including a plurality of node apparatuses is provided. The plurality of node apparatuses include the first node apparatus and a second node apparatus that are connected in a wired manner.

The first node apparatus includes a plurality of ports, each of which is a port to connect, in the wired manner, the first node apparatus to another different node apparatus other than the first node apparatus among the plurality of node apparatuses.

The first node apparatus also includes a storage device. The storage device stores loop detection information that associates, with first identification information for identifying a first frame, destination port distinguishing information for distinguishing, from among the plurality of ports, a first port that has been used as a destination port when the first node apparatus has transmitted the first frame. The storage device also stores routing information that associates, with each of one or more of the plurality of node apparatuses, state information for indicating whether frame transmission from each of the plurality of ports is feasible or not.

The first node apparatus also includes a receiving circuit that is connected to the plurality of ports and that receives a second frame from the second node apparatus. The second frame includes second identification information for identifying the second frame.

The first node apparatus also includes an updating circuit. When the second identification information is identical with the first identification information, the updating circuit updates the state information associated by the routing information with a destination node apparatus to make the updated state information indicate that frame transmission from the first port is not feasible. Herein, the destination node apparatus is one of the plurality of node apparatuses and is a destination of the second frame.

The first node apparatus also includes a transmitting circuit that is connected to the plurality of ports. The transmitting circuit selects a second port from which transmission of the second frame is feasible from among the plurality of ports, according to the state information associated by the routing information with the destination node apparatus. The transmitting circuit transmits the second frame from the second port.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 is a diagram which illustrates an example of a pause state table;

FIG. 9 is a diagram which illustrates an example of a MAC table;

FIG. 10 is a diagram which illustrates an example of a pause state management data;

FIG. 15 is a flowchart which explains setting of a timer of an entry in the loop detection table;

FIG. 19 is a flowchart of a pause canceling process; and

DESCRIPTION OF EMBODIMENTS

As exemplified above, as to communication in a network including a plurality of node apparatuses, techniques have been developed from various viewpoints, such as control in case of occurrence of a fault, redundancy for fault tolerance, and routing control. However, in a network system including a plurality of node apparatuses, there is room for improving self-contained natures of individual node apparatuses since it is typically practiced that the node apparatuses exchange information pertaining to a route and thereby realize distributed coordination.

Thus, it is an object of the following embodiments to provide a technique according to which, in a network including a plurality of node apparatuses, the individual node apparatuses operate using information obtainable in a self-contained manner and thereby realize an appropriate distributed coordination in the entire network.

Embodiments will hereinafter be described in detail with reference to drawings. The order of description is as follows.

Figure 1:
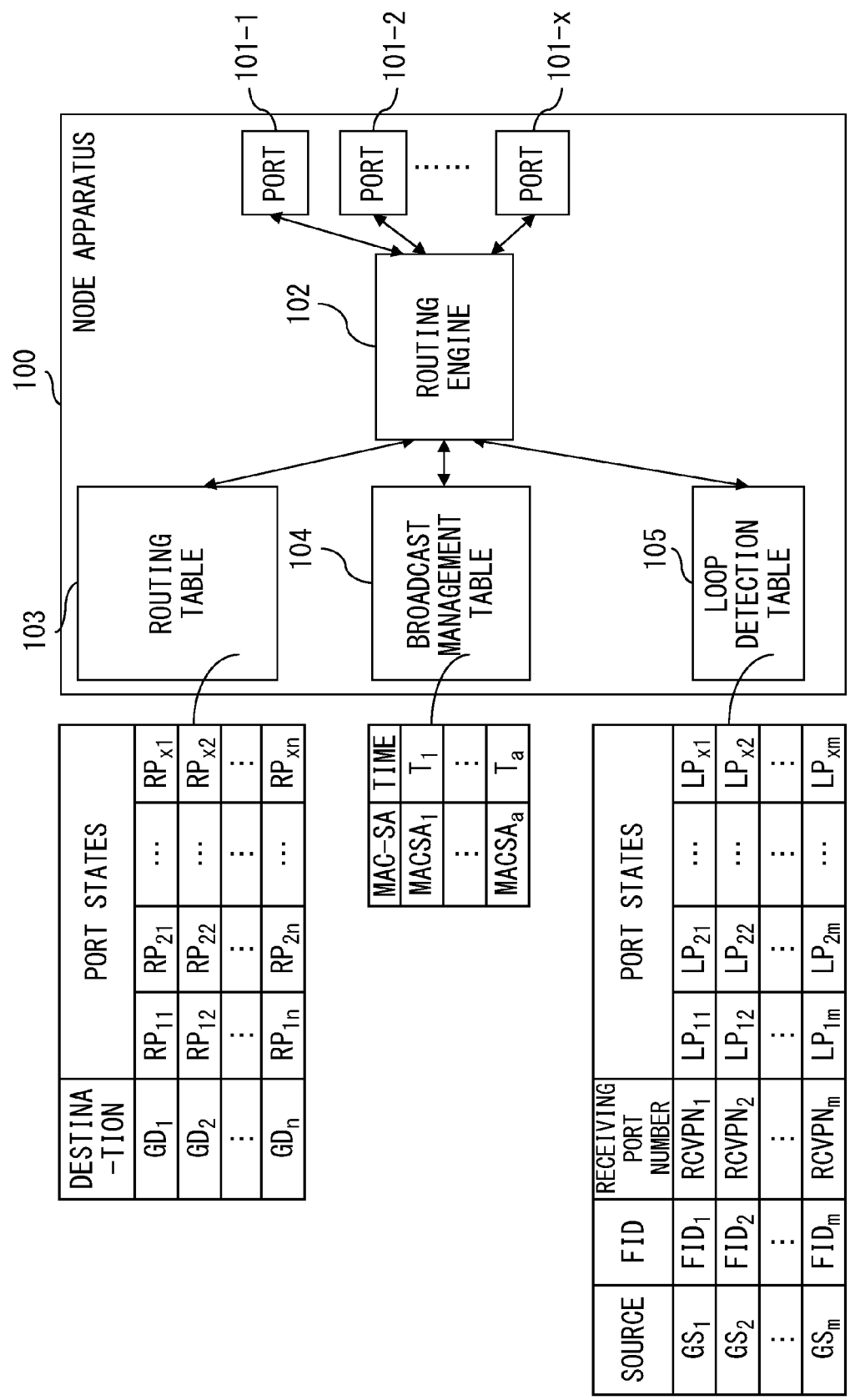
FIG. 1 is a configuration diagram which explains an overview of a node apparatus.

First, several terms are defined and then an overview of a configuration of a node apparatus of this embodiment is described with reference to FIG. 1. Next, an overview of distributed coordination operation in a network including a plurality of node apparatuses each including components as in FIG. 1 is described with reference to FIGS. 2A, 2B and 4. Along therewith, an example of a frame format is also described with reference to FIG. 3.

Subsequently, the configuration of the node apparatus is described in detail with reference to FIGS. 5 and 6. Further, specific examples of data omitted in FIG. 1 among data used by the node apparatus are described with reference to FIGS. 7 to 10.

Moreover, the operation of an individual node apparatus is described in detail with reference to flowcharts of FIGS. 11A to 20. In the description of the operation of the individual node apparatus, a relationship between the operation of the individual node apparatus and the distributed coordination operation realized in the entire network is also described, with reference to FIG. 2A or 4, as appropriate. Subsequently, the node apparatus of this embodiment is recapitulated. Further, advantages of this embodiment are described in comparison with some techniques. Finally, modifications of this embodiment are also described.

Here, some terms used in this embodiment are defined.

In this embodiment, a plurality of node apparatuses are included in a network. Hereinafter, first and second node apparatuses are referred to as "adjacent" if the first and second node apparatuses are directly connected by a cable. With respect to the first node apparatus, the second node apparatus may be referred to as an "adjacent node apparatus". Likewise, with respect to the second node apparatus, the first node apparatus is its "adjacent node apparatus".

In this embodiment, various frames are processed. The frames are classified from several viewpoints, as described below.

Figure 3:
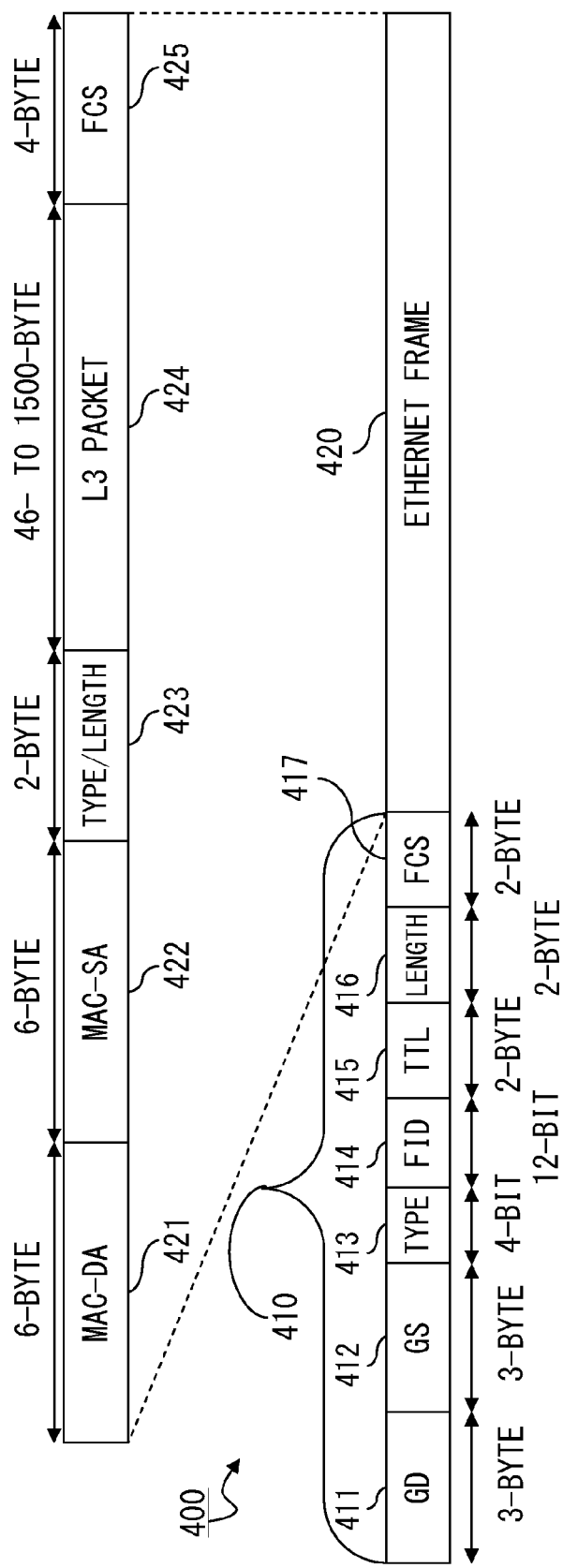
FIG. 3 is a diagram which explains a frame format.

A frame is classifiable according to whether it includes an "ad hoc header" illustrated in FIG. 3 or not. Hereinafter, a frame including the ad hoc header is referred to as an "ad hoc frame". On the other hand, examples of frames without an ad hoc header include, for instance, an Ethernet frame used in well-known Ethernet (registered trademark).

The ad hoc frame may be further classified into a normal frame including the Ethernet frame subsequent to the ad hoc header and a control frame including control data in another specific format subsequent to the ad hoc header. There may be a plurality of types of the control frames. An example of the control frame is a "pause frame" described later.

The frames may also be classified into a broadcast frame that is broadcast in a network, and a unicast frame that is unicast. Although detailed description will be made later, the pause frame is broadcast in an exceptional manner limited to adjacent node apparatuses.

In the following description, a classification of a frame from a viewpoint as described above is explicitly described, as necessary. In a passage where the classification is apparent from the context or a passage irrelevant to the classification, the simple notation "frame" may be used for the sake of simplicity.

FIG. 1 is a configuration diagram which explains an overview of a node apparatus.

The node apparatus 100 illustrated in FIG. 1 includes a plurality of ports 101-1 to 101-$x$ (1<$x$) for wired connection with adjacent node apparatuses (not illustrated in FIG. 1), and a routing engine 102 that routes frames.

The ports 101-1 to 101-$x$ in FIG. 1 are those for a wired ad hoc network of this embodiment. Note that, in FIG. 5 described later, the ports 101-1 to 101-$x$ in FIG. 1 are represented as "wired ad hoc network ports", which are distinguished from a general LAN (Local Area Network) port conforming to general Ethernet specifications. Hereinafter, the simple notation "port" means a port for the wired ad hoc network according to this embodiment.

The node apparatus 100 also includes tables, namely, a routing table 103, a broadcast management table 104 and a loop detection table 105. The routing engine 102 performs routing with reference to these tables. The routing engine 102 also updates these tables.

As illustrated in FIG. 1, the routing table 103 of this embodiment is a table that stores a "destination" and "$x$" number of "port states", which respectively represent states of the ports 101-1 to 101-$x$, in association with each other.

FIG. 1 exemplifies the routing table 103 including "n" number of entries. As will be described later with reference to FIG. 11C, each entry is one that has been added to the routing table 103 on the basis of a frame received by the node apparatus 100. As will be described later with reference to FIGS. 12 and 13, each entry is deleted from the routing table 103 if not accessed for a prescribed time.

For instance, in the i-th (1≤i≤n) entry in the routing table 103, states $RP_{1i}$ to $RP_{xi}$ of the respective ports 101-1 to 101-$x$ are associated with a destination $GD_i$.

Here, the destination $GD_i$ is identification information that identifies the node apparatus that is to be the destination of a frame in a wired ad hoc network including a plurality of node apparatuses each equivalent to the node apparatus 100. In this embodiment, each node apparatus is assigned a three-byte ID (IDentification) that is unique in the wired ad hoc network.

Hereinafter, the ID assigned to the node apparatus is referred to as a "node ID". More specifically, the destination $GD_i$ is a node ID.

When the node apparatus 100 receives a frame addressed to the destination $GD_i$ at any of the ports 101-1 to 101-$x$ and tries to relay the received frame, the routing engine 102 refers to the routing table 103. Then, the routing engine 102 selects a port for transmitting (i.e., outputting) the received frame on the basis of the states $RP_{1i}$ to $RP_{xi}$ associated with the destination $GD_i$ in the routing table 103.

In the i-th entry in the routing table 103, a state $RP_{ji}$ of the j-th (1≤j≤x) port 101-$j$ is any of five states, namely, "U" (Used), "E" (Empty), "L" (Loop), "P" (Pause), and "D" (Down).

"U" indicates an in-use state. More specifically, the state $RP_{ji}$ is "U" if the port 101-$j$ is actually used as a destination port in the node apparatus 100 for relaying a frame addressed to another node apparatus identified by a node ID being the destination $GD_i$. That is, the "U" state is an example of a state indicating "transmission is feasible".

"E" indicates an unused state. More specifically, the state $RP_{ji}$ is "E" if the port 101-$j$ has not been used as a destination port in the node apparatus 100 for relaying a frame addressed to another node apparatus identified by a node ID being the destination $GD_i$. That is, the "E" state is an example of a state indicating "transmission is feasible".

"L" indicates a loop state. More specifically, the state $RP_{ji}$ is updated to "L" if both of the following two conditions hold.

The port 101-$j$ has been used as a destination port in the node apparatus 100 for relaying a frame addressed to another node apparatus identified by a node ID being the destination $GD_i$.

A frame having been transmitted from the port 101-$j$ toward another node apparatus identified by a node ID being the destination $GD_i$ loops in the network and is returned to the node apparatus 100 itself (i.e., is received by the node apparatus 100 again).

Note that, in a case where the state $RP_{ji}$ is "L", the state $RP_{ji}$ means that a frame addressed to the destination $GD_i$ should not be transmitted from the port 101-$j$ because the frame addressed to the destination $GD_i$ will loop if transmitted from the port 101-$j$. That is, the "L" state is an example of a state indicating "transmission is not feasible".

"P" indicates a pause state. More specifically, the state $RP_{ji}$ turns into "P" if a "pause request" is received from the port 101-$j$ (i.e., from an adjacent node apparatus which is not illustrated and which is connected via the port 101-$j$). Note that the "pause request" is a request by which a node apparatus whose processing load increases owing to concentration of frames and the like requests its adjacent node apparatus to "pause" transmission of frames to this node apparatus itself for a certain time period. The detailed description on the pause request will be made later with reference to FIGS. 16 to 19. The overview thereof is as follows.

For instance, assume that the node apparatus 100 in FIG. 1 is connected with a second node apparatus, which is not illustrated, via the port 101-$j$. Hereinafter, a state in which the processing load exceeds a prescribed criterion is referred to as a "busy state".

If the second node apparatus falls into the busy state, it transmits the pause request to each of a plurality of its adjacent node apparatuses. More specifically, the pause request is represented by a "pause frame", namely, an ad hoc frame that has a specific format and that includes a value designating the length of the above-mentioned certain time period.

Accordingly, the node apparatus 100 in FIG. 1 receives the pause frame from the port 101-$j$, and recognizes that the second node apparatus is currently in the busy state. That is, the node apparatus 100 recognizes that frames should not be transmitted to the port 101-$j$ during the above-mentioned certain time period, which is designated in the pause frame, because the second node apparatus is unable to process the frames due to an overload even if the frames are transmitted to the port 101-$j$.

On the basis of the above recognition, the routing engine 102 of the node apparatus 100 then sets the state $RP_{ji}$, which corresponds to the port 101-$j$ in the routing table 103, to "P". As apparent from the above, the "P" state is an example of a state indicating "transmission is not feasible".

"D" indicates a link-down state. The state $RP_{ji}$ turns into "D" in cases where a signal carried on a cable is not electrically detectable at the port 101-$j$, including a case such as that where a cable connected to the port 101-$j$ is physically broken. The "D" state is also an example of a state indicating "transmission is not feasible".

Note that the "P" and "D" states are concepts independent of the destination of a frame. However, according to this embodiment, there is a case where, in the routing table 103, part of the states $RP_{j1}$ to $RP_{jn}$ of a certain port (e.g., the port 101-$j$) is/are being set to "P" and the other part of them is/are being set to a state other than "P". Likewise, according to this embodiment, there is a case where part of the states $RP_{j1}$ to $RP_{jn}$ of a certain port (e.g., the port 101-$j$) is/are being set to "D", and the other part of them is/are being set to a state other than "D". This is because, in this embodiment, an entry of the routing table 103 is updated at an opportunity of reception of a frame, as will be described later, and thus there are time differences in the timing of the updating among the entries.

Subsequently, the other tables illustrated in FIG. 1 are described.

The broadcast management table 104 is a table that stores a "MAC-SA" (Media Access Control Source Address) and a "time" in association with each other. FIG. 1 exemplifies the broadcast management table 104 including entries, the number of which is "a".

As will be described later with reference to FIG. 11B, each entry is one that has been added to the broadcast management table 104 on the basis of a broadcast frame received by the node apparatus 100. Although not illustrated in the drawings, each entry is deleted from the broadcast management table 104 if not accessed for a prescribed time period, as will be described later.

For instance, in the i-th ($1 \leq i \leq a$) entry in the broadcast management table 104, a MAC address $MACSA_i$ and a time $T_i$ are associated with each other. Here, the MAC address $MACSA_i$ is the MAC address of a source node apparatus of a broadcast frame received by the node apparatus 100. The time $T_i$ is a time at which the routing engine 102 processed this broadcast frame.

When the node apparatus 100 receives a broadcast frame from any of ports 101-1 to 101-$x$, the routing engine 102 refers to the broadcast management table 104. The routing engine 102 then determines whether to discard the received broadcast frame and thereby prevent congestion or to relay the received broadcast frame (i.e., to transmit it to a port other than the port from which this broadcast frame has been received). As will be described later in detail, some embodiments make it possible to prevent congestion of a broadcast frame only with the loop detection table 105.

The loop detection table 105 is a table to associate a "receiving port number" and "x" number of "port states", which respectively indicate states of the ports 101-1 to 101-$x$, with a pair of a "source" and an "FID" (Frame IDentification) and to store them.

FIG. 1 exemplifies the loop detection table 105 including "m" number of entries. As will be described later with reference to FIGS. 11B and 11C, each entry is added to the loop detection table 105 on the basis of a frame received by the node apparatus 100. In addition, as will be described later with reference to FIGS. 14 and 15, each entry is deleted from the loop detection table 105 after a prescribed time period has elapsed.

For instance, in the i-th ($1 \leq i \leq m$) entry in the loop detection table 105, a receiving port number $RCVPN_i$ and states $LP_{1i}$ to $LP_{xi}$ of the respective ports 101-1 to 101-$x$ are associated with a pair of a source $GS_i$ and $FID_i$.

Here, the source $GS_i$ is identification information for identifying a node apparatus being the source of a frame in a wired ad hoc network including a plurality of node apparatuses each equivalent to the node apparatus 100, and more specifically is a node ID. The $FID_i$ is identification information that the source node apparatus (i.e., a node apparatus whose node ID is $GS_i$) has assigned to a frame to be transmitted and that uniquely identifies the frame. The $FID_i$ may be, for instance, a sequence number.

When the node apparatus 100 receives a frame at any of the ports 101-1 to 101-$x$ and tries to relay the received frame, the routing engine 102 refers not only to the routing table 103 but also to the loop detection table 105. The routing engine 102 then selects the port for transmitting the received frame also on the basis of the loop detection table 105.

The receiving port number $RCVPN_i$ of the i-th entry in the loop detection table 105 indicates a port from which a frame corresponding to the i-th entry has been received by the node apparatus 100. More specifically, in a case where a frame to which an FID being $FID_i$ is assigned by a source node apparatus (i.e., a node apparatus identified by a node ID being $GS_i$) is received at the port 101-$r$ ($1 \leq r \leq x$) of the node apparatus 100, the receiving port number $RCVPN_i$ is "r".

In the i-th entry in the loop detection table 105, the state $LP_{ji}$ of the j-th ($1 \leq j \leq x$) port 101-$j$ is any of three states, namely, "U", "E", and "L".

As described on the routing table 103, "U" indicates an in-use state. More specifically, in the loop detection table 105, the state $LP_{ji}$ is "U" if the following two conditions hold.

The node apparatus 100 has relayed a frame to which an FID being $FID_i$ is assigned by a source node apparatus identified by a node ID being the source $GS_i$.

In the relaying, the port 101-$j$ has been used as a destination port in the node apparatus 100.

As described on the routing table 103, "E" indicates an unused state. In the loop detection table 105, more specifically, the meaning is as follows. That is, the state $LP_{ji}$ is "E" if the destination port is not the port 101-$j$ when the node apparatus 100 has relayed a frame to which an FID being $FID_i$ is assigned by a source node apparatus identified by a node ID being the source $GS_i$.

As described on the routing table 103, "L" indicates a loop state. In the loop detection table 105, more specifically, the state $LP_{ji}$ turns into "L" if the following two conditions hold.

The node apparatus 100 has relayed a frame to which an FID being $FID_i$ is assigned by a source node apparatus identified by a node ID being the source $GS_i$, while using the port 101-$j$ as the destination port.

This frame is received by the node apparatus 100 again after the relaying.

In the routing table 103, the "U" and "E" states are common in that they mean "transmission is feasible", namely, "selectable as a destination port". However, in the loop detection table 105, the "U" and "E" states are sharply discriminated from each other as follows. More specifically, the "U" state in the loop detection table 105 indicates a target to be transitioned to the "L" state, which means "transmission is not feasible", if a loop is detected hereafter. On the other hand, the "E" state in the loop detection table 105 indicates that, even if a loop is detected hereafter, it is still selectable as a destination port at the time of detection of the loop.

Next, an overview of a distributed coordination operation in a network including a plurality of node apparatuses each including components as with FIG. 1 is described with reference to FIGS. 2A to 4 along with an example of a frame format.

Figure 2A:
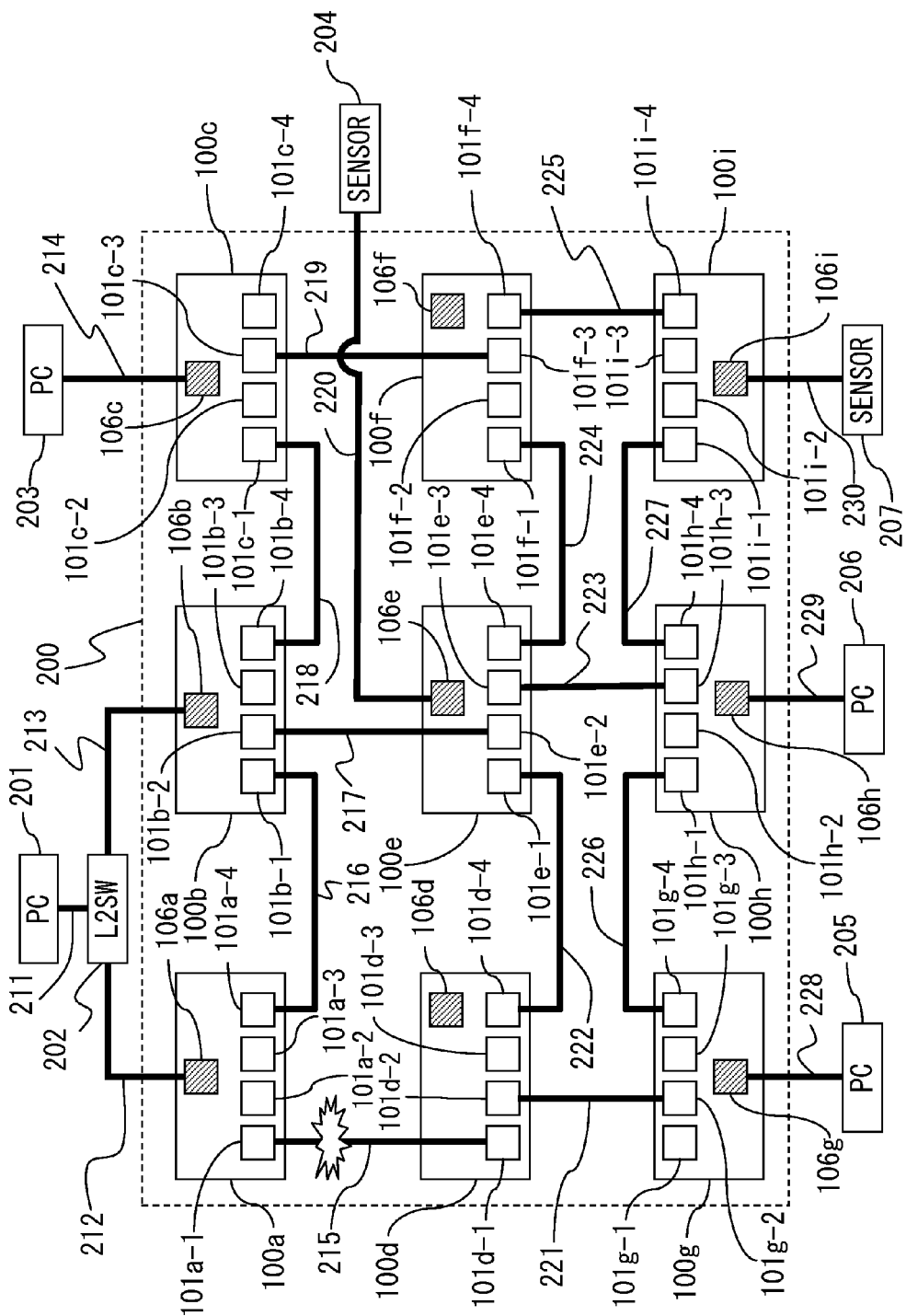
FIG. 2A is a diagram which illustrates an example of a network to which the node apparatus of this embodiment is applied.

FIG. 2A is a diagram which illustrates an example of a network to which the node apparatus of this embodiment is applied.

A wired ad hoc network 200 in FIG. 2A includes a plurality of node apparatuses 100a to 100i. In the wired ad hoc network 200, the node apparatuses 100a to 100i are physically connected by cables (e.g., metal wire cables, such as copper cables, or optical fiber cables) in a mesh configuration (i.e., in a grid configuration).

It is a matter of course that any physical connection topology in the wired ad hoc network may be adopted according to embodiments, and the mesh configuration is not necessarily adopted.

Each of the node apparatuses 100a to 100i includes components as with FIG. 1. Note that the node apparatus 100 includes the "x" number of ports 101-1 to 101-x in FIG. 1 and that FIG. 2A specifically illustrates an example where x=4.

For instance, the node apparatus 100a includes four ports 101a-1 to 101a-4. This is applicable to the other node apparatuses 100b to 100i. Components analogous to each other may be assigned reference signs, such as "101-1", "101a-1", and "101b-1", that are identical with each other except for suffixes such as "a" and "b", and the detailed description thereof may be omitted.

The physical topology in the mesh configuration illustrated in FIG. 2A is specifically realized by the following cable wiring.

The node apparatuses 100a and 100d are connected by a link 215 between the ports 101a-1 and 101d-1.

The node apparatuses 100a and 100b are connected by a link 216 between the ports 101a-4 and 101b-1.

The node apparatuses 100b and 100e are connected by a link 217 between the ports 101b-2 and 101e-2.

The node apparatuses 100b and 100c are connected by a link 218 between the ports 101b-4 and 101c-1.

The node apparatuses 100c and 100f are connected by a link 219 between the ports 101c-3 and 101f-3.

The node apparatuses 100d and 100g are connected by a link 221 between the ports 101d-2 and 101g-2.

The node apparatuses 100d and 100e are connected by a link 222 between the ports 101d-4 and 101e-1.

The node apparatuses 100e and 100h are connected by a link 223 between the ports 101e-3 and 101h-3.

The node apparatuses 100e and 100f are connected by a link 224 between the ports 101e-4 and 101f-1.

The node apparatuses 100f and 100i are connected by a link 225 between the ports 101f-4 and 101i-4.

The node apparatuses 100g and 100h are connected by a link 226 between the ports 101g-4 and 101h-1.

The node apparatuses 100h and 100i are connected by a link 227 between the ports 101h-4 and 101i-1.

It is a matter of course that a mesh topology equivalent to that in FIG. 2A is also realizable in some embodiments by connecting pairs of ports, which are other than the pairs exemplified in FIG. 2A, using cables.

Incidentally, in the example of FIG. 2A, the wired ad hoc network 200 is not an isolated network, but is connected to another network (hereinafter also referred to as an "external network") such as a LAN and a WAN (Wide Area Network).

More specifically, the node apparatuses 100a to 100i in this embodiment include not only the components illustrated in FIG. 1 but also respective general LAN ports 106a to 106i as connection interfaces between the wired ad hoc network 200 and the external network. In FIG. 2A, the general LAN ports 106a to 106i are hatched, which distinguishes them from the wired ad hoc network ports 101a-1 to 101i-4. The general LAN ports 106a to 106i in this embodiment are wired LAN port. However, in some embodiments, wireless LAN interfaces may be adopted instead.

For instance, in the example of FIG. 2A, the wired ad hoc network 200 is connected to the external network as follows. That is, an L2SW (Layer 2 Switch) 202 connected to a PC (Personal Computer) 201 via a link 211 is connected to the respective general LAN ports 106a and 106b of the node apparatuses 100a and 100b via respective links 212 and 213. In addition, PCs 203, 205, and 206 are connected to the respective general LAN ports 106c, 106g, and 106h of the node apparatuses 100c, 100g and 100h via respective links 214, 228 and 229.

The L2SW 202 may further be connected to a router and/or another PC(s), which are not illustrated in the drawings. The PCs 203, 205 and 206 may also be connected to another external network, which is not illustrated in the drawings.

For convenience of description, FIG. 2A exemplifies the wired ad hoc network 200 including the nine node apparatuses 100a to 100i. However, in some embodiments, a wired ad hoc network may include a large number of node apparatuses, such as several thousands to several hundred thousands of them.

For instance, the wired ad hoc network of this embodiment may be applied to a sensor network, which is a network for collecting various pieces of information from a large number of sensors disposed here and there. In this case, the wired ad hoc network may include a large number of node apparatuses in the order of several thousands to several hundred thousands corresponding to the large number of sensors. In the sensor network, arbitrary types of sensors, such as image sensors, temperature sensors, humidity sensors, pressure sensors, and acceleration sensors, are used.

FIG. 2A also illustrates one example in which the wired ad hoc network of this embodiment is applied to a sensor network. More specifically, in FIG. 2A, sensors 204 and 207 each equipped with a LAN interface are connected to the respective general LAN ports 106e and 106i of the node apparatuses 100e and 100i via respective links 220 and 230. The sensors 204 and 207 output data representing sensed results as Ethernet frames via the LAN interfaces. The types of the sensors 204 and 207 are arbitrary.

Use of the wired ad hoc network of this embodiment as illustrated in FIG. 2A enables construction of a sensor network even in a harsh environment because it is often the case that wired communication is feasible even in an environment in which wireless communication is difficult.

For instance, sensors and node apparatuses connected to the sensors via general LAN ports may be embedded in earth including fields and escarpments, in water including paddy fields, rivers and sea, and/or in structures including walls and pillars of buildings. Even in such cases, the node apparatuses are capable of surely communicating with other node apparatuses via wired connection. Accordingly, adoption of the wired ad hoc network of this embodiment enables construction of a sensor network even in environments, such as in earth, water and structures, where wireless communication is difficult.

The network configuration in FIG. 2A has been described above. Next, an overview of the distributed coordination operation in the wired ad hoc network 200 in FIG. 2A will be described. Detailed operations of the individual node apparatuses 100a to 100i will be described later with reference to flowcharts of FIGS. 11A to 20.

Hereinafter, switching of a frame relay route in the wired ad hoc network 200 in case of occurrence of a fault will be described using an example in which the PC 203 transmits a frame to the PC 205.

When the PC 203 transmits an Ethernet frame via the link 214, the node apparatus 100c receives the Ethernet frame and adds an ad hoc header to the received Ethernet frame.

According to autonomous distributed coordination, which is realized by each node apparatus operating according to the flowcharts of FIGS. 11A to 20, the ad hoc frame is relayed from the node apparatus 100c to the node apparatus 100g in the wired ad hoc network 200. The node apparatus 100g then removes the ad hoc header from the ad hoc frame. The Ethernet frame acquired as a result thereof is outputted from the node apparatus 100g to the PC 205 via the link 228.

Assume that, for instance, a route formed by the links 218, 216, 215, and 221 is selected as the relay route from the node apparatus 100c to the node apparatus 100g in a case where each link illustrated in FIG. 2A is normal. This route is selected by the following distributed coordination.

The node apparatus 100c, having received the frame from the PC 203, selects the port 101c-1 connected to the node apparatus 100b via the link 218 as the destination port of the frame. Then, the node apparatus 100b, having received the frame from the node apparatus 100c, selects the port 101b-1 connected to the node apparatus 100a via the link 216 as the destination port of the frame.

The node apparatus 100a, having received the frame from the node apparatus 100b, then selects the port 101a-1 connected to the node apparatus 100d via the link 215 as the destination port of the frame. Subsequently, the node apparatus 100d, having received the frame from the node apparatus 100a, selects the port 101d-2 connected to the node apparatus 100g via the link 221 as the destination port of the frame.

In the meantime, assume that a physical fault occurs in the link 215 at a certain point in time. If the PC 203 tries to transmit a frame to the PC 205 again after the occurrence of the fault in the link 215, the relay route in the wired ad hoc network 200 is switched according to the following distributed coordination control.

The node apparatus 100c selects the port 101c-1 as the destination port of the frame, as with the normal case. The node apparatus 100b selects the port 101b-1 as the destination port of the frame, also as with the normal case. The node apparatus 100a then receives the frame.

However, as illustrated in FIG. 2A, the node apparatus 100a is only connected to the two node apparatuses, namely, the node apparatuses 100b and 100d in the wired ad hoc network 200, and the fault is occurring in the link 215 with the node apparatus 100d. Accordingly, the node apparatus 100a is unable to transmit the frame received from the node apparatus 100b via the link 216 to a node apparatus in the wired ad hoc network 200 other than the node apparatus 100b via a normal link.

Thus, the node apparatus 100a returns the frame, via the link 216, to the node apparatus 100b in order to notify it that the node apparatus 100a itself is unable to forward the frame.

The node apparatus 100b then receives the frame that has been transmitted by the node apparatus 100b itself.

Accordingly, the node apparatus 100b recognizes that the port 101b-1 is in the "L" state (i.e., the loop state) in the port state information that is associated with the node apparatus 100g in the routing table 103. More specifically, the node apparatus 100b recognizes "in a case of relaying a frame whose final destination in the wired ad hoc network 200 is the node apparatus 100g, the frame should not be transmitted to the port 101b-1, which is connected to the node apparatus 100a".

According to the above-mentioned recognition, the node apparatus 100b searches for a normal port that is other than the port 101b-1 and that is usable as the destination port of the frame. In this case, the port 101b-2, which is connected to the node apparatus 100e via the normal link 217, is found.

Accordingly, the node apparatus 100b transmits the frame, which has been returned from the node apparatus 100a, to the port 101b-2 at this time.

The node apparatus 100e then receives the frame. In the example of FIG. 2A, each link connected to the node apparatus 100e is normal. Accordingly, the node apparatus 100e is enabled to select, for instance, the port 101e-3, which is connected to the node apparatus 100h via the link 223, as the destination port of the frame.

As a result of the selection, the frame is transmitted from the port 101e-3, and received by the node apparatus 100h via the link 223. The node apparatus 100h then selects the port 101h-1, which is connected to the node apparatus 100g via the normal link 226, and transmits the frame from the port 101h-1.

As a result, the node apparatus 100g is enabled to receive the frame. As described above, even in a case where the fault occurs on the link 215 on the route having been used so far, the distributed coordination of the node apparatuses in the wired ad hoc network 200 automatically switches the route.

Since the routing table 103 includes the entries on a destination-by-destination basis as illustrated in FIG. 1, there may be a case where the node apparatus 100b selects the port 101b-1 as the destination port depending on the destination of the frame. In other words, the node apparatus 100b is still enabled to transmit a frame, which is addressed to the node apparatus 100a, from the port 101b-1 even in a case where the node apparatus 100b recognizes the port 101b-1 as the "L" state corresponding to the node apparatus 100g as described above. Thus, according to this embodiment, feasibility of transmitting a frame from a certain port is managed depending on the destination of the frame.

Next, referring to FIG. 2B, the switching of the route described above will be described from another viewpoint.

Figure 2B:
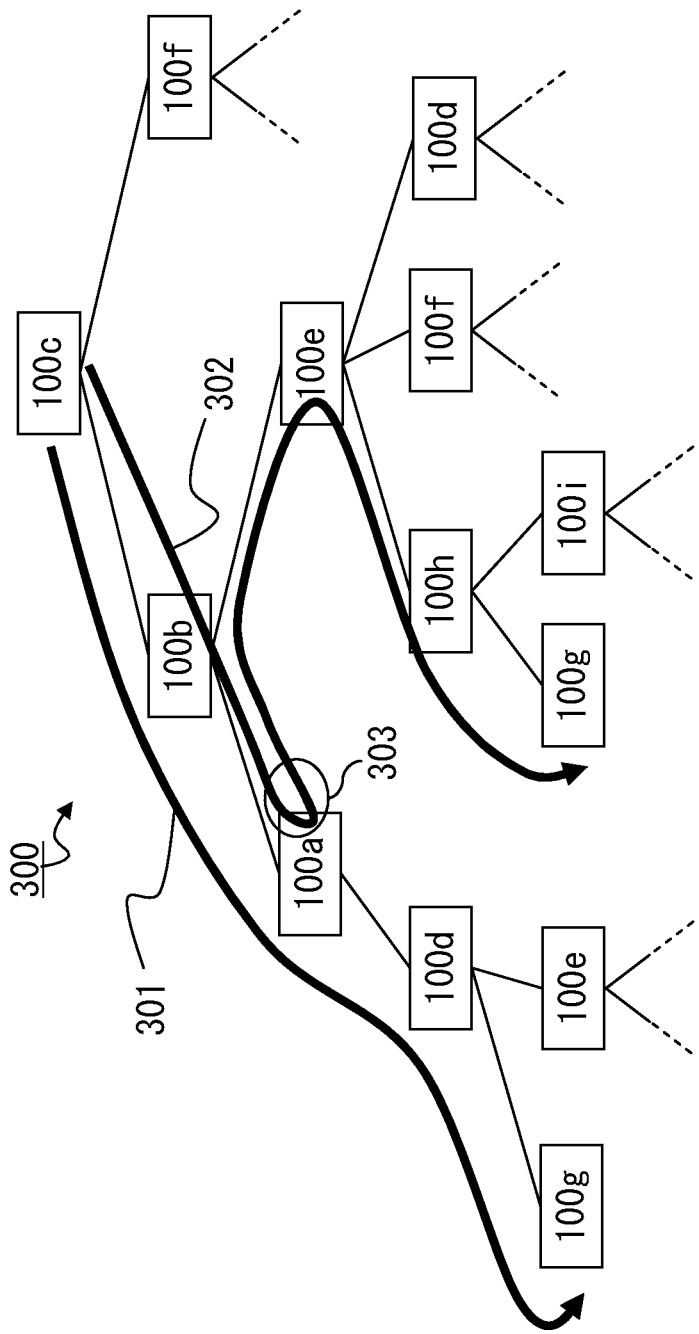
FIG. 2B is a conceptual diagram which explains alternative route finding in case of occurrence of a fault.

FIG. 2B is a conceptual diagram which explains alternative route finding in case of occurrence of a fault. FIG. 2B illustrates a search tree 300 whose root node is the node apparatus 100c being the source in the wired ad hoc network 200 in the example above, and whose each leaf node is the node apparatus 100g being the destination in the wired ad hoc network 200.

For the sake of convenience, let a certain node in the search tree 300 be referred to as a "first node", and let a node apparatus which corresponds to the first node and which is in the wired ad hoc network 200 be referred to as a "first node apparatus". Also assume that, in an entry which is in the routing table 103 in the first node apparatus and which corresponds to the node apparatus 100g being the destination, the state of another node apparatus (for the sake of convenience, referred to as a "second node apparatus") is the "U" or "E"

state. In this case, in the search tree 300, the first node has a child node corresponding to the second node apparatus.

The relay route, which has been used before the occurrence of the fault in the link 215 and which has been described pertaining to FIG. 2A, is a route having been found corresponding to the search path 301 in FIG. 2B as a result of the distributed coordination in the wired ad hoc network 200. The search path 301 is a path from the node apparatus 100c, which is the root node in the search tree 300, to the node apparatus 100g, which is the leaf node in the search tree 300, via the node apparatuses 100b, 100a, and 100d.

The route switching (i.e., the alternative route finding), which is made in case of occurrence of the fault in the link 215 and which has been described pertaining to FIG. 2A, corresponds to a search path 302 in FIG. 2B. As illustrated in FIG. 2B, the search path 302 includes backtracking 303.

That is, the route switching described pertaining to FIG. 2A may be regarded as corresponding to that a depth-first search including the backtracking 303 in the search tree 300 is performed in the entire wired ad hoc network 200. If the search path 302 including the backtracking 303 reaches the node apparatus 100g being the leaf node, the search succeeds and a relay route of the frame in the wired ad hoc network 200 is established.

The occurrence of the backtracking 303 at the node apparatus 100a in the search tree 300 corresponds to that the node apparatus 100a returns the frame to the node apparatus 100b in the description of FIG. 2A. The path, which is from the root node to the leaf node in the search tree 300 and which has finally been found according to the search path 302 in the search tree 300, corresponds to a new frame relay route from the node apparatus 100c to the node apparatus 100g in the wired ad hoc network 200. That is, as illustrated in FIG. 2B, the route passing through the node apparatuses 100c, 100b, 100e, 100h, and 100g is found as the new frame relay route.

As understood from the above description, as long as at least one route from the node apparatus 100c being the source to the node apparatus 100g being the destination exists in the wired ad hoc network 200, the route is surely found as a result of the depth-first search.

Next, difference in frame format between the inside and outside of the wired ad hoc network 200 in FIG. 2A will be described with reference to FIG. 3. FIG. 3 is a diagram which explains a frame format. Note that the "ad hoc frame" in this embodiment is a frame transmitted and received between the node apparatuses in the wired ad hoc network.

As illustrated in FIG. 3, the ad hoc frame 400 is a frame in a format in which an "ad hoc header", which is a header in a specific format defined in this embodiment, is prepended to a general Ethernet frame 420. In other words, the ad hoc header 410 is information that functions as an interface between the Ethernet being an external network and the wired ad hoc network of this embodiment.

The ad hoc header 410 of this embodiment is 14 bytes long as illustrated in FIG. 3, and includes respective fields of a GD 411, a GS 412, a type 413, an FID 414, a TTL 415, a length 416, and an FCS 417. Although detailed description will be made later, the ad hoc header 410 is given by a node apparatus in the wired ad hoc network. Hereinafter, for simplification of notation, for instance, the "GD field" may simply be denoted by a "GD".

Designated in the three-byte GD (Global Destination) 411 is identification information (e.g., a node ID) for identifying a node apparatus, which is the source of the frame in the wired ad hoc network, uniquely in the wired ad hoc network. Designated in the three-byte GS (Global Source) 412 is identification information (e.g., a node ID) for identifying a node apparatus, which is the destination of the frame in the wired ad hoc network, uniquely in the wired ad hoc network.

For instance, in the example in FIG. 2A, in a case where a frame from the PC 203 addressed to the PC 205 is transmitted via the wired ad hoc network 200, the node apparatus being the source in the wired ad hoc network 200 is the node apparatus 100c, which is connected to the PC 203. The node apparatus being the destination in the wired ad hoc network 200 is the node apparatus 100g, which is connected to the PC 205.

Accordingly, in this case, in the ad hoc frame 400 transmitted within the wired ad hoc network 200, the node ID of the node apparatus 100c is designated in the GD 411. Meanwhile, the node ID of the node apparatus 100g is designated in the GS 412.

The values designated in the GD 411 and the GS 412 are, for instance, node IDs preliminarily assigned to the respective node apparatuses as described above. The node IDs may be identification numbers. Alternatively, the least-significant three bytes of the MAC address of the node apparatus may also be used as identification information for the GD 411 and the GS 412 if each node apparatus in the wired ad hoc network is a product of the same vendor. This is because the most-significant three bytes of the MAC address indicate an OUI (Organizationally Unique Identifier) and the least-significant three bytes are unique in the vender.

The implication of the term "global" in the names of "GD" and "GS" will be described according to the example in FIG. 2A, as follows.

When the ad hoc frame 400 is transmitted from the node apparatus 100c toward the node apparatus 100g in the wired ad hoc network 200, the immediate destination from the node apparatus 100c is a node apparatus (e.g., the node apparatus 100b) adjacent to the node apparatus 100c. Thus, when explicitly discriminating the node apparatus 100b being the immediate destination from the node apparatus 100g being the final destination, the node apparatus 100g, which is the final destination within the wired ad hoc network 200, is referred to as a "global destination". Meanwhile, the node apparatus 100b, which is directly connected by the cable to the node apparatus 100c and which is adjacent to the node apparatus 100c, is referred to as a "local destination".

Accordingly, with respect to the node apparatus 100b, the node apparatus 100c is the global source and is also the local source. With respect to the node apparatus 100g, the node apparatus 100c is the global source, but is not the local source (because the node apparatuses 100g and 100c are not directly connected to each other). As also apparent in FIG. 2A, in the wired ad hoc network, a local destination corresponds to a destination port of a frame in a one-to-one manner, and a local source corresponds to a port from which the frame is received in a one-to-one manner.

Returning to the description in FIG. 3, a value identifying the type (category) of the ad hoc frame 400 is designated in the four-bit type 413. For instance, according to embodiments, a value for distinguishing some types, which are exemplified below, from each other is designated in the type 413.

a normal frame (a type of the ad hoc frame 400 including the Ethernet frame 420 subsequent to the ad hoc header 410)

a pause frame (a type of the ad hoc frame including data, which is not the Ethernet frame 420 and which is in a prescribed format, subsequent to the ad hoc header 410)

other some types of control frames (types of the ad hoc frames each including data, which is not the Ethernet frame 420 and which is in a prescribed format, subsequent to the ad hoc header 410)

a broadcast frame received by the node apparatus via the general LAN port (a type of the ad hoc frame 400 including the Ethernet frame 420 subsequent to the ad hoc header 410)

a broadcast frame originated in the node apparatus itself (a type of the ad hoc frame 400 including the Ethernet frame 420 subsequent to the ad hoc header 410)

Meanwhile, designated in the 12-bit FID (Frame Identification) 414 is identification information assigned to the ad hoc frame 400 by the node apparatus being the source identified by the value of the GS 412. The value designated in the FID 414 may be, for instance, a sequence number generated by the node apparatus using a built-in counter circuit, which is not illustrated in the drawings.

Meanwhile, the valid duration of the ad hoc frame 400 is designated in the two-byte TTL (Time To Live) 415 in terms of the number of hops in the wired ad hoc network. The value of the TTL 415 is counted down by a node apparatus every time the ad hoc frame 400 hops in the wired ad hoc network.

In this embodiment, the initial value of the TTL 415 (i.e., a value assigned by the node apparatus being the source identified by the value in the GS 412) is a value in which all bits in the two bytes are set to "1" (i.e., 65535). Since such a large value is set as the initial value of the TTL 415, this embodiment is preferably applicable to a wired ad hoc network including several hundred thousands of the node apparatuses. It is a matter of course that the initial value of the TTL 415 is arbitrary according to embodiments.

Designated in the two-byte length 416 is a value counting the length of a part other than the ad hoc header 410 (e.g., in the case of the ad hoc frame 400 exemplified in FIG. 3, the length of the Ethernet frame 420) in units of bytes.

Designated in the two-byte FCS (Frame Check Sequence) 417 is an error detecting code, such as a CRC (Cyclic Redundancy Check) code, acquired from the fields from the GD 411 to the length 416 in the ad hoc header 410.

The Ethernet frame 420 includes the following fields.

a six-byte MAC-DA (Media Access Control Destination Address) 421 a six-byte MAC-SA (Media Access Control Source Address) 422 a two-byte type/length 423 an L3 (Layer 3) packet 424 of a variable length from 46 to 1500 bytes a four-byte FCS 425

Since the format of the Ethernet frame 420 is well-known, detailed description thereof is omitted. However, described below is a specific example, for instance, in which a frame is transmitted from the PC 203 to the PC 205 via the wired ad hoc network 200 in the example in FIG. 2A.

That is, the PC 203 generates an Ethernet frame 420, in which the MAC address of the PC 205 is designated in the MAC-DA 421 and in which the MAC address of the PC 203 itself is designated in the MAC-SA 422, and transmits the Ethernet frame 420 to the node apparatus 100c via the link 214. The node apparatus 100c then prepends the ad hoc header 410 as described above to the Ethernet frame 420, thereby creating an ad hoc frame 400.

The ad hoc frame 400 is transmitted to the node apparatus 100g in the wired ad hoc network 200. The node apparatus 100g outputs the Ethernet frame 420, which is other than the ad hoc header 410, to the PC 205 via the link 228.

In a case where a value indicating the pause frame or another control frame is designated in the type 413 in the ad hoc header 410, the ad hoc frame includes a payload, which is other than the Ethernet frame 420 and which is in a prescribed format, subsequent to the ad hoc header 410.

Figure 4:
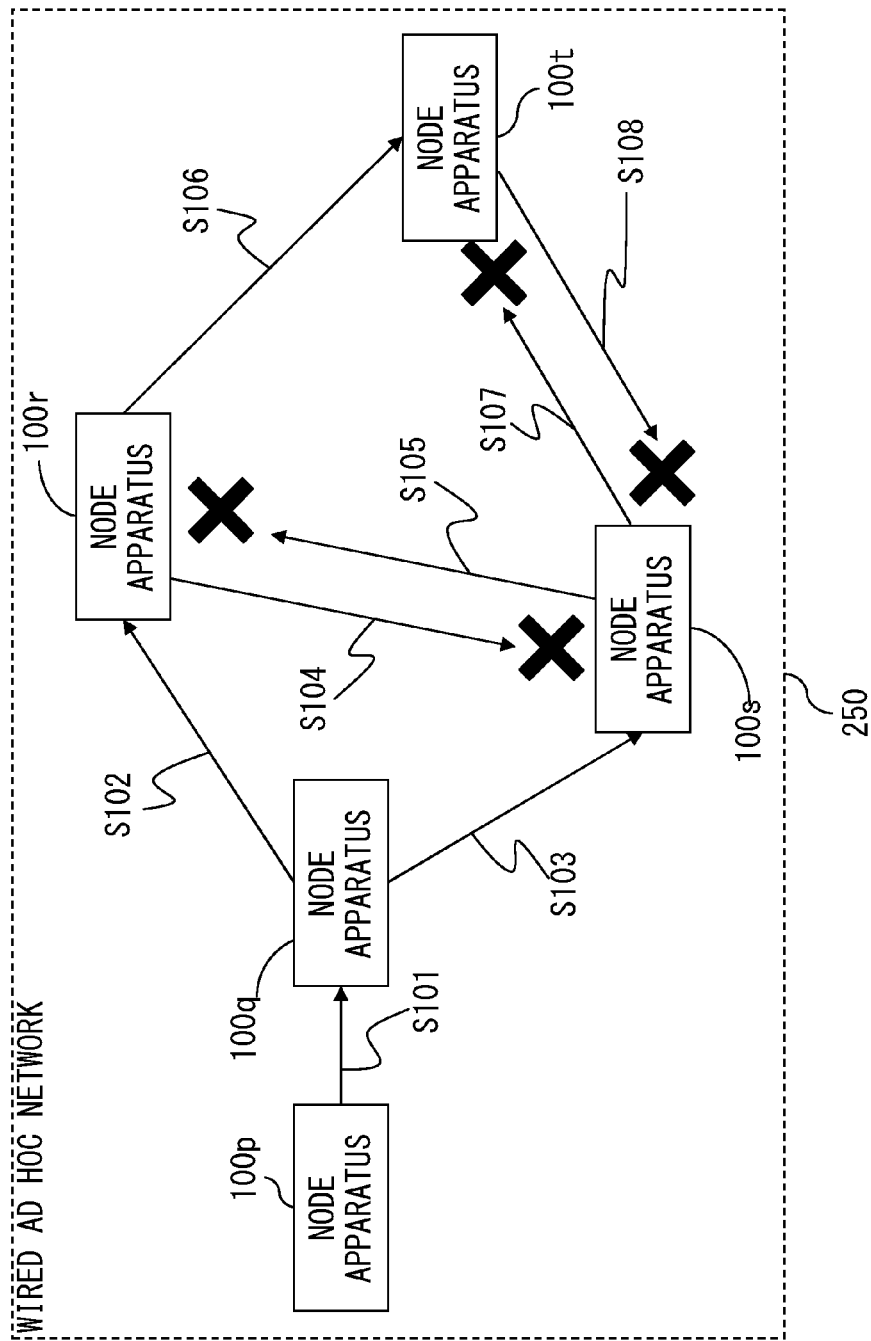
FIG. 4 is a diagram which explains that a broadcast frame is prevented from congestion.

Next described with reference to FIG. 4 is the behavior of the entire wired ad hoc network of this embodiment in a case where a broadcast frame is transmitted. FIG. 4 is a diagram which explains that the broadcast frame is prevented from congestion.

A wired ad hoc network 250 in FIG. 4 includes a plurality of node apparatuses 100p to 100t each including components analogous to those of the node apparatus 100 in FIG. 1. The node apparatuses in the wired ad hoc network 250 are physically connected as follows.

The node apparatus 100p is connected to the node apparatus 100q.

The node apparatus 100q is connected not only to the node apparatus 100p but also to the node apparatuses 100r and 100s.

The node apparatus 100r is connected not only to the node apparatus 100q but also to the node apparatuses 100s and 100t.

The node apparatus 100s is connected not only to the node apparatuses 100q and 100r but also to the node apparatus 100t.

The node apparatus 100t is connected to the node apparatuses 100r and 100s, as described above.

For instance, assume that a broadcast frame is transmitted from the node apparatus 100p in the wired ad hoc network 250 with the physical topology as described above. Note that the "broadcast frame" is an Ethernet frame or an ad hoc frame in which the broadcast address (i.e., an address, all of whose bits have a value of 1) is designated in the MAC-DA 421.

For instance, the node apparatus 100p is connected to an external device (such as a PC or a sensor), which is not illustrated in FIG. 4, via a general LAN port. This external device transmits an Ethernet frame 420, in which the broadcast address is designated in the MAC-DA 421, to the node apparatus 100p.

The node apparatus 100p then prepends an ad hoc header 410 to the Ethernet frame 420, thereby creating an ad hoc frame 400. The ad hoc frame 400 created here is a broadcast frame. The node apparatus 100p transmits the created ad hoc frame 400 to the node apparatus 100q in step S101 in order to broadcast it in the wired ad hoc network 250.

The node apparatus 100q then transmits the broadcast frame to the node apparatus 100r in step S102, and also transmits the broadcast frame to the node apparatus 100s in step S103.

The node apparatus 100r, having received the broadcast frame from the node apparatus 100q, in turn transmits the broadcast frame to the node apparatus 100s in step S104. However, since the node apparatus 100s has already received the broadcast frame from the node apparatus 100q in step S103, the node apparatus 100s discards the broadcast frame received from the node apparatus 100r in step S104.

More specifically, the node apparatus 100s stores the value of the MAC-SA 422 in the broadcast frame received in step S103 in the broadcast management table 104 in FIG. 1 in association with the time at which the reception process in step S103 was performed. Steps S103 and S104 are performed substantially simultaneously.

Accordingly, upon receipt of the broadcast frame in step S104, the node apparatus 100s searches the broadcast management table 104 using the value of the MAC-SA 422 in the received broadcast frame as a key and thereby acquires the associated time. In a case where the difference between the current time at which step S104 is performed and the acquired time is shorter than a prescribed time period, the node apparatus 100s discards the broadcast frame received in step S104.

As illustrated in step S105, the node apparatus 100s also transmits the broadcast frame received from the node apparatus 100q in step S103 to the node apparatus 100r. However, the node apparatus 100r has already received the broadcast frame from the node apparatus 100q in step S102, and has already transmitted the broadcast frame in step S104. Accordingly, the node apparatus 100r discards the broadcast frame received from the node apparatus 100s in step S105. The discarding by the node apparatus 100r is specifically realized as follows.

The node apparatus 100r has already transmitted the broadcast frame to the node apparatus 100s in step S104. Accordingly, the node apparatus 100r has an entry including the values of the GS 412 and the FID 414 in the broadcast frame, in the loop detection table 105 in FIG. 1.

In step S105, the node apparatus 100r searches the loop detection table 105 using the values of the GS 412 and the FID 414 of the broadcast frame received from the node apparatus 100s as search keys. The node apparatus 100r then verifies that the entry matching with the search keys exists. That is, the node apparatus 100r recognizes that the broadcast frame transmitted by the node apparatus 100r itself in step S104 loops in the wired ad hoc network 250 and returns to the node apparatus 100r itself. As a result of this recognition, in step S105, the node apparatus 100r discards the broadcast frame received from the node apparatus 100s.

In some embodiments, the transmission in step S105 may be performed before the reception in step S104. In this case, the node apparatus 100s discards the broadcast frame on the basis of the loop detection table 105.

Meanwhile, as illustrated as step S106, the node apparatus 100r transmits the broadcast frame received from the node apparatus 100q in step S102 also to the node apparatus 100t.

In addition, as illustrated as step S107, the node apparatus 100s transmits the broadcast frame received from the node apparatus 100q in step S103 also to the node apparatus 100t. However, the node apparatus 100t has already received the broadcast frame in step S106. Accordingly, in step S107, the node apparatus 100t refers to the broadcast management table 104 and discards the broadcast frame received from the node apparatus 100s, as with the node apparatus 100s in step S104.

Meanwhile, as illustrated as step S108, the node apparatus 100t transmits the broadcast frame received from the node apparatus 100r in step S106 to the node apparatus 100s. However, the node apparatus 100s has already transmitted the broadcast frame in steps S105 and S107. Accordingly, in step S108, the node apparatus 100s refers to the loop detection table 105 and discards the broadcast frame received from the node apparatus 100t, as with the node apparatus 100r in step S105.

In some embodiments, the reception in the step S108 may be performed before the transmission in the step S107. However, also in this case, since the node apparatus 100s has already transmitted the broadcast frame in step S105, the node apparatus 100s is capable of appropriately discarding the broadcast frame from the node apparatus 100t on the basis of the loop detection table 105.

As described above, according to this embodiment, each individual node apparatus appropriately refers to the broadcast management table 104 or the loop detection table 105, and determines whether to discard the received broadcast frame or not. In addition, each individual node apparatus transmits the broadcast frame to its adjacent node apparatuses only when not discarding the broadcast frame.

As a result, the broadcast frame is delivered to all the node apparatuses in the wired ad hoc network 250. Further, a situation in which the broadcast frame continues to loop endlessly in the wired ad hoc network 250 (i.e., congestion of the broadcast frame) is prevented. The prevention of the congestion is a result of the distributed coordination by the node apparatuses in the wired ad hoc network 250.

The overview of the distributed coordination in the wired ad hoc network including the plurality of node apparatuses each including components in FIG. 1 has been described as above with reference to FIGS. 2A to 4. Hereinafter, a specific configuration and a specific operation of the individual node apparatus to realize the distributed coordination as described above will be described in detail.

Figure 5:
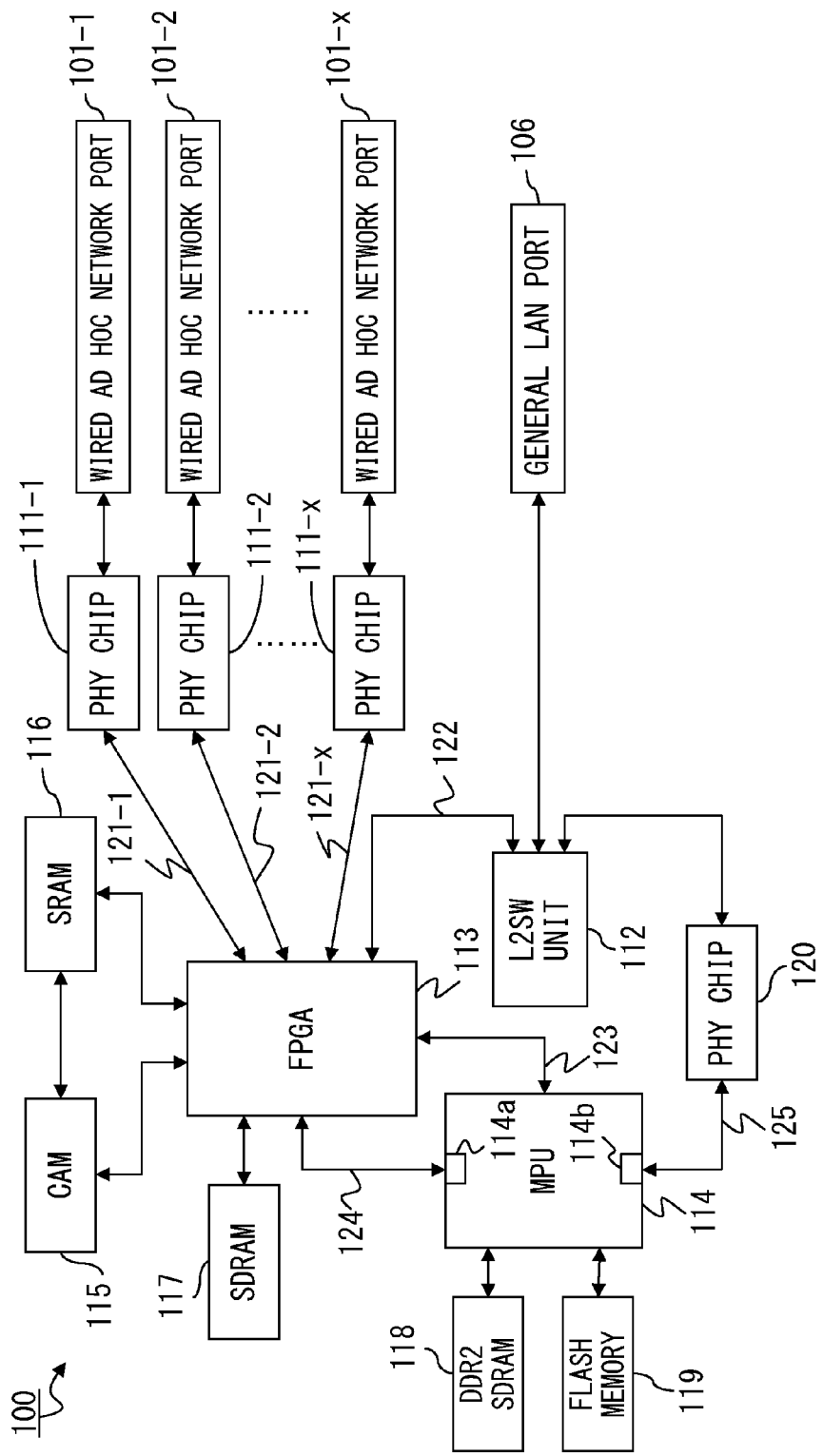
FIG. 5 is a hardware configuration diagram of the node apparatus.

FIG. 5 is a hardware configuration diagram of the node apparatus. FIG. 5 illustrates a specific example of a hardware configuration for realizing the node apparatus 100 in FIG. 1.

The node apparatus 100 in FIG. 5 includes a plurality of wired ad hoc network ports 101-1 to 101-x (which are simply referred to as "ports" in FIG. 1) for wired connection to adjacent node apparatuses, which are not illustrated in FIG. 5. The node apparatus 100 in FIG. 5 also includes a general LAN port 106 that is analogous to the general LAN ports 106a to 106i exemplified in FIG. 2A and that is for wired connection to an external device (such as a PC, an L2SW, or a sensor), which is not illustrated in FIG. 5.

Further, the node apparatus 100 in FIG. 5 includes a plurality of PHY (PHYsical layer) chips 111-1 to 111-x connected to the respective wired ad hoc network ports 101-1 to 101-x. The node apparatus 100 also includes an L2SW (Layer 2 Switch) unit 112 connected to the general LAN port 106.

In addition, the node apparatus 100 includes an FPGA (Field Programmable Gate Array) 113 that realizes the routing engine 102 in FIG. 1, and further includes an MPU (MicroProcessing Unit) 114 and various types of storage devices.

More specifically, the node apparatus 100 includes a CAM (Content Addressable Memory) 115, an SRAM (Static Random Access Memory) 116, and an SDRAM (Synchronous Dynamic Random Access Memory) 117, which are accessible from the FPGA 113. In this embodiment, an address acquired as a result of searching the CAM 115 is an address of the SRAM 116. The routing table 103, the broadcast management table 104, and the loop detection table 105 in FIG. 1 are realized by the CAM 115 and the SRAM 116 in this embodiment.

The node apparatus 100 further includes a DDR (Double Data Rate) 2 SDRAM 118 and a flash memory 119, which are accessible from the MPU 114. Stored in the flash memory 119, which is a type of nonvolatile memories, are, for instance, the node ID of the node apparatus 100 itself, the MAC address of the node apparatus 100 itself, a firmware program(s) executed by the MPU 114, and the like. The DDR2 SDRAM 118 is used as a working area when the MPU 114 executes the firmware program(s).

The node apparatus 100 further includes a PHY chip 120 connected to the L2SW unit 112.

The respective PHY chips 111-1 to 111-x are connected to the FPGA 113 by respective MIIs (Media Independent Interfaces) 121-1 to 121-x, which are interfaces between the physical layer and the MAC sublayer. The L2SW unit 112 and the FPGA 113 are also connected by an MII 122.

The FPGA 113 and the MPU 114 are connected by a PCI (Peripheral Component Interconnect) bus 123 and also by an MII 124. The PHY chip 120 connected to the L2SW unit 112 is also connected to the MPU 114 by an MII 125.

In this embodiment, an internal connection port 114a of the MPU 114 connected to the FPGA 113 by the MII 124 and an internal connection port 114b of the MPU 114 connected to the PHY chip 120 by the MII 125 are assigned respective MAC addresses.

The frame forwarding paths within the node apparatus 100 are various, as described as follows.

(1) A frame received from the wired ad hoc network port 101-*i* (1≤i≤x) is inputted into the FPGA 113 via the PHY chip 111-*i* and the MII 121-*i*. The frame is then outputted from the FPGA 113 to the PHY chip 111-*j* (1≤j≤x) via the MII 121-*j*, and transmitted from the wired ad hoc network port 101-*j*.

(2) A frame received from the wired ad hoc network port 101-*i* (1≤i≤x) is inputted into the FPGA 113 via the PHY chip 111-*i* and the MII 121-*i*. The frame is then outputted to the L2SW unit 112 via the MII 122, and transmitted from the general LAN port 106.

(3) A frame received from the wired ad hoc network port 101-*i* (1≤i≤x) is inputted into the FPGA 113 via the PHY chip 111-*i* and the MII 121-*i*. The frame is then outputted to the MPU 114 via the MII 124, and processed in the MPU 114.

(4) A frame received from the general LAN port 106 is inputted into the FPGA 113 via the L2SW unit 112 and the MII 122. The frame is then outputted from the FPGA 113 to the PHY chip 111-*j* (1≤j≤x) via the MII 121-*j*, and transmitted from the wired ad hoc network port 101-*j*.

(5) A frame received from the general LAN port 106 is inputted into the MPU 114 via the L2SW unit 112, the PHY chip 120, and the MII 125, and processed in the MPU 114.

(6) The MPU 114 generates a frame and outputs it to the FPGA 113 via the MII 124. The frame is then outputted from the FPGA 113 to the PHY chip 111-*j* (1≤j≤x) via the MII 121-*j*, and transmitted from the wired ad hoc network port 101-*j*.

(7) The MPU 114 generates a frame and outputs it to the PHY chip 120 via the MII 125. The frame is then outputted from the PHY chip 120 to the L2SW unit 112 and further transmitted from the general LAN port 106.

Note that it is possible for the L2SW unit 112 to learn the MAC address of the internal connection port 114*b* of the MPU 114 from the frame received through the forwarding path (7). Accordingly, if the value of the MAC-DA 421 in a frame received from the general LAN port 106 is identical with the MAC address of the internal connection port 114*b*, the L2SW unit 112 outputs the frame to the PHY chip 120 through the above described forwarding path (5). On the other hand, if the value of the MAC-DA 421 of a frame received from the general LAN port 106 is different from the MAC address of the internal connection port 114*b*, the L2SW unit 112 outputs the frame to the FPGA 113 through the above described forwarding path (4).

Next, functions of the node apparatus 100 including various pieces of hardware in FIG. 5 will be described.

Figure 6:
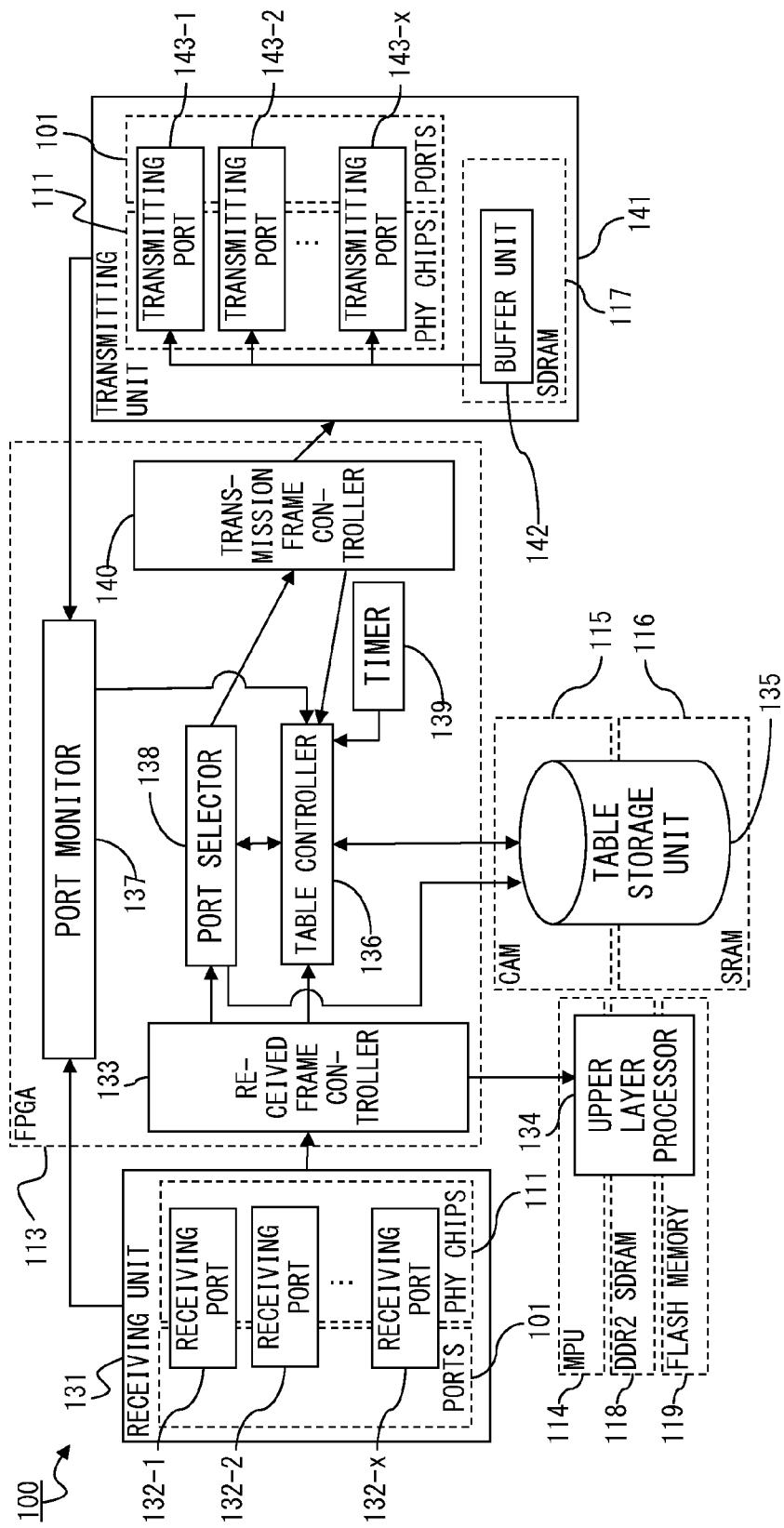
FIG. 6 is a functional configuration diagram of the node apparatus.

FIG. 6 is a functional configuration diagram of the node apparatus. In FIG. 6, relationships between functional blocks and the hardware in FIG. 5 are indicated by broken lines, and parts pertaining to the general LAN port 106 are omitted.

As illustrated in FIG. 6, the node apparatus 100 includes a receiving unit 131 to receive the ad hoc frame 400. More specifically, the receiving unit 131 includes a plurality of receiving ports 132-1 to 132-*x* to respectively receive the ad hoc frames 400 from a plurality of node apparatuses (not illustrated in FIG. 6) adjacent to the node apparatus 100.

The i-th receiving port 132-*i* (1≤i≤x) is realized by the wired ad hoc network port 101-*i* and the PHY chip 111-*i*. In FIG. 6, for convenience of illustration, the wired ad hoc network ports 101-1 to 101-*x* are collectively represented as "ports 101", and the PHY chips 111-1 to 111-*x* are collectively represented as "PHY chips 111".

The node apparatus 100 also includes a received frame controller 133 that classifies the ad hoc frame 400 received by the receiving unit 131 according to information such as a type and/or a destination.

The node apparatus 100 further includes an upper layer processor 134 that processes the ad hoc frame 400 addressed to the node apparatus 100 itself. The "upper layer" means a layer higher than the MAC sublayer, on which the ad hoc frame 400 is defined.

If the value of GD 411 in the ad hoc frame 400 received by the receiving unit 131 is identical with the node ID of the node apparatus 100 itself, the received frame controller 133 outputs the ad hoc frame 400 to the upper layer processor 134. The upper layer processor 134 then extracts the Ethernet frame 420 from the ad hoc frame 400 and processes the Ethernet frame 420. The upper layer processor 134 is realized by the MPU 114, the DDR2 SDRAM 118, and the flash memory 119.

Figure 8:
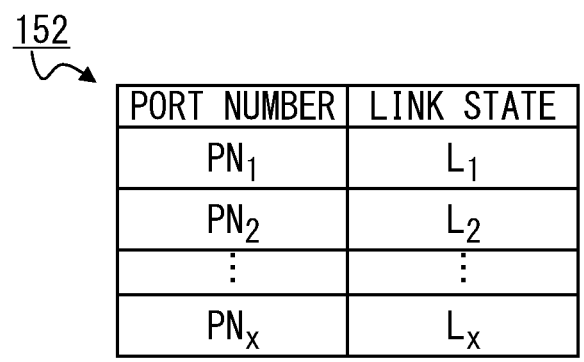
FIG. 8 is a diagram which illustrates an example of a port link state table.

The node apparatus 100 also includes a table storage unit 135 realized by the CAM 115 and the SRAM 116. Stored in the table storage unit 135 are the routing table 103, the broadcast management table 104, and the loop detection table 105 in FIG. 1. Tables that will be described later with reference to FIGS. 7 to 9 are also stored in the table storage unit 135.

The node apparatus 100 further includes a table controller 136 that controls the contents of the various tables by creating, updating, and deleting entries in the various tables stored in the table storage unit 135. More specifically, the table controller 136 is capable of searching the CAM 115 and accessing the address of the SRAM 116 acquired as the search result.

The node apparatus 100 further includes a port monitor 137, a port selector 138, a timer 139, and a transmission frame controller 140 (functions of these elements will be described later).

The table controller 136 controls the contents of the various tables according to control information provided from the received frame controller 133, the port monitor 137, the port selector 138, the timer 139, and the transmission frame controller 140. Specific control will be described later with reference to flowcharts of FIGS. 11A to 20.

In this embodiment, the received frame controller 133, the table controller 136, the port monitor 137, the port selector 138, the timer 139, and the transmission frame controller 140 are realized by the FPGA 113.

The node apparatus 100 further includes a transmitting unit 141 to transmit the ad hoc frame 400.

More specifically, the transmitting unit 141 includes a buffer unit 142 to buffer the ad hoc frame 400. For instance, the buffer unit 142 may be realized by the SDRAM 117. In the buffer unit 142, there may be areas segmented corresponding to respective transmitting ports 143-1 to 143-*x*.

In some embodiments, the receiving unit 131 may further include another buffer unit for reception.

The transmitting unit 141 also includes a plurality of transmitting ports 143-1 to 143-*x* to each transmit the ad hoc frame 400 to a node apparatus (not illustrated in FIG. 6) adjacent to the node apparatus 100. The transmitting ports 143-1 to 143-*x* each read out the ad hoc frame 400 buffered in the buffer unit 142 and transmit the read-out ad hoc frame 400 to the adjacent node apparatus, which is not illustrated in FIG. 6.

The i-th transmitting port 143-*i* (1≤i≤x) is realized by the wired ad hoc network port 101-*i* and the PHY chip 111-*i*. That is, common pieces of hardware realize the receiving port 132-*i* and the transmitting port 143-*i*.

Described next are functions of the port monitor 137, the port selector 138, the timer 139, and the transmission frame controller 140, description of which has been omitted above.

The port monitor 137 monitors the respective states of the receiving ports 132-1 to 132-x in the receiving unit 131, the buffer unit 142 in the transmitting unit 141, and the transmitting ports 143-1 to 143-x in the transmitting unit 141.

For instance, the PHY chip 111-i may detect whether the link connected to the wired ad hoc network port 101-i is down or not, and may output the detection result to the FPGA 113 (or to a prescribed register accessible from the FPGA 113, for instance). The port monitor 137 realized by the FPGA 113 monitors the detection result outputted from the PHY chip 111-i and thereby monitors whether the receiving port 132-i and the transmitting port 143-i are in the link-down state or not.

The port monitor 137 also monitors whether the frames are excessively concentrated in the node apparatus 100 or not, i.e., whether the node apparatus 100 is in the busy state or not, by monitoring the usage percentage of the buffer unit 142.

The port selector 138 refers to the tables stored in the table storage unit 135, and selects the destination port of the frame outputted from the received frame controller 133. The port selector 138 then gives the transmission frame controller 140 an instruction on the selected port, and outputs the frame to the transmission frame controller 140.

The port selector 138 is capable of acquiring an address of the SRAM 116 by causing the table controller 136 to search the CAM 115, and is capable of directly accessing the SRAM 116 using the acquired address to refer to or update data.

The timer 139 notifies the table controller 136 of time information that is used for aging each entry in the various tables.

The transmission frame controller 140 outputs the frame to the buffer unit 142. The transmission frame controller 140 also performs control for transmitting the frame stored in the buffer unit 142 from the transmitting port (one of the transmitting ports 143-1 to 143-x) selected by the port selector 138.

The hardware configuration and functional block configuration of the node apparatus 100 have been described above with reference to FIGS. 5 and 6. Next, other data not illustrated in FIG. 1 will be described with reference to FIGS. 7 to 10.

FIG. 7 is a diagram which illustrates an example of a pause state table. The pause state table 151 in FIG. 7 is stored in, for instance, the table storage unit 135 in FIG. 6. The detailed processing pertaining to the pause state table 151 will be described later with reference to FIGS. 11A and 16.

The pause state table 151 includes "x" number of entries corresponding to the "x" number of ports 101-1 to 101-x, respectively. For instance, in the entry corresponding to the i-th (1≤i≤x) port 101-i, the following three pieces of information are associated with each other.

the port number $PN_i$ of the port 101-i as identification information for identifying the port 101-i a pause state $PS_i$ indicating whether or not the pause request has been received from the adjacent node apparatus that is directly connected via the port 101-i a counter $Count_i$ The value of the pause state $PS_i$ is "P" (Pause) in a case where the pause request has been received from the adjacent node apparatus that is directly connected via the port 101-i and the time period designated in the pause request has not elapsed yet.

On the other hand, the value of the pause state $PS_i$ is "N" (Normal) in a case where the pause request has not been received from the adjacent node apparatus that is directly connected via the port 101-i. In addition, the value of the pause state $PS_i$ turns into "N" when a notification of canceling the pause request is received, and the value of the pause state $PS_i$ also turns into "N" after the time period designated in the pause request has elapsed. Since the pause state $PS_i$ is binary, it can be represented in one bit.

When the pause request is received from the adjacent node apparatus that is directly connected via the port 101-i, the counter $Count_i$ is set to a value designated in the pause frame and then counted down thereafter.

FIG. 8 is a diagram which illustrates an example of a port link state table. The port link state table 152 in FIG. 8 is stored in, for instance, the table storage unit 135 in FIG. 6. The detailed processing pertaining to the port link state table 152 will be described later with reference to FIG. 20.

The port link state table 152 includes "x" number of entries corresponding to the "x" number of ports 101-1 to 101-x, respectively. For instance, in the entry corresponding to the i-th (1≤i≤x) port 101-i, the port number $PN_i$ of the port 101-i and a link state $L_i$, which indicates whether the link connected to the port 101-i is in a communicable state or not, are associated with each other.

If the link connected to the port 101-i is in the communicable state, the value of the link state $L_i$ is "C" (Connected). If the link connected to the port 101-i is down and not in the communicable state, the value of the link state $L_i$ is "D" (Down). Since the link state $L_i$ is binary, it can be represented in one bit.

FIG. 9 is a diagram which illustrates an example of a MAC table. The MAC table 153 in FIG. 9 is stored in, for instance, the table storage unit 135 in FIG. 6.

One entry in the MAC table 153 corresponds to one node apparatus in the wired ad hoc network. FIG. 9 exemplifies the MAC table 153 including "b" number of entries. For instance, in the i-th (1≤i≤b) entry in the MAC table 153, the following two pieces of information are associated with each other.

a MAC address $MAC_i$ of an external device (e.g., a PC, a sensor, etc.) connected to a certain node apparatus in the wired ad hoc network.

an $NID_i$ being a node ID that is unique in the wired ad hoc network and that is assigned to the above-mentioned node apparatus connected with the above-mentioned external device with the MAC address $MAC_i$.

When receiving the ad hoc frame 400, the node apparatus 100 learns the pair of the MAC-SA 422 and the GS 412.

More specifically, the table controller 136 judges whether an entry matching with the values of the MAC-SA 422 and the GS 412 in the received ad hoc frame 400 exists in the MAC table 153 or not. If the entry matching with the values of the MAC-SA 422 and the GS 412 does not exist, the table controller 136 creates a new entry associating the value of the MAC-SA 422 and the value of the GS 412 with each other, and adds the new entry to the MAC table 153.

In addition, when receiving the Ethernet frame 420 from a first external device connected via the general LAN port 106, the node apparatus 100 searches the MAC table 153 using the value of the MAC-DA 421 as a search key.

If an entry is found as a result of the search, the node apparatus 100 creates the ad hoc header 410 in which the value of the node ID included in the found entry is set in the GD 411, and prepends the ad hoc header 410 to the Ethernet frame 420. More specifically, the node apparatus 100 sets, in the GD 411, the node ID of another node apparatus that is in the wired ad hoc network and that is connected to a second external device identified by the value of the MAC-DA 421.

For instance, when a frame is transmitted from the PC 203 to the PC 205 in the example in FIG. 2A, the node apparatus 100b on the transmission route in the wired ad hoc network 200 learns the MAC table 153 as follows.

In the above example, in the ad hoc frame 400 received by the node apparatus 100b from the node apparatus 100c, the MAC address of the PC 203 is designated in the MAC-SA 422 and the node ID of the node apparatus 100c is designated in the GS 412. Accordingly, the node apparatus 100b learns the association between the MAC address of the PC 203 and the node ID of the node apparatus 100c, and adds an entry to the MAC table 153 as necessary.

Meanwhile, assume that the node apparatus 100b receives a new Ethernet frame 420 addressed to the PC 203, for instance from the PC 201 via the L2SW 202, after the above learning. The node apparatus 100b then searches the MAC table 153 using the value of the MAC-DA 421 in the new Ethernet frame 420 as a search key.

That is, the node apparatus 100b searches the MAC table 153 using the MAC address of the PC 203 as the search key. As a result, the node apparatus 100b acquires the node ID of the node apparatus 100c, which is in the wired ad hoc network 200 and which is connected to the PC 203. Accordingly, the node apparatus 100b generates an ad hoc header 410 in which the node ID of the node apparatus 100c is designated in the GD 411, and prepends the ad hoc header 410 to the new Ethernet frame 420, thereby generating a new ad hoc frame 400. The node apparatus 100b then transmits the new ad hoc frame 400.

The node apparatus 100c may operate for instance as follows, if it receives the Ethernet frame 420 addressed to the PC 205 from the PC 203 before learning the association between the MAC address of the PC 205 and the node ID of the node apparatus 100g.

That is, the node apparatus 100c may broadcast, into the wired ad hoc network 200, an ad hoc frame that is used for inquiring a node ID and that includes an ad hoc header 410 in which a prescribed value to indicate broadcasting is designated in the GD 411. The payload of the ad hoc frame used for inquiring the node ID includes the MAC address of the PC 205.

Due to the distributed coordination mechanism exemplified in FIG. 4, the ad hoc frame used for inquiring the node ID is not congested in the wired ad hoc network 200.

The node apparatus 100g, which receives the inquiry by the frame having been broadcast in the wired ad hoc network 200, replies to the node apparatus 100c. That is, the node apparatus 100g returns a special ad hoc frame for control use and for notification of the association between the MAC address of the PC 205 and the node ID of the node apparatus 100g. As a result, the node apparatus 100c learns the association between the MAC address of the PC 205 and the node ID of the node apparatus 100g from the returned ad hoc frame, and adds an entry to the MAC table 153.

FIG. 10 is a diagram which illustrates an example of pause state management data. The pause state management data 154 in FIG. 10 is managed by the port monitor 137 in FIG. 6, and used for controlling pause requests and notifications of canceling the pause requests that are from the node apparatus 100 itself to its adjacent node apparatuses. The detailed processing pertaining to the pause state management data 154 will be described later with reference to FIGS. 17 to 19.

As illustrated in FIG. 10, the pause state management data 154 includes a pause state SS, a counter SCount, and a pause start time StartTime.

The value of the pause state SS is "P" (Pause) in a case where the node apparatus 100 itself is in the busy state, and "N" (Normal) in a case where the node apparatus 100 itself is not in the busy state. For instance, the port monitor 137 monitors the usage percentage of the buffer unit 142. If the usage percentage of the buffer unit 142 exceeds a prescribed threshold, the port monitor 137 may judges that the node apparatus 100 itself is in the busy state, and may set the value of the pause state SS to "P".

A value that is to be designated in the pause frames when the node apparatus 100 itself transmits the pause requests to other node apparatuses is set in the counter SCount. That is, the length of a time period during which the node apparatus 100 itself requests its adjacent node apparatuses to pause transmission of frames is set in the counter SCount.

The port monitor 137 may arbitrarily set the value of the counter SCount. Depending on the embodiments, the port monitor 137 may set a predetermined constant value in the counter SCount, or may set a value of a parameter, which is variable depending on the usage percentage of the buffer unit 142, in the counter SCount.

A time at which the node apparatus 100 itself transmits the pause requests to the adjacent node apparatuses is set as the pause start time StartTime.

The configuration of the node apparatus 100 and various data structures have been described as above. Hereinafter, detailed operation of the node apparatus 100 will be described with reference to flowcharts.

FIGS. 11A to 11D are flowcharts which explain a routing process. As represented as an infinite loop in the flowcharts in FIGS. 11A to 11D, the FPGA 113 continues to execute processing in FIGS. 11A to 11D while the power of the node apparatus 100 is being turned on.

When the power of the node apparatus 100 is turned on, initialization is performed in step S201. For instance, the MPU 114 may read out the node ID of the node apparatus 100 itself from the flash memory 119, then may store it in the DDR2 SDRAM 118, and may output it to the FPGA 113. In addition, the table controller 136 may initialize the various tables in step S201.

For instance, since nothing is learned at the time of step S201, the routing table 103, the broadcast management table 104, the loop detection table 105, and the MAC table 153 are initialized into a state with no entry. The table controller 136 may also set the pause state $PS_i$ to "N" and may set the counter $Count_i$ to zero in each entry ($1 \le i \le x$) in the pause state table 151. Further, the table controller 136 may set the link state $L_i$ to "C" in each entry ($1 \le i \le x$) in the port link state table 152.

In addition, the port monitor 137 may initialize the pause state management data 154 in step S201. For instance, the port monitor 137 may set the pause state SS to "N" and may set the counter SCount to zero.

Subsequently, in step S202, the node apparatus 100 waits until a frame is received from any of the ports 101-1 to 101-x.

In step S202, if the frame is received from, for instance, the port 101-r ($1 \le r \le x$), the frame is outputted from the receiving port 132-r to the received frame controller 133 as illustrated in FIG. 6. Further, the received frame controller 133 instructs the table controller 136 to perform learning of the MAC table 153, which is described pertaining to FIG. 9, and the table controller 136 performs the learning of the MAC table 153. Then, the processing proceeds to step S203.

In step S203, the received frame controller 133 judges whether the frame received in step S202 is a pause frame or not on the basis of the type 413 in the received frame. If the frame received in step S202 is the pause frame, the processing proceeds to step S204. If the frame received in step S202 is not the pause frame, the processing proceeds to step S207.

In step S204, the received frame controller 133 judges whether the value of the pause counter designated in the received pause frame is zero or not. If the value of the pause counter is zero, the processing proceeds to step S205. If the value of the pause counter is not zero, the processing proceeds to step S206.

Step S205 is executed in a case where the value of the pause counter is zero, that is, in a case where cancellation of a pause request is notified. More specifically, in step S205, the received frame controller 133 instructs the table controller 136 to cancel the pause state corresponding to the port from which the pause frame has been received in step S202 and to clear the counter. The table controller 136 then operates according to the instruction.

For instance, in a case where the pause frame is received from the wired ad hoc network port 101-$r$ (1≤r≤x) in step S202, the table controller 136 operates, in step S205, according to the instruction of the received frame controller 133 as follows.

That is, the table controller 136 sets the pause state $PS_r$ and the counter $Count_r$, which are associated with the port number $PN_r$ of the wired ad hoc network port 101-$r$, to "N" and zero, respectively, in the pause state table 151 in FIG. 7. Then, the processing returns to step S202.

On the other hand, step S206 is executed in a case where the value of the pause counter is not zero, that is, in a case where a new pause request or a pause extension request is received.

Note that the pause extension request is a type of pause requests. In a case where a node apparatus having previously issued a first pause request continues to be in the busy state even after the time period designated in a pause frame indicating the first pause request has elapsed, this node apparatus may issue a second pause request again instead of notifying cancellation of the first pause request. The second pause request is the pause extension request.

More specifically, in step S206, the received frame controller 133 instructs the table controller 136 to set the pause state corresponding to the port from which the pause frame has been received in step S202 to "P" and to set the counter according to the pause frame. The table controller 136 then operates according to the instruction.

For instance, in a case where the pause frame is received from the wired ad hoc network port 101-$r$ (1≤r≤x) in step S202, the table controller 136 operates, in step S206, as follows according to the instruction of the received frame controller 133.

That is, the table controller 136 sets the pause state $PS_r$, which is associated with the port number $PN_r$ of the wired ad hoc network port 101-$r$ in the pause state table 151 in FIG. 7, to "P". The table controller 136 also sets the counter $Count_r$, which is associated with the port number $PN_r$ in the pause state table 151 in FIG. 7, to the value designated in the pause frame received in step S202. Then, the processing returns to step S202.

Step S207 is executed in a case where a frame whose type is other than the pause frame is received in step S202. In step S207, the received frame controller 133 judges whether the frame received in step S202 is a broadcast frame or not.

Figure 11A:
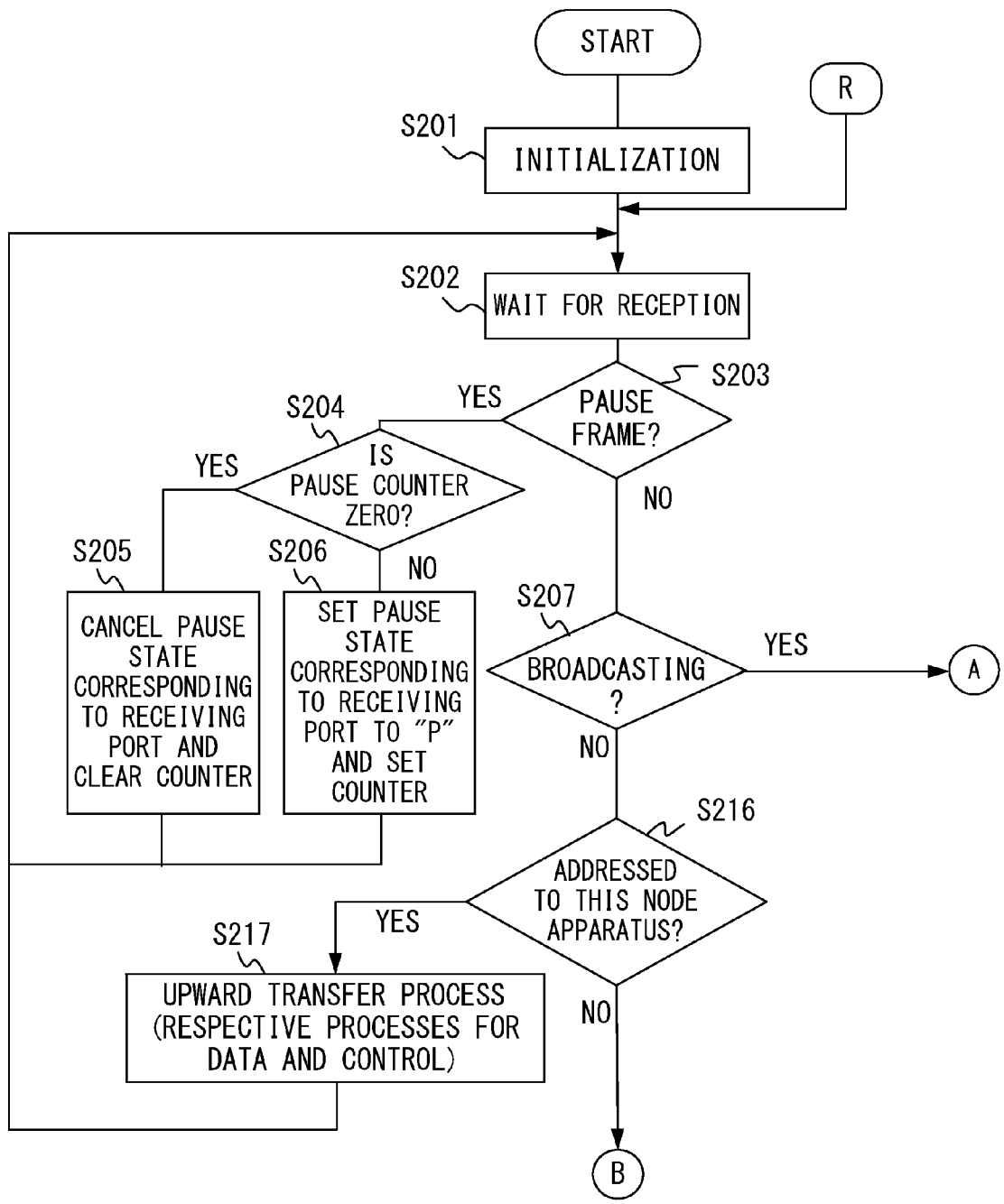
FIG. 11A is a flowchart (No. 1) which explains a routing process.
Figure 11B:
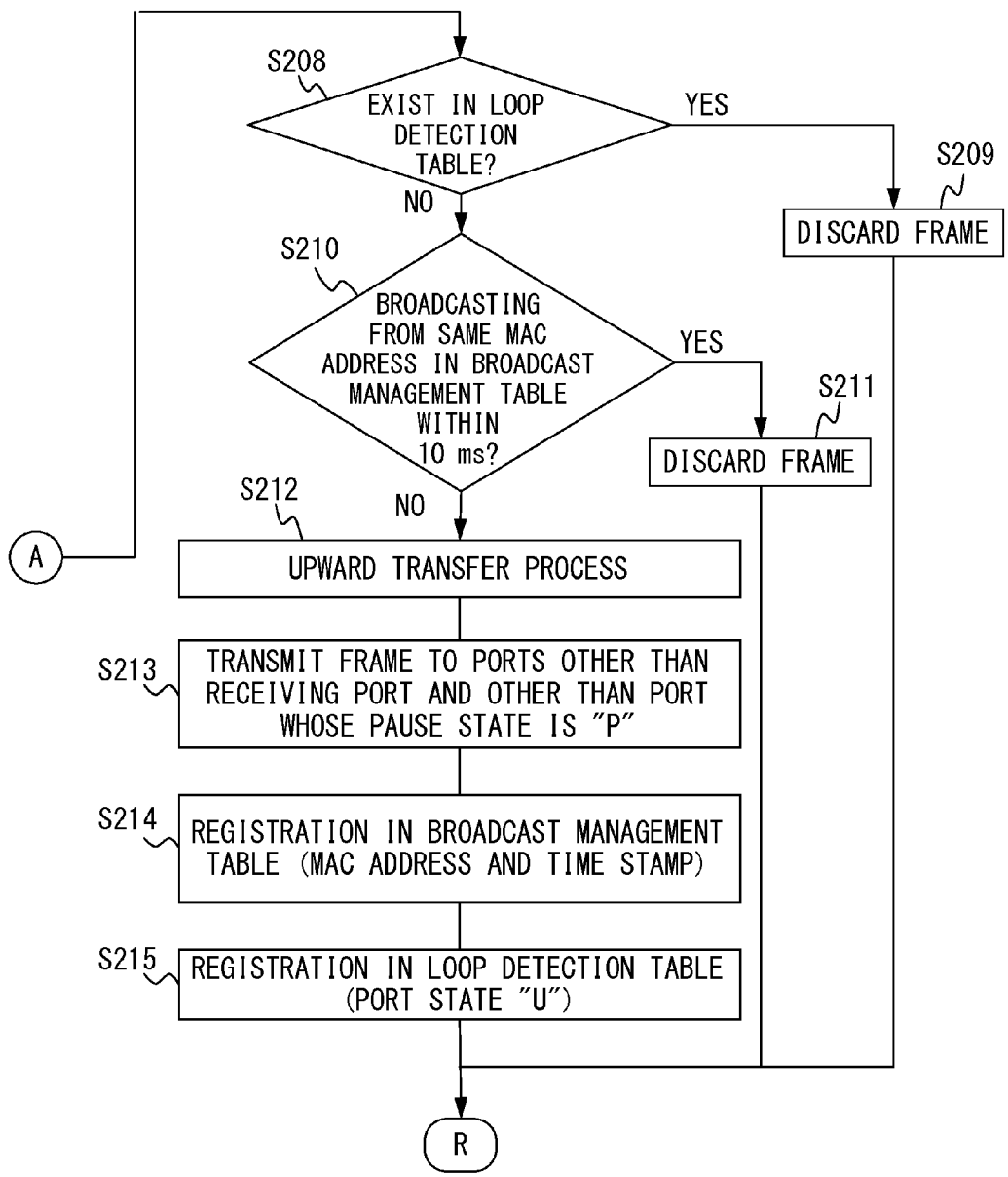
FIG. 11B is a flowchart (No. 2) which explains the routing process.

More specifically, if the MAC-DA 421 is the broadcast address (i.e., the address in which every bit is "1"), the received frame controller 133 judges that the received frame is the broadcast frame, and then the processing proceeds to step S208 in FIG. 11B. On the other hand, if the MAC-DA 421 is not the broadcast address, the processing proceeds to step S216 in FIG. 11A.

Steps S208 to S215 illustrated in FIG. 11B are processes for a case where the broadcast frame is received in step S202.

In step S208, the received frame controller 133 judges whether an entry corresponding to the frame received in step S202 exists in the loop detection table 105 or not. That is, the received frame controller 133 searches, via the table controller 136, the loop detection table 105 using the pair of the values of the GS 412 and the FID 414 in the frame received in step S202 as search keys.

If an entry whose source $GS_i$ is identical with the value of the GS 412 and whose $FID_i$ is identical with the value of the FID 414 is found as a result of the search (1≤i≤m), the processing proceeds to step S209. On the other hand, if the entry above is not found as a result of the search, the processing proceeds to step S210.

Note that no more than one entry as described above exists, even if it exists.

Step S209 is executed in a case where it is apparent that a broadcast frame having previously been transmitted from the node apparatus 100 is received in the node apparatus 100 again. Accordingly, in step S209, the received frame controller 133 discards the frame received in step S202. Then, the processing returns to step S202. The operation of the node apparatus 100$r$ in step S105 and the operation of the node apparatus 100$s$ in step S108, as in the example in FIG. 4, correspond to step S209.

In step S210, the received frame controller 133 searches the broadcast management table 104 via the table controller 136. According to the search, the received frame controller 133 judges whether the frame received in step S202 is one that is received again due to broadcasting from the same MAC address in the broadcast management table 104 within a prescribed time period (e.g., 10 ms).

More specifically, the received frame controller 133 searches, via the table controller 136, the broadcast management table 104 using the value of the MAC-SA 422 in the frame received in step S202 as a search key. If an entry in which a time that differs from the current time by the prescribed time period (10 ms in this embodiment) or less is associated with the search key is found as a result of the search, the processing proceeds to step S211. On the other hand, if the entry above is not found as a result of the search, the processing proceeds to step S212.

Step S211 is executed in a case where a broadcast frame having recently (within the time period of 10 ms in this embodiment) been received by the node apparatus 100 is received again by the node apparatus 100. Accordingly, in step S211, the received frame controller 133 discards the frame received in step S202. Then, the processing returns to step S202. The operation of the node apparatus 100$s$ in step S104 and the operation of the node apparatus 100$t$ in step S107, as in the example in FIG. 4, correspond to step S211.

In a case where the entry is not found in the broadcast management table 104 as a result of the search in step S210, the received frame controller 133 judges that it is not the case that a broadcast frame identical to one that has previously been received is received again in step S202. Accordingly, in step S212, an upward transfer process is performed.

That is, in step S212, the received frame controller 133 outputs the frame to the upper layer processor 134 and then the upper layer processor 134 processes the frame. Described in line with FIG. 5, in step S212, the frame is outputted from the FPGA 113 to the MPU 114 via the MII 124 and the frame is processed by the MPU 114.

Next, in step S213, the received frame controller 133 instructs the port selector 138 to perform broadcasting into the wired ad hoc network, and outputs the frame to the port selector 138. Then, in step S213, the port selector 138 selects all the ports satisfying both of the following two conditions from among the ports 101-1 to 101-x as the destination ports.

Not being the receiving port (i.e., the port having received the broadcast frame in step S202).

The pause state in the pause state table 151 in FIG. 7 is not "P" (i.e., the pause state is "N").

Instead, in some embodiments, the port selector 138 may further narrow down the destination ports according to a condition that the link state is "C" in the port link state table 152 in FIG. 8.

The port selector 138 gives the transmission frame controller 140 an instruction on the ports selected from among the ports 101-1 to 101-x (i.e., the transmitting ports selected from among the transmitting ports 143-1 to 143-x), and outputs the frame to the transmission frame controller 140. Note that the number of the selected ports may be zero, one, or plural.

The transmission frame controller 140 generates anew ad hoc header 410 by decrementing the value of the TTL 415 in the received frame by one and recalculating the FCS 417, and outputs an ad hoc frame 400 including the new ad hoc header 410 to the buffer unit 142. Then, the transmission frame controller 140 performs control for transmitting the ad hoc frame 400, which is buffered in the buffer unit 142, from the transmitting ports selected from among the transmitting ports 143-1 to 143-x.

As described above, in step S213, the frame is transmitted from the transmitting ports selected from among the transmitting ports 143-1 to 143-x. Then, the processing proceeds to step S214.

In step S214, the received frame controller 133 registers an entry corresponding to the broadcast frame received in step S202 in the broadcast management table 104 via the table controller 136. That is, the entry, in which the value of the MAC-SA 422 in the broadcast frame received in the step S202 and the current time (i.e., the time stamp) acquired from the timer 139 are associated with each other, is added to the broadcast management table 104 in step S214.

Then in step S215, the port selector 138 registers a new entry in the loop detection table 105 via the table controller 136 according to the selection result in step S213.

The new entry, which is registered in step S215, is as follows. For instance, assume that the ad hoc frame 400 is received from the port 101-r (1≤r≤x) in step S202. In this case, a new entry associating the pair of the values of the GS 412 and the FID 414 in the received ad hoc frame 400 with the port number of the port 101-r and the states of the respective ports 101-1 to 101-x is added to the loop detection table 105 in step S215. Assuming that the new entry is the (m+1)-th entry in the loop detection table 105, the state $LP_{i(m+1)}$ of the port 101-i (1≤i≤x) in the new entry is set as follows.

In a case where the port 101-i is selected as the destination port in step S213, the value of the state $LP_{i(m+1)}$ is U.

Otherwise, the value of the state $LP_{i(m+1)}$ is "E".

In some embodiments, the order of the processes of steps S212 to S215 may be changed, or steps S212 to S215 may be executed in parallel.

Here, in order to further clarify the meaning of the processes in steps S210 and S211, another specific example will further be described with reference to FIG. 2A.

For instance, there is a case where the PC 206 in FIG. 2A broadcasts an Ethernet frame 420 including an ARP (Address Resolution Protocol) packet as an L3 packet 424. In this case, the broadcast address is designated in the MAC-DA 421 in the Ethernet frame 420.

In the node apparatus 100h connected to the PC 206 being the source via the link 229, the Ethernet frame 420 that is the broadcast frame is provided with an ad hoc header 410 and thereby turns into an ad hoc frame 400. Here, the node ID of the node apparatus 100h is designated in the GS 412 in the ad hoc header 410, and a first FID generated by the node apparatus 100h is designated in the FID 414.

The ad hoc frame 400 being the broadcast frame is then broadcast from the node apparatus 100h to the wired ad hoc network 200. More specifically, the node apparatus 100h transmits (i.e., broadcasts) the ad hoc frame 400 from the respective ports 101h-1, 101h-3, and 101h-4.

Subsequently, the ad hoc frame 400 may reach the node apparatus 100b via, for instance, the links 223 and 217, and may further reach the node apparatus 100a from the node apparatus 100b via the link 216.

In this case, the node apparatus 100b executes step S212. As a result, the node apparatus 100b transmits the Ethernet frame 420, which results from removal of the ad hoc header 410 from the received ad hoc frame 400, to the L2SW 202 connected to the general LAN port 106b.

The L2SW 202, having received the Ethernet frame 420 being the broadcast frame from the node apparatus 100b, then broadcasts the received Ethernet frame 420. That is, the L2SW 202 transmits the Ethernet frame 420 to the PC 201 via the link 211 and also to the node apparatus 100a via the link 212.

Incidentally, as described above, the node apparatus 100a has received the ad hoc frame 400 from the port 101a-4 via the link 216 as a result of the broadcasting in the wired ad hoc network 200. In the node apparatus 100a, there is also a possibility that the ad hoc frame 400 is further received from the node apparatus 100d via the link 215.

In a case where the node apparatus 100a redundantly receives the ad hoc frame 400 being the broadcast frame from both the node apparatuses 100b and 100d in the wired ad hoc network 200, the frame received later is discarded in step S209. The discard in step S209 is enabled by the loop detection table 105. Step S209 prevents congestion of broadcast frames in the wired ad hoc network 200.

On the contrary, if the broadcast management table 104 did not exist, there would be a possibility that a broadcast frame having once passed through the L2SW 202 external to the wired ad hoc network 200 would return again into the wired ad hoc network 200, thus causing congestion. Accordingly, in this embodiment, the node apparatus 100 includes the broadcast management table 104.

If the broadcast management table 104 did not exist, the node apparatus 100a having received the ad hoc frame 400 from the node apparatus 100b or 100d by the broadcasting in the wired ad hoc network 200 would remove the ad hoc header 410 and would transmit the Ethernet frame 420 to the L2SW 202. The L2SW 202 would then transmit the Ethernet frame 420 being the broadcast frame to both the PC 201 and the node apparatus 100b.

Here, any Ethernet frame 420 received by the node apparatus 100b from the L2SW 202 does not include the ad hoc header 410. Accordingly, use of the loop detection table 105 does not enable the node apparatus 100b to recognize that the same Ethernet frame 420 as a broadcast frame that the node apparatus 100b itself has previously transmitted to the L2SW 202 is received again.

On the other hand, if the node apparatus 100b did broadcast the broadcast frame received from the L2SW 202 into the wired ad hoc network 200, the same Ethernet frame 420 would be broadcast again. Further, there would be a possibility that the same broadcast frame would continue to loop among the L2SW 202, the node apparatus 100b, and the node apparatus 100a. This is because the broadcast frame having once exited out of the wired ad hoc network 200 and then returned into the wired ad hoc network 200 is assigned a new FID every time it returns into the wired ad hoc network 200.

Accordingly, in order to prevent congestion, the node apparatus 100b is required to utilize information other than the loop detection table 105 and to judge identity between the Ethernet frames 420, which include no ad hoc header 410.

In this embodiment, use of the broadcast management table 104 enables the node apparatus 100 to judge the identity between the Ethernet frames 420, which include no ad hoc header 410, according to the combination of the value of the MAC-SA 422 and the time. That is, the broadcast management table 104 is an example of a mechanism that enables prevention of congestion even in a case where a broadcast frame having once passed through the outside of the wired ad hoc network 200 returns again into the wired ad hoc network 200.

Note that the value "10 ms" exemplified above may appropriately be changed according to embodiments. For instance, an appropriate value may be determined by performing a preliminary experiment. The appropriate value varies depending on, for instance, the frequency at which broadcast frames are transmitted, and time taken for a frame to pass through a device (such as the L2SW 202) external to the wired ad hoc network 200 and to return again into the wired ad hoc network 200.

Here, returning to the description of FIG. 11A, processing in step S216 performed in a case where a frame other than the broadcast frame is received in step S202 will be described.

In step S216, the received frame controller 133 judges whether the frame received in step S202 is addressed to the node apparatus 100 itself or not. That is, the received frame controller 133 judges whether or not the node ID of the node apparatus 100 itself preliminarily read out from the flash memory 119 in step S201 and the value of the GD 411 in the ad hoc frame 400 received in step S202 are identical with each other.

If the node ID of the node apparatus 100 itself and the value of the GD 411 are identical with each other, the frame received in step S202 is one addressed to the node apparatus 100 itself, and accordingly, the processing proceeds to step S217. In contrast, if the node ID of the node apparatus 100 itself and the value of the GD 411 are not identical with each other, the frame received in step S202 is not one addressed to the node apparatus 100 itself, and accordingly, the processing proceeds to step S218 in FIG. 11C in order to relay the frame to another node apparatus.

In step S217, an upward transfer process is performed. That is, in step S217, the received frame controller 133 outputs the frame to the upper layer processor 134 and then the upper layer processor 134 processes the frame. Described in line with FIG. 5, in step S217, the frame is outputted from the FPGA 113 to the MPU 114 and the frame is processed by the MPU 114. In step S217, the upper layer processor 134 processes the data included in the payload of the received frame as the L3 packet 424, and/or performs appropriate control based on the received frame. Then, the processing returns to step S202.

Figure 11C:
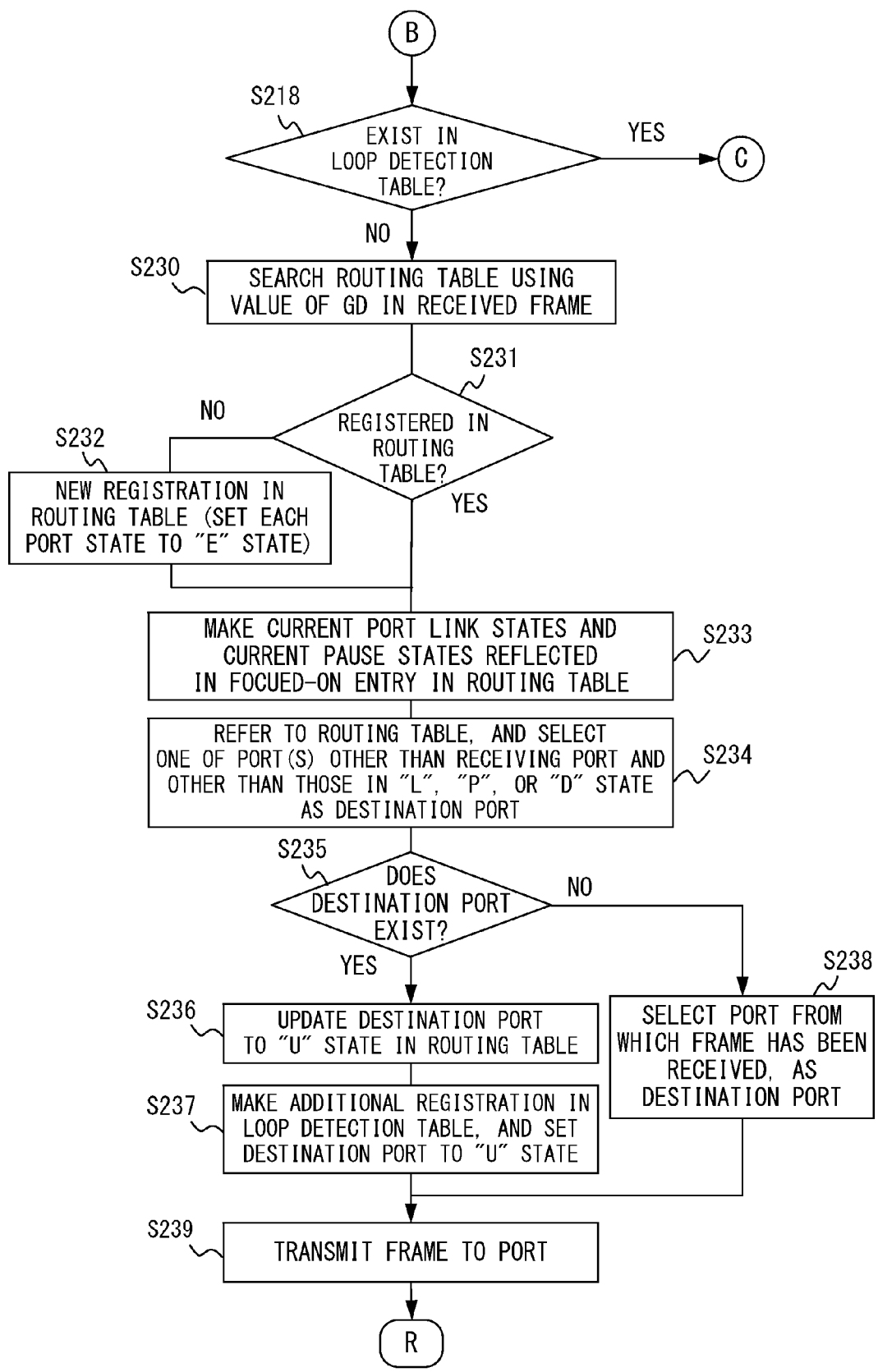
FIG. 11C is a flowchart (No. 3) which explains the routing process.

Meanwhile, if it is judged in step S216 that the frame received in step S202 is not one addressed to the node apparatus 100 itself, the processing proceeds to step S218 in FIG. 11C.

In step S218, the received frame controller 133 judges whether an entry corresponding to the frame received in step S202 exists in the loop detection table 105 or not. That is, the received frame controller 133 searches, via the table controller 136, the loop detection table 105 using the pair of the values of the GS 412 and the FID 414 in the frame received in step S202 as search keys.

Figure 11D:
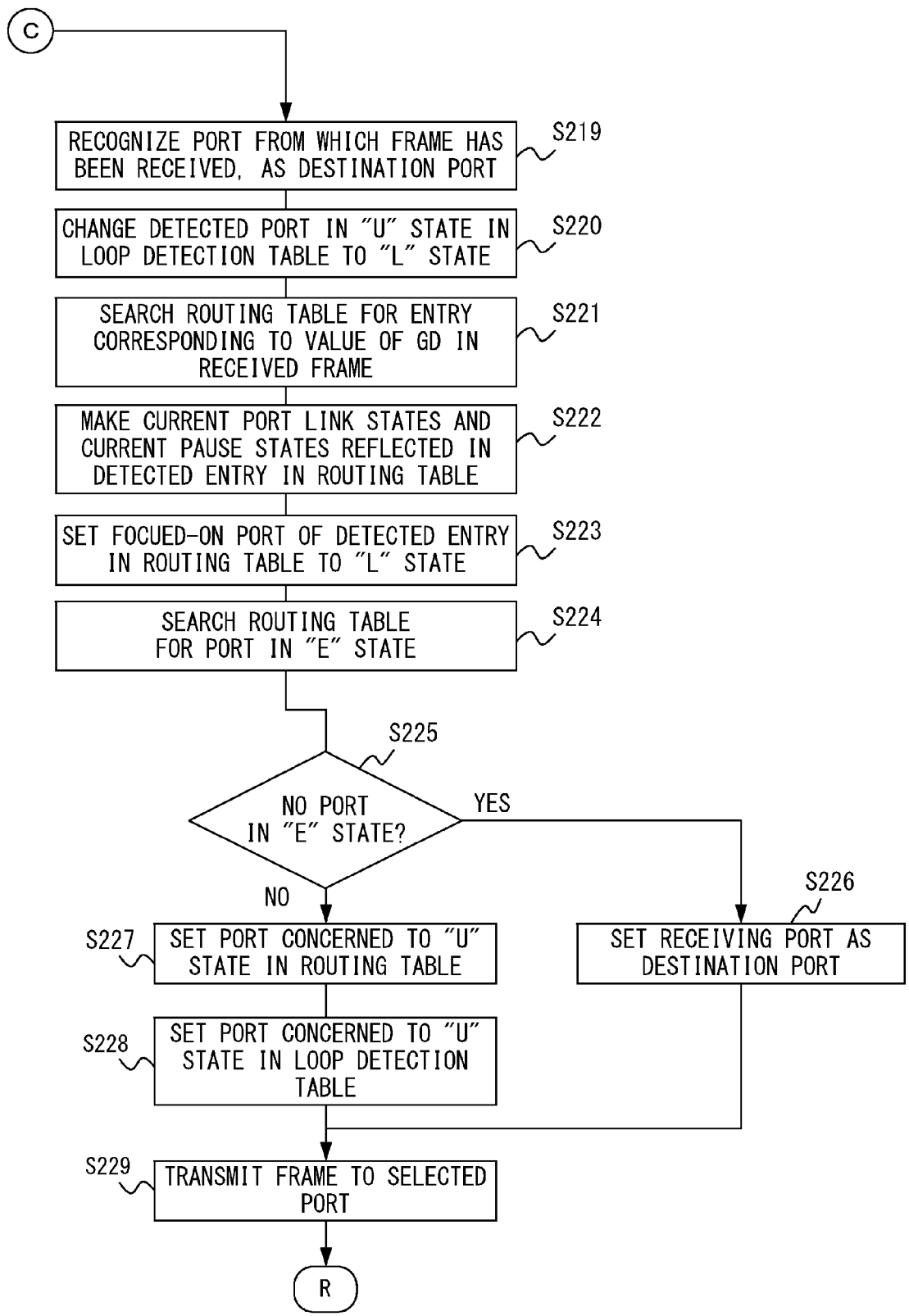
FIG. 11D is a flowchart (No. 4) which explains the routing process.

If an entry whose source $GS_i$ is identical with the value of the GS 412 and whose $FID_i$ is identical with the value of the FID 414 is found as a result of the search ($1 \leq i \leq m$), the processing proceeds to step S219 in FIG. 11D. On the other hand, if the entry above is not found as a result of the search, the processing proceeds to step S230 in FIG. 11C.

Note that no more than one entry as described above exists, even if it exists.

Steps S219 to S229 illustrated in FIG. 11D are processes in a case where a unicast frame having previously been transmitted by the node apparatus 100 itself loops in the wired ad hoc network, returns to the node apparatus 100, and is received at the port 101-r in step S202. For instance, in FIG. 2B, the process that follows the backtracking 303 in the search path 302 and that is made in the node apparatus 100b, which receives the frame from the node apparatus 100a, corresponds to FIG. 11D.

In step S219, the port selector 138 recognizes the port from which the frame has been received in step S202 as the receiving port.

For instance, when the entry is found in step S218, the received frame controller 133 may notify the port selector 138 of the address of the SRAM 116 notified by the table controller 136 as the address of the found entry. The received frame controller 133 may then instruct the port selector 138 to perform port selection for a case where a loop is detected. As a result, the port selector 138 may executes the processing in and after step S219.

For instance, assume that the frame is received at the port 101-r ($1 \leq r \leq x$) in step S202, that the i-th entry in the loop detection table 105 is matched as a search result in step S218, and that the loop detection table 105 is in the format illustrated in FIG. 1. In this case, in step S219, the port selector 138 updates the port number $RCVPN_i$ in the i-th entry to the number of the port 101-r.

Subsequently, in step S220, the port selector 138 changes the port state in the "U" state in the entry in the loop detection table 105 detected in step S218 to the "L" state.

For instance, assume that the i-th entry in the loop detection table 105 is matched in step S218 as a result of the search. Since step S220 is a step executed pertaining to the frame having been unicast, there is only one port state whose value is "U" among the port states $LP_{1i}$ to $LP_{xi}$ in the i-th entry. Hereinafter, for convenience of description, assume that the value of the port state $LP_{ti}$ of the port 101-t ($1 \leq t \leq x$) is "U".

That is, in a case where the node apparatus 100 has previously transmitted, from the port 101-t, an ad hoc frame 400 in which the source $GS_i$ is set in the GS 412 and in which the same value as the $FID_i$ is set in the FID 414, the value of the port state $LP_{ti}$ is "U" in step S220. In this case, the value of the port state $LP_{ti}$ is updated from "U" to "L" in step S220.

Further, in step S221, the port selector 138 searches, via the table controller 136, the routing table 103 for an entry corresponding to the value of the GD 411 in the frame received in step S202. In this embodiment, the aging time period (i.e., valid duration of each entry) of the routing table 103 is longer than the aging time period of the loop detection table 105. Consequently, it is assured that one entry is necessarily matched in step S221 as a result of the search. Therefore, according to step S221, it is possible for the port selector 138 to acquire the address of the SRAM 116 corresponding to the matched entry from the table controller 136, and to directly access the matched entry thereafter.

The aging time period of the routing table 103 may be a relatively long time period, for instance, such as one that is 225 seconds long. In contrast, it is preferable to set the aging time period of the loop detection table 105 to a relatively short time period, for instance, such as one that is shorter than one second. This is because one entry in the routing table 103 corresponds to one node apparatus in the wired ad hoc network while one entry in the loop detection table 105 corresponds to one ad hoc frame 400.

That is, it is expected that entries are added to the loop detection table 105 far frequently than to the routing table 103. Accordingly, in order to prevent overflow due to excessive increase in the number of entries in the loop detection table 105, the aging time period of the loop detection table 105 is set to a relatively short time period.

It is preferable to determine an appropriate value for the length of the aging time period of the loop detection table 105 in consideration of time taken for a loop in the wired ad hoc network, for instance, by performing a preliminary examination.

Hereinafter, for convenience of description, assume that the j-th entry in the routing table 103 is matched in step S221. That is, assume that the value of the GD 411 in the ad hoc frame 400 received in step S202 is identical with the value of the destination $GD_j$ in the routing table 103.

Thus, in step S222, the port selector 138 makes the current port link states and the current pause states reflected in the entry in the routing table 103 detected in step S221. That is, in step S222, the following operations are performed for each port 101-$k$ (1≤$k$≤x).

In a case where the value of the pause state $PS_k$, which corresponds to the port 101-$k$, in the pause state table 151 in FIG. 7 is "P", the value of the state $RP_{kj}$ of the port 101-$k$ is updated to "P" in the j-th entry matched in the routing table 103. Instead, in a case where the current value of the state $RP_{kj}$ of the port 101-$k$ is "P" in the j-th entry in the routing table 103 and the value of the pause state $PS_k$ in the pause state table 151 is "N", the value of the state $RP_{kj}$ is updated to "E".

In a case where the value of the link state $L_k$, which corresponds to the port 101-$k$, in the port link state table 152 in FIG. 8 is "D", the value of the state $RP_{kj}$ of the port 101-$k$ is updated to "D" in the j-th entry matched in the routing table 103. Instead, in a case where the current value of the state $RP_{kj}$ of the port 101-$k$ is "D" in the j-th entry in the routing table 103 and the value of the link state $L_k$ in the port link state table 152 is "C", the value of the state $RP_{kj}$ is updated to "E".

In this embodiment, an operation to make the content of the port link state table 152 reflected is performed after an operation to make the content of the pause state table 151 reflected. Accordingly, the link state $L_k$ is reflected in the routing table 103 with a higher priority than that of the pause state $PS_k$. In addition, as understood from the above description, the pause state table 151 and the port link state table 152 are used as a type of mask data for the routing table 103.

Further, in step S223, the port selector 138 sets the focused-on port 101-$t$ to the "L" state in the entry in the routing table 103 detected in step S221. That is, with respect to the port 101-$t$, which has been changed from the "U" state to the "L" state in the loop detection table 105 in step S220, the state is set to "L" also in the routing table 103 in step S223. More specifically, the value of the state $RP_{tj}$ of the port 101-$t$ is updated to the "L" in the j-th entry in the routing table 103.

In a case where the node apparatus 100 receives the frame having looped in the wired ad hoc network and returned, the above steps S220 to S223 prevent a frame whose destination is identical to that of the returned frame from being thereafter transmitted from the destination port used so far. That is, the node apparatus 100 learns the port causing the loop, and thereafter restrains transmission to the port causing the loop. As a result, useless traffic is reduced in the entire wired ad hoc network.

Subsequently, in step S224, the port selector 138 searches the j-th entry in the routing table 103 for a port in the "E" state. That is, the port selector 138 searches for a port that has not yet been tried as the destination port for relaying an ad hoc frame 400 with the designated destination $GD_j$ and that is currently available (i.e., that is not in the "P" or "D" state).

Then in step S225, the port selector 138 judges whether a port in the "E" state has been found as a result of the search in step S224 or not. If not found, the processing proceeds to step S226. If found, the processing proceeds to step S227.

In step S226, the port selector 138 selects the port 101-$r$, which has been recognized as the receiving port in step S219, as the destination port. The processing then proceeds to step S229.

Step S226 is executed in a case where it is tried to relay the frame received from the port 101-$r$ in step S202 but a port from which transmission for relaying is feasible is not found. More specifically, the "port from which transmission is feasible" means a port that is not in the loop state or in the link-down state and that has not received a pause request from the adjacent node apparatus.

That is, step S226 is executed in a case where the node apparatus 100 is unable to forward the frame received in step S202 to another adjacent node apparatus other than the adjacent node apparatus connected to the receiving port. Accordingly, in order to return the received frame, the node apparatus 100 sets the port 101-$r$, from which the frame has been received in step S202, as the destination port.

The node apparatus 100 is able to notify, through the return, the adjacent node apparatus connected to the port 101-$r$ that the relay route is dead-ended at the node apparatus 100. As a result, the adjacent node apparatus that receives the returned frame is enabled by its loop detection table 105 to recognize that a frame addressed to the destination $GD_j$ will loop even if it is transmitted to the port connected to the node apparatus 100.

For instance, in the example in FIG. 2B, assume that, in the node apparatus 100$b$ having detected the loop by receiving the frame returned from the node apparatus 100$a$ by the backtracking 303, the link 217 to the node apparatus 100$e$ is in the link-down state. In this case, unlike the search path 302, backtracking further occurs also in the node apparatus 100$b$. That is, in step S226, the node apparatus 100$b$ selects the port 101$b$-4, which is connected to the node apparatus 100$c$, as the destination port.

As a result, the node apparatus 100$c$ receives the frame returned from the node apparatus 100$b$. Accordingly, the node apparatus 100$c$ recognizes that the port 101$c$-1 connected to the node apparatus 100$b$ is inappropriate as the destination port of an ad hoc frame 400 in which the node ID of the node apparatus 100$g$ is designated in the GD 411. That is, in the routing table 103 in the node apparatus 100$c$, the state of the port 101$c$-1 associated with the node ID of the node apparatus 100$g$ is set to "L".

The node apparatus 100$c$ then selects the port 101$c$-3, which is different from the port 101$c$-1, in step S225. As described above, there may be a case where a new relay route is found by multiple repetitions of backtracking in the search tree 300 (n.b., in the search path 302 in FIG. 2B, the new relay route is found by only one instance of backtracking).

Here, the description is returned to continuation of that of step S225.

In a case where a port(s) in the "E" state is/are found in step S224, the port selector 138 selects any one (e.g., the firstly found port) of the port(s) in the "E" state found in step S224 as the destination port in step S227, which is subsequent to step S225. The port selector 138 then sets the state of the concerned port selected as the destination port to "U" in the j-th entry in the routing table 103.

For instance, assuming that the port 101-g (1≤g≤x) is selected in step S227, the value of the state $RP_{gj}$ of the port 101-g is set to "U" in the j-th entry in the routing table 103 matched in step S221.

Then in step S228, the port selector 138 further sets the port concerned to the "U" state also in the loop detection table 105. That is, in the i-th entry in the loop detection table 105 found in step S218, the value of the state $LP_{gi}$ of the port 101-g selected as the destination port in step S227 is set to "U". The processing then proceeds to step S229.

In step S229, the frame is transmitted to the port selected as the destination port in step S226 or S227.

That is, in step S229, the port selector 138 gives the transmission frame controller 140 an instruction on the port selected as the destination port, and outputs the frame to the transmission frame controller 140. Then, the transmission frame controller 140 generates a new ad hoc header 410 by decrementing the TTL 415 in the received frame by one and recalculating the FCS 417, and outputs an ad hoc frame 400 including the new ad hoc header 410 to the buffer unit 142. Further, the transmission frame controller 140 performs control for transmitting the ad hoc frame 400 buffered in the buffer unit 142 from the transmitting port 143-g (i.e., the port 101-g) selected by the port selector 138.

Thus, the frame is transmitted from the port 101-g in step S229. Subsequently, the processing returns to step S202.

As described above, in a case where a loop occurs, another new relay route is tried according to steps S227 to S229 or backtracking occurs according to steps S226 and S229. Note that the switching to the new relay route according to steps S227 to S229 is executed by the FPGA 113 in the node apparatus 100 within several micro seconds.

Even if the backtracking occurs, the relay route switching is completed within a significantly short time period even in the entire wired ad hoc network as long as the number of steps of traversing the search tree 300 upward by the backtracking is small, for instance, as in the search path 302 in FIG. 2B. Thus, this embodiment realizes switching of a relay route of a frame at a significantly high speed in a case where a loop occurs due to occurrence of a fault or another reason.

Here, returning to the description of FIG. 11C, the description will be made of processes in steps S230 to S239 for a case where the entry has not been found in the search in step S218.

In step S230, the port selector 138 searches the routing table 103 using the value of the GD 411 in the frame received in step S202, via the table controller 136.

Then in step S231, the port selector 138 judges whether or not an entry associating the value of the GD 411 with the state of each port has been found in the routing table 103 as a result of the search in step S230. If the entry above has not been found, the processing proceeds to step S232. If the entry above has been found, the processing proceeds to step S233. Note that no more than one entry as described above exists, even if it is found.

In step S232, the port selector 138 registers a new entry in the routing table 103 via the table controller 136. In the new entry, the value of the destination is set to the value of the GD 411 in the frame received in step S202, and the state of the every port 101-1 to 101-x is set to the "E" state. Then, the processing proceeds to step S233.

In the following description pertaining to FIG. 11C, let a "focused-on entry" be the one entry found as the result of the search in step S230 or the entry newly registered in step S232, and assume that the focused-on entry is the f-th entry in the routing table 103.

Described in line with the example in FIG. 1, 1≤f≤n holds in a case where the focused-on entry is found in step S230, and f=n+1 holds in a case where the focused-on entry is registered in step S232. The port selector 138 acquires, as a result of step S230 or S232, the address of the focused-on entry on the SRAM 116 from the table controller 136, and accordingly, is capable of directly accessing the focused-on entry thereafter.

In step S233, the port selector 138 makes the current port link states and the current pause states reflected in the focused-on entry in the routing table 103. That is, in step S233, the following operations analogous to those in step S222 are performed for each port 101-k (1≤k≤x).

In a case where the value of the pause state $PS_k$, which corresponds to the port 101-k, in the pause state table 151 in FIG. 7 is "P", the value of the state $RP_{kf}$ of the port 101-k is updated to "P" in the f-th entry in the routing table 103. Instead, in a case where the current value of the state $RP_{kf}$ of the port 101-k is "P" in the f-th entry in the routing table 103 and the value of the pause state $PS_k$ in the pause state table 151 is "N", the value of the state $RP_{kf}$ is updated to "E".

In a case where the value of the link state $L_k$, which corresponds to the port 101-k, in the port link state table 152 in FIG. 8 is "D", the value of the state $RP_{kf}$ of the port 101-k is updated to "D" in the f-th entry in the routing table 103. Instead, in a case where the current value of the state $RP_{kf}$ of the port 101-k is "D" in the f-th entry in the routing table 103 and the value of the link state $L_k$ in the port link state table 152 is "C", the value of the state $RP_{kf}$ is updated to "E".

Further, in step S234, the port selector 138 refers to the focused-on entry in the routing table 103. The port selector 138 then selects, as the destination port, one of the port(s) that is/are other than the port 101-r (1≤r≤x), from which the frame has been received in step S202, and that is/are in the state other than the "L", "P", and "D" states. Note that the state other than the "L", "P", and "D" states is, in other words, the "E" state or the "U" state.

In this embodiment, the port selector 138 selects a port in the "U" state more preferentially than a port in the "E" state in step S234. This is because the port in the "U" state has previously and actually been used as the destination port and is confirmed, in step 218, not to cause a loop, and thereby its reliability is established.

Step S234 is executed in a case where the frame received in step S202 is a unicast frame. Accordingly, no more than one port in the "U" state exists in the focused-on entry, even if it exists.

In a case where the port selector 138 selects a port in the "E" state in step S234 and a plurality of ports in the "E" state exist in the focused-on entry, the port selector 138 may select, for instance, the firstly found port in the "E" state.

However, there is a possibility that there is no port that satisfies a condition that it is other than the port 101-r and its state is set to "E" or "U" in the focused-on entry.

Thus, in step S235, the port selector 138 judges whether there is a destination port selected in step S234 or not. If there is a destination port selected in step S234, the processing proceeds to step S236. If the destination port is not found in step S234, the processing proceeds to step S238.

In step S236, the port selector 138 updates the state of the destination port in the focused-on entry in the routing table 103 to the "U" state. For instance, in a case where the port 101-$e$ (1≤$e$≤$x$) is selected as the destination port in step S234, the value of the state RP$_{ef}$ is set to "U" in step S236.

Then in step S237, the port selector 138 additionally registers a new entry to the loop detection table 105 via the table controller 136. Assuming that the new entry is the (m+1)-th entry for instance, the content of each field in the new entry is as follows.

The source GS$_{m+1}$ is set to the value of the GS 412 in the frame received in step S202.

The FID$_{m+1}$ is set to the value of the FID 414 in the frame received in step S202.

The receiving port number RCVPN$_{m+1}$ is set to the number (i.e., "r") of the port 101-$r$, from which the frame has been received in step S202.

The state LP$_{e(m+1)}$ corresponding to the port 101-$e$ is set to "U", and all the states corresponding to the other ports are set to "E".

After the new entry as described above is added to the loop detection table 105 in step S237, the processing proceeds to step S239.

On the other hand, in a case where the destination port is not acquired in step S234, the port selector 138 selects the port 101-$r$, from which the frame has been received in step S202, as the destination port in step S238. That is, step S238 is a step analogous to step S226 in FIG. 11D. The port 101-$r$ is selected in step S238 as a port for returning the frame in order to provide notification that trying to relay the frame received from the port 101-$r$ in step S202 results in failure to find a port from which transmission for relaying is feasible. The processing then proceeds to step S239.

In step S239, the frame is transmitted to the port selected as the destination port in step S234 or S238. Since the process in step S239 is analogous to that in step S229 in FIG. 11D, the detailed description thereof is omitted. After transmission of the frame, the processing returns to step S202.

Although illustration is omitted in FIGS. 11A to 11D for the simplicity of the description, the node apparatus 100 may discard the frame in the routing process on the basis of the value of the TTL 415, in some cases. That is, in a case where the value of the TTL 415 in the frame received in step S202 is one, processes are performed as follows, for instance.

The transmission frame controller 140 discards the frame in step S213 in FIG. 11B, steps S214 and S215 are omitted, and the processing returns to step S202.

Steps S225 to S229 in FIG. 11D are omitted.

Steps S230 to S239 in FIG. 11C are omitted.

Although FIGS. 11A to 11D illustrate the processing pertaining to a frame received at any of the wired ad hoc network ports 101-1 to 101-$x$ in FIG. 5, the node apparatus 100 also executes a process pertaining to a frame received at the general LAN port 106. The node apparatus 100 further performs a process pertaining to a frame generated by the MPU 114 in the node apparatus 100 itself.

More specifically, in a case where an Ethernet frame 420 is received at the general LAN port 106, the Ethernet frame 420 is outputted to the MPU 114 or the FPGA 113 according to its MAC-DA 421. An Ethernet frame 420 addressed to the node apparatus 100 itself is processed by the MPU 114.

In contrast, an Ethernet frame 420 addressed to another node apparatus is provided with an ad hoc header 410 by the FPGA 113, and is transmitted from any of the wired ad hoc network ports 101-1 to 101-$x$. In this case, as with step S237 in FIG. 11C, an entry is also added to the loop detection table 105. In a case where a broadcast frame is received at the general LAN port 106, the FPGA 113 may set a specific value, which represents broadcasting from an external device, in the type 413 in the ad hoc header 410.

In a case where the MPU 114 generates an Ethernet frame 420, any of the following processes is executed on the Ethernet frame 420 according to its MAC-DA 421.

The Ethernet frame 420 is transmitted from the general LAN port 106 via the internal connection port 114$b$, the PHY chip 120, and the L2SW unit 112.

The Ethernet frame 420 is outputted to the FPGA 113, is provided with the ad hoc header 410, and is transmitted from any of the wired ad hoc network ports 101-1 to 101-$x$. In this case, as with step S237 in FIG. 11C, an entry is also added to the loop detection table 105. In a case where the MPU 114 generates a broadcast frame, the FPGA 113 may set a specific value, which represents broadcasting from the MPU 114, in the type 413 in the ad hoc header 410.

Next, various processes executed independently of the processing in FIGS. 11A to 11D will be described with reference to FIGS. 12 to 20.

Figure 12:
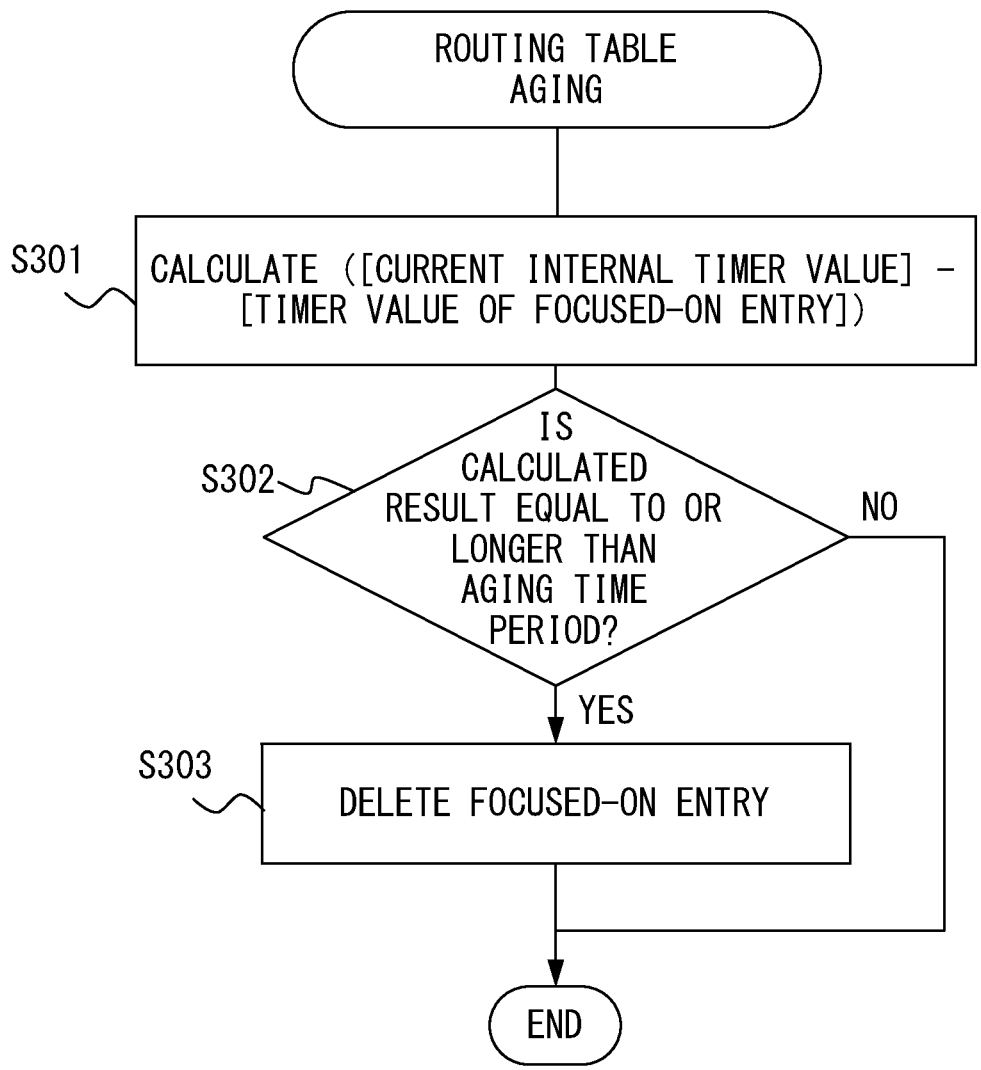
FIG. 12 is a flowchart which explains aging of a routing table.

FIG. 12 is a flowchart which explains aging of the routing table. The processing in FIG. 12 is executed for each entry in the routing table 103, for instance, at predetermined regular intervals. Hereinafter, in the description of FIG. 12, a certain entry in the routing table 103 is referred to as a "focused-on entry" for the sake of convenience. Described is a case where the processing in FIG. 12 is executed on the focused-on entry.

In step S301, the table controller 136 calculates a difference acquired by subtracting the timer value of the focused-on entry from the current value of the timer 139 in the node apparatus 100.

In this embodiment, timers corresponding to the respective entries in the routing table 103 are implemented. For instance, hardware timers corresponding to the respective entries may be implemented on the FPGA 113. In some embodiments, each entry in the routing table 103 may include a field representing an entry creation time instead. In this case, in step S301, a difference is calculated by subtracting the value of the field representing the entry creation time of the focused-on entry from the current value of the timer 139 in the node apparatus 100.

Next, in step S302, the table controller 136 judges whether the calculated result acquired in step S301 is equal to or longer than a predetermined aging time period of the routing table 103 or not. If the difference acquired in step S301 is shorter than the above aging time period, the processing in FIG. 12 terminates.

On the other hand, if the difference acquired in step S301 is equal to or longer than the above aging time period, the table controller 136 deletes the focused-on entry from the routing table 103 in step S303, and terminates the processing in FIG. 12.

Figure 13:
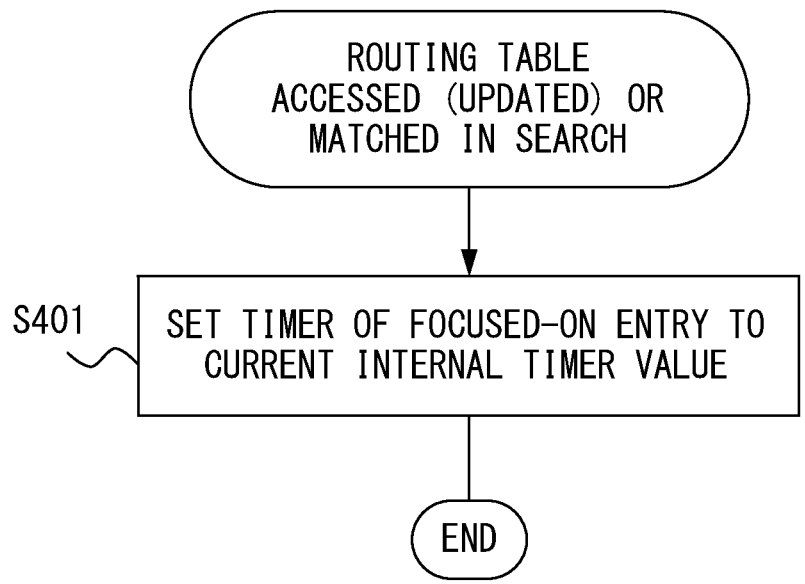
FIG. 13 is a flowchart which explains setting of a timer of an entry in the routing table.

FIG. 13 is a flowchart which explains setting of the timer of an entry in the routing table. The processing in FIG. 13 is executed in the following cases.

In a case where an access to update the content of a certain entry in the routing table 103 is performed (e.g., in step S233 or S236 in FIG. 11C, or in step S222, S223, or S227 in FIG. 11D), the processing in FIG. 13 is performed on the accessed entry.

In a case where a new entry is added to the routing table 103 (e.g., in step S232 in FIG. 11C), the processing in FIG. 13 is performed on the new entry.

In a case where the routing table 103 is searched and a matched entry is found as a result of the search (e.g., in step S230 in FIG. 11C, or in step S221 in FIG. 11D), the processing in FIG. 13 is performed on the matched entry.

Hereinafter, generalizing the above three cases for the sake of convenience, an entry as a target on which the processing in FIG. 13 is performed is referred to as a "focused-on entry".

In step S401, the table controller 136 sets the timer (e.g., the hardware timer exemplified pertaining to FIG. 12) of the focused-on entry to the current value of the timer 139 in the node apparatus 100. The processing in FIG. 13 then terminates. In embodiments where the routing table 103 includes the field representing the entry creation time, the field representing the entry creation time is set to the current value of the timer 139 in step S401.

The above processing in FIGS. 12 and 13 realizes aging of each entry in the routing table 103. Although not illustrated in the drawings, the table controller 136 and the timer 139 cooperatively perform the aging process also on the broadcast management table 104, through the processing analogous to that in FIGS. 12 and 13.

Figure 14:
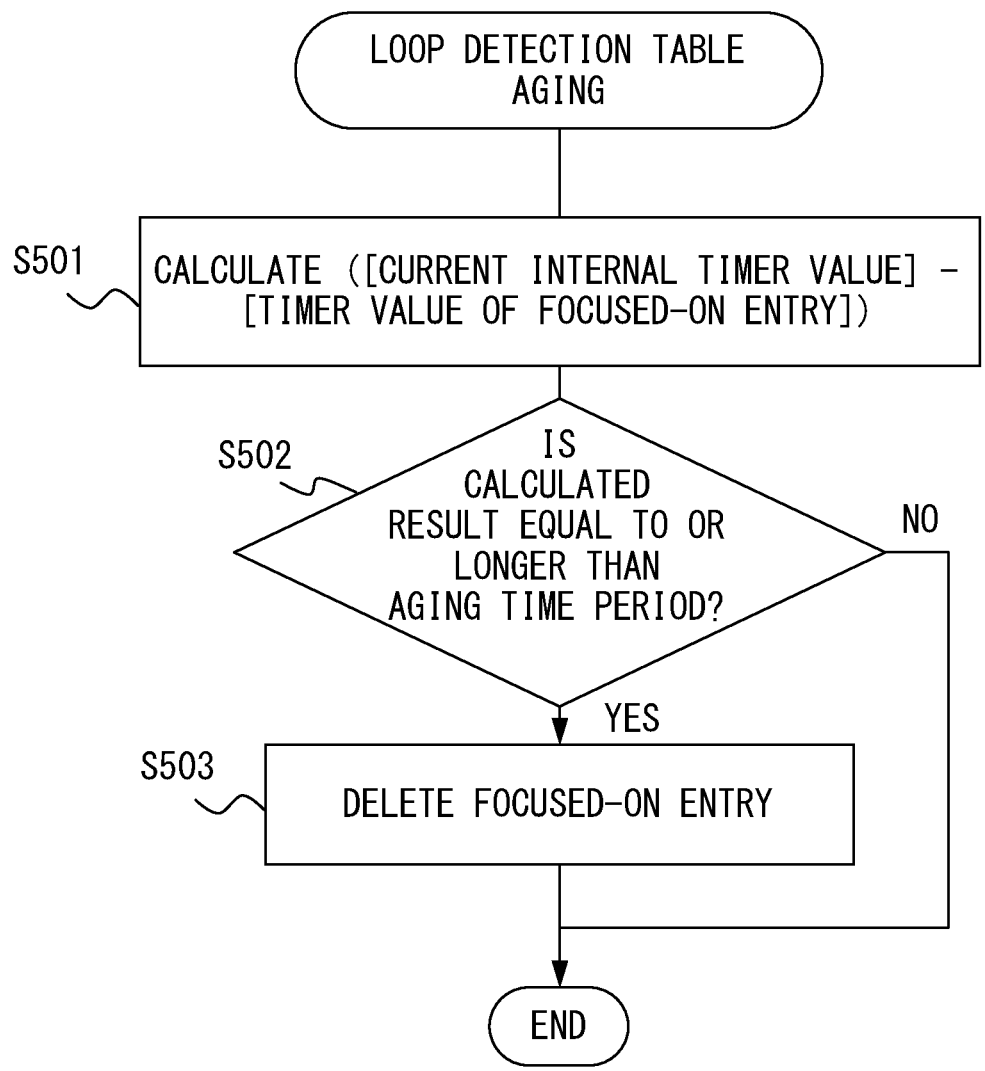
FIG. 14 is a flowchart which explains aging of a loop detection table.

FIG. 14 is a flowchart which explains aging of the loop detection table. The processing in FIG. 14 is executed for each entry in the loop detection table 105, for instance, at predetermined regular intervals. Hereinafter, in the description of FIG. 14, a certain entry in the loop detection table 105 is referred to as a "focused-on entry" for the sake of convenience. Described is a case where the processing in FIG. 14 is executed on the focused-on entry.

In step S501, the table controller 136 calculates a difference acquired by subtracting the timer value of the focused-on entry from the current value of the timer 139 in the node apparatus 100. In this embodiment, timers corresponding to the respective entries are implemented also with respect to the loop detection table 105 as with the routing table 103. It is a matter of course that, in some embodiments, each entry in the loop detection table 105 may include a field representing an entry creation time.

Next, in step S502, the table controller 136 judges whether the calculated result acquired in step S501 is equal to or longer than a predetermined aging time period of the loop detection table 105 or not. If the difference acquired in step S501 is shorter than the above aging time period, the processing in FIG. 14 terminates.

On the other hand, if the difference acquired in step S501 is equal to or longer than the above aging time period, the table controller 136 deletes the focused-on entry from the loop detection table 105 in step S503, and terminates the processing in FIG. 14.

FIG. 15 is a flowchart which explains setting of the timer of an entry in the loop detection table. Unlike in the routing table 103, each entry in the loop detection table 105 is deleted when a prescribed time period has elapsed after its creation irrespective of being accessed or not. Accordingly, the processing in FIG. 15 is executed on a new entry when this new entry is added to the loop detection table 105 in step S215 in FIG. 11B or in step S237 in FIG. 11C. In other words, the processing in FIG. 15 is executed together with transmission of a frame (more specifically, immediately after the frame is transmitted in step S213 in FIG. 11B or immediately before the frame is transmitted in step S239 in FIG. 11C), by taking the opportunity of the process of transmitting the frame.

More specifically, in step S601, the table controller 136 sets the timer (e.g., a hardware timer) of the new entry added to the loop detection table 105 to the current value of the timer 139 in the node apparatus 100. The processing in FIG. 15 then terminates. In the embodiments where the loop detection table 105 includes the field representing the entry creation time, the field representing the entry creation time is set to the current value of the timer 139 in step S601.

The above processing in FIGS. 14 and 15 realizes aging of each entry in the loop detection table 105.

Figure 16:
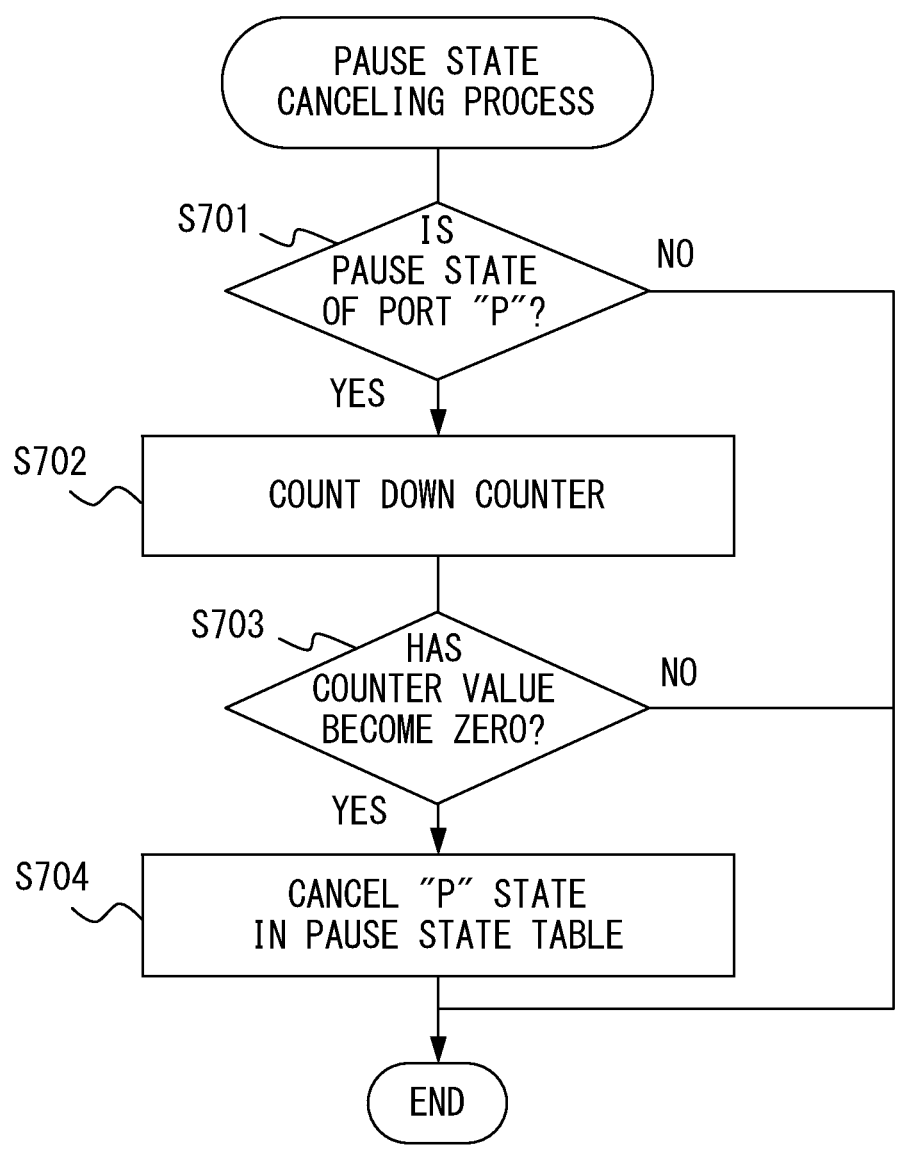
FIG. 16 is a flowchart of a pause state canceling process.

FIG. 16 is a flowchart of a pause state canceling process. The processing in FIG. 16 is the processing for canceling the "P" state set in step S206 in FIG. 11A. The processing in FIG. 16 is executed for each port, for instance, at predetermined regular intervals. Hereinafter, in the description of FIG. 16, a certain port 101-$i$ (1≤$i$≤x) is referred to as a "focused-on port"; and described is a case where the processing in FIG. 16 is executed on the focused-on port 101-$i$.

In step S701, the table controller 136 refers to the pause state table 151 in FIG. 7, and judges whether the value of the pause state $PS_i$ corresponding to the focused-on port 101-$i$ is "P" or not. If the value of the pause state $PS_i$ corresponding to the focused-on port 101-$i$ is not "P" but "N", the processing in FIG. 16 terminates.

On the other hand, if the value of the pause state $PS_i$ corresponding to the focused-on port 101-$i$ is "P", the table controller 136 counts down, in step S702, the counter $Count_i$ in the entry corresponding to the focused-on port 101-$i$ in the pause state table 151.

Next, in step S703, the table controller 136 judges whether or not the value of the counter $Count_i$ has become zero as a result of the countdown in step S702. If the value of the counter $Count_i$ has not become zero, the processing in FIG. 16 terminates.

On the other hand, if the value of the counter $Count_i$ has become zero, the table controller 136 cancels, in step S704, the "P" state in the entry corresponding to the focused-on port 101-$i$ in the pause state table 151. That is, the table controller 136 sets the pause state $PS_i$ of the entry corresponding to the focused-on port 101-$i$ to "N". The processing in FIG. 16 then terminates.

After the pause state is canceled in step S704, the content of the pause state table 151 is made reflected in the routing table 103 in step S233 in FIG. 11C or in step S222 in FIG. 11D.

As exemplified in FIG. 7, the pause state table 151 may include the "counter" field. Instead, a hardware timer may realize the countdown of each entry in the pause state table 151.

Instead, the pause state table 151 may include an "expected returning time" field representing an expected returning time from the "P" state in lieu of the "counter" field. In step S206 in FIG. 11A, a time acquired by adding a time period designated in the pause frame to the time at which step S206 is executed may be calculated by the table controller 136, and may be recorded in the "expected returning time" field. In addition, the processing in FIG. 16 may be modified, instead of the judgment in step S703, such that the step S704 is executed in a case where the current time of the timer 139 is time after the value of the expected returning time field.

Figure 17:
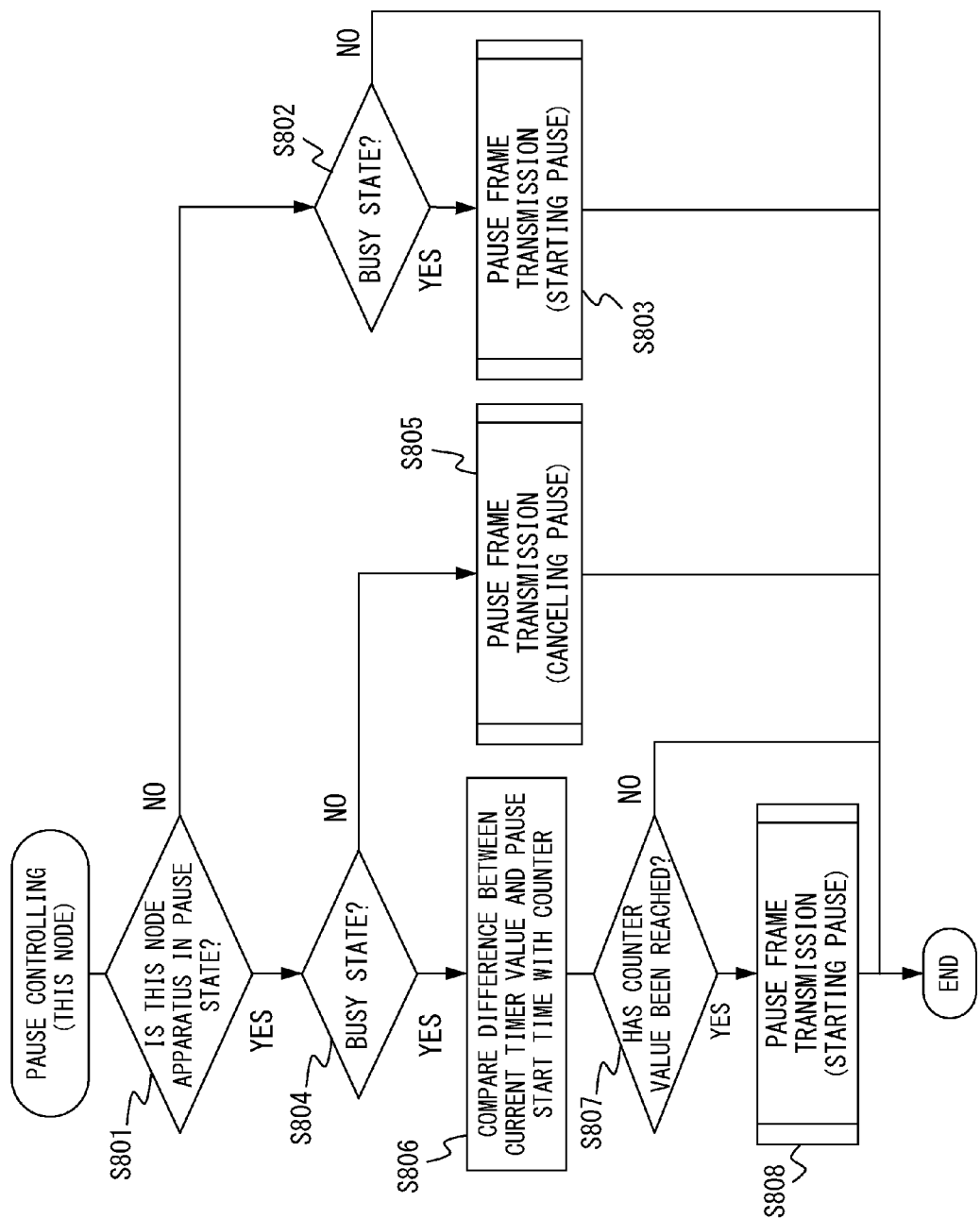
FIG. 17 is a flowchart which explains a pause controlling process executed by the node apparatus on the node apparatus itself.

FIG. 17 is a flowchart which explains a pause controlling process executed by the node apparatus on the node apparatus itself. For instance, the processing in FIG. 17 may be executed at predetermined regular intervals.

In step S801, the port monitor 137 refers to the value of the pause state SS in the pause state management data 154 in FIG. 10, and judges whether the node apparatus 100 itself is in the pause state or not. If the value of the pause state SS is "P", the processing proceeds to step S804. If the value of the pause state SS is "N", the processing proceeds to step S802.

In step S802, the port monitor 137 judges whether the node apparatus 100 itself is in the busy state or not. For instance, if the usage percentage of the buffer unit 142 exceeds a prescribed threshold, the port monitor 137 judges that the node apparatus 100 itself is in the busy state, and the processing proceeds to step S803. In contrast, if the usage percentage of the buffer unit 142 is less than or equal to the threshold, the port monitor 137 judges that the node apparatus 100 itself is not in the busy state, and terminates the processing in FIG. 17.

In step S803, a pause frame transmission process for starting a pause is executed. Although the detailed description will be made later with reference to FIG. 18, the process in step S803 is a process for outputting pause requests to the adjacent node apparatuses. After the execution of step S803, the processing in FIG. 17 terminates.

Meanwhile, in a case where the value of the pause state SS is "P" in step S801, the port monitor 137 judges, in step S804, whether the node apparatus 100 itself is in the busy state or not according to a method analogous to that of step S802. If the port monitor 137 judges that the node apparatus 100 itself is in the busy state, the processing proceeds to step S806. In contrast, if the port monitor 137 judges that the node apparatus 100 itself is not in the busy state, the processing proceeds to step S805.

In step S805, a pause frame transmission process for canceling the pause is executed. Although the detailed description will be made later with reference to FIG. 19, the process in step S805 is a process for issuing, to the adjacent node apparatuses, notifications for canceling the pause requests having previously been issued to the adjacent node apparatuses. After the execution of step S805, the processing in FIG. 17 terminates.

In step S806, the port monitor 137 compares the difference between the current value of the timer 139 and the pause start time StartTime in the pause state management data 154 with the counter SCount in the pause state management data 154.

Then in step S807, the port monitor 137 judges whether the above-mentioned difference has already reached the value of the counter SCount in the pause state management data 154 or not.

If the above-mentioned difference has already reached the value of the counter SCount, it means that the node apparatus 100 itself is still unable to return from the busy state though the time period requested by the node apparatus 100 to the adjacent node apparatuses in the previous pause requests has already elapsed. Accordingly, in this case, the processing proceeds to step S808.

In contrast, if the above-mentioned difference is smaller than the value of the counter SCount, it means that the time period requested by the node apparatus 100 to the adjacent node apparatuses in the previous pause requests has not elapsed yet. Accordingly, the processing in FIG. 17 terminates.

In step S808, a pause frame transmission process for starting a pause is executed. Although the detailed description will be made later with reference to FIG. 18, the process in step S808 is a process for outputting pause extension requests to the adjacent node apparatuses. After the execution of step S808, the processing in FIG. 17 terminates.

Figure 18:
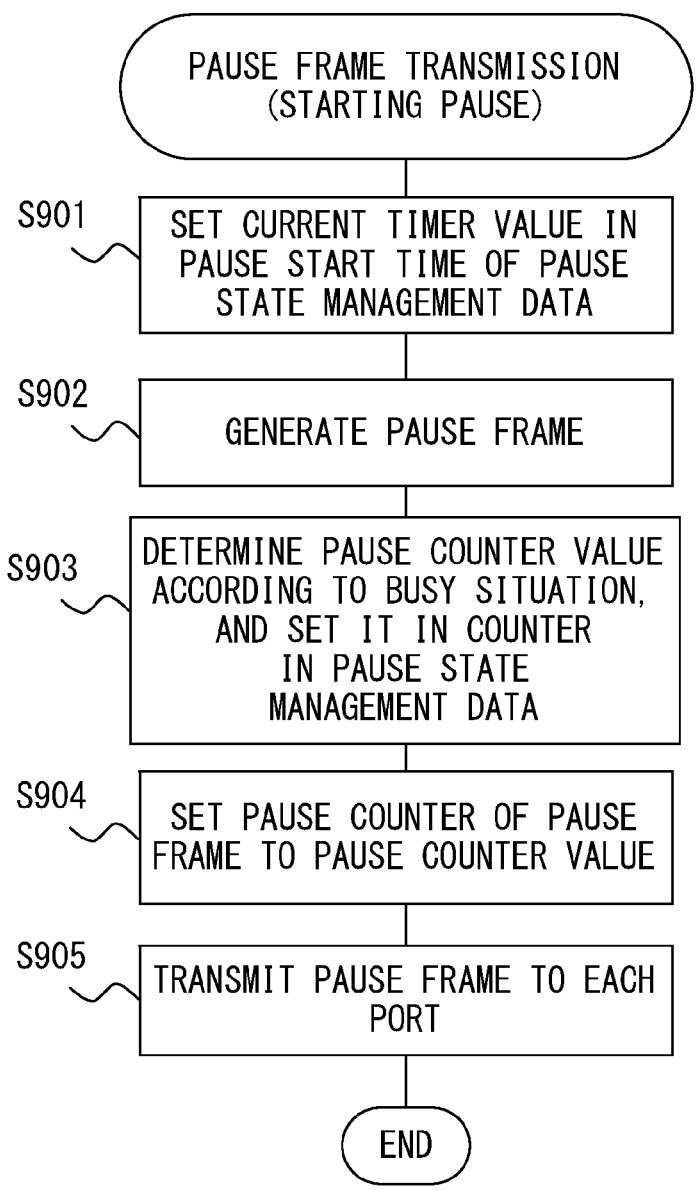
FIG. 18 is a flowchart of a pause starting process.

FIG. 18 is a flowchart of a pause starting process. The process of FIG. 18 is called from step S803 or S808 in FIG. 17.

In step S901, the port monitor 137 sets the current value of the timer 139 (i.e., the current time at the time when step S901 is executed) in the pause start time StartTime of the pause state management data 154 in FIG. 10.

Then in step S902, the port monitor 137 generates a pause frame. As described above, the pause frame is a type of the ad hoc frames with the ad hoc header 410, and includes, instead of the Ethernet frame 420, one or more fields including at least a pause counter subsequent to the ad hoc header 410.

In this embodiment, for instance, in the ad hoc header 410, the port monitor 137 sets the GD 411 to a special value representing broadcasting, sets the GS 412 to the node ID of the node apparatus 100 itself, and sets the type 413 to a value representing the pause frame. In addition, the port monitor 137 sets the FID 414 to a newly generated FID, and sets the TTL 415 to a prescribed value. Since the pause frame is addressed to the adjacent node apparatuses, the value set in the TTL 415 may be one.

In this embodiment, the pause frame has a format in which fixed-length data follows the ad hoc header 410. Accordingly, the length 416 is set to the value of the fixed length that is predetermined. The port monitor 137 then calculates the FCS 417 according to the values from the GD 411 to the length 416.

Then in step S903, the port monitor 137 determines a pause counter value according to the busy situation of the node apparatus 100 itself. For instance, the port monitor 137 may determine the pause counter value according to the usage percentage of the buffer unit 142.

Here, the "pause counter value" is a value representing the length of the time period to be requested by the node apparatus 100 to the adjacent node apparatuses to stop transmitting frames. In other words, the "pause counter value" is a value representing the length of the time period during which any node apparatus adjacent to the node apparatus 100 maintains the pause state (i.e., the "P" state) of its port that is connected to the node apparatus 100. In some embodiments, the port monitor 137 may use a predetermined constant value independent of the busy situation of the node apparatus 100 itself, as the pause counter value.

In step S903, the port monitor 137 further sets the counter SCount of the pause state management data 154 to the pause counter value determined as described above.

Then in step S904, the port monitor 137 sets the pause counter of the pause frame to the pause counter value, which has been determined in step S903.

Finally, in step S905, the port monitor 137 causes the port selector 138 to select a port(s) from which transmission of the pause frame is feasible, and outputs the pause frame to the transmission frame controller 140. Meanwhile, the port selector 138 notifies the transmission frame controller 140 of the selection result. As a result, the transmission frame controller 140 transmits the pause frame from each port selected by the port selector 138.

In this embodiment, more specifically, the port selector 138 refers to the port link state table 152 in FIG. 8, and selects a port(s) in the connected state (i.e., the "C" state) as the "port(s) from which transmission of the pause frame is feasible". In some embodiments, the port selector 138 may select a port(s) that is/are in the "C" state in the port link state table 152 in FIG. 8 and that is/are in the normal state (i.e., the "N" state), which is not the pause state, in the pause state table 151 in FIG. 7.

As illustrated in FIG. 6, in this embodiment, the port monitor 137 is realized by the FPGA 113. Accordingly, the pause frame is generated by the FPGA 113 in step S902 in FIG. 18. Therefore, in comparison with a case where the MPU 114 generates the pause frame according to software, this embodiment makes it possible to generate the pause frame in a shorter time period.

Reduction in time period taken to generate the pause frame leads to reduction in time period from the time when the node apparatus 100 falls into the busy state to the time when the states of the ports, which are connected to the node apparatus 100, are set to "P" in the adjacent node apparatuses and thereby the relay route(s) of a frame(s) is/are switched. That is, according to this embodiment, the time period taken to switch the relay route in the entire wired ad hoc network is reduced because the FPGA 113 generates the pause frame.

An event that the node apparatus 100 falls into the busy state and issues pause requests is also regarded as occurrence of a failure in a broad sense from a viewpoint of the entire wired ad hoc network. However, as described above, this embodiment allows quick switching to an alternative route. Accordingly, the wired ad hoc network of this embodiment is a fault-tolerant network preferably applicable to a mission-critical system in which quick switching of the relay route is desired when a failure occurs.

FIG. 19 is a flowchart of the pause canceling process. The processing in FIG. 19 is called from the step S805 in FIG. 17.

In step S1001, the port monitor 137 clears the pause start time StartTime in the pause state management data 154 in FIG. 10. For instance, the port monitor 137 may set the pause start time StartTime to a special value that is invalid as a time, thereby clearing the pause start time StartTime.

Then in step S1002, the port monitor 137 generates a pause frame in a manner similar to that in step S902 in FIG. 18.

Subsequently, in step S1003, the port monitor 137 clears the counter SCount in the pause state management data 154. For instance, the port monitor 137 may set the counter SCount to zero, thereby clearing the counter SCount.

Then in step S1004, the port monitor 137 sets the pause counter of the pause frame to zero. The pause frame whose pause counter is set to zero is for issuing a notification to cancel the pause state.

Then in step S1005, a process analogous to that in step S905 in FIG. 18 is executed.

More specifically, the port monitor 137 causes the port selector 138 to select a port (s) from which transmission of the pause frame is feasible, and outputs the pause frame to the transmission frame controller 140. Meanwhile, the port selector 138 notifies the transmission frame controller 140 of, for instance, a port (s) in the "C" state as the selection result. Instead, the port selector 138 may select a port (s) that is/are in the "C" state and that is/are also in the "N" state.

As a result, the transmission frame controller 140 transmits the pause frame from each port selected by the port selector 138.

Figure 20:
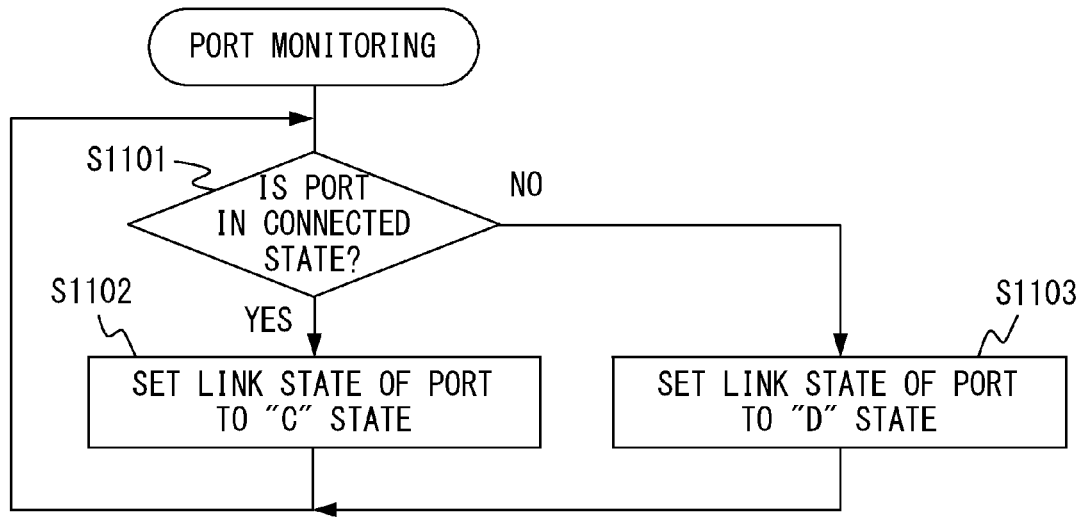
FIG. 20 is a flowchart of a port monitoring process.

FIG. 20 is a flowchart of the port monitoring process. The port monitoring process is executed for each of the ports 101-1 to 101-x. The description will hereinafter be made using an example of a case where the port monitoring process is executed on the port 101-$i$ ($1 \leq i \leq x$).

In step S1101, the port monitor 137 judges whether the port 101-$i$ is in the connected state or not. For instance, the port monitor 137 makes the judgment in step S1101 on the basis of an output from the PHY chip 111-$i$ indicating whether a cable connected to the port 101-$i$ is in a communicable state or in a link-down state.

If the cable connected to the port 101-$i$ is in the communicable state and the port 101-$i$ is in the state of being effectively connected to the adjacent node apparatus via the cable, the processing proceeds to step S1102. On the other hand, if the cable connected to the port 101-$i$ is in the link-down state, the processing proceeds to step S1103.

In step S1102, the port monitor 137 sets the link state $L_i$ of the port 101-$i$ to the "C" state in the port link state table 152 in FIG. 8 via the table controller 136. The processing then returns to step S1101.

Meanwhile, in step S1103, the port monitor 137 sets the link state $L_i$ of the port 101-$i$ to the "D" state in the port link state table 152 in FIG. 8 via the table controller 136. The processing then returns to step S1101.

As described above, the port monitoring process in FIG. 20 is repeatedly executed in a prescribed cycle.

Meanwhile, this embodiment having thus been described with reference to FIGS. 1 to 20 is summarized as follows.

The node apparatus 100 of the above embodiment is used as a first node apparatus in a network including a plurality of node apparatuses including the first node apparatus and a second node apparatus that are connected in a wired manner. A specific example of the above network is the wired ad hoc network 200 in FIG. 2A.

As illustrated in FIGS. 1 and 5, the first node apparatus includes the plurality of ports 101-1 to 101-$x$. Each port is a port to connect, in the wired manner, the first node apparatus to another different node apparatus other than the first node apparatus among the plurality of node apparatuses.

The node apparatus 100 as the first node apparatus also includes the loop detection table 105 as a specific example of loop detection information storage means for storing loop detection information. Hereinafter, for convenience of description, a frame that has previously been transmitted by the node apparatus 100 and that corresponds to the i-th ($1 \leq i \leq m$) entry is referred to as a "first frame".

The port states $LP_{1i}$ to $LP_{xi}$ provides an example of destination port distinguishing information for distinguishing, from among the plurality of ports, a first port that is the destination port for a case where the node apparatus 100 has transmitted the first frame. That is, the states $LP_{1i}$ to $LP_{xi}$ of the respective ports 101-1 to 101-$x$, as a whole, serve as information for distinguishing which port is the port in the "U" state. More specifically, the port in the "U" state in the i-th entry is the above-described first port.

The pair of the source $GS_i$ and the $FID_i$ is an example of first identification information for uniquely identifying the first frame. Thus, the data of the i-th entry in the loop detection table 105 is an example of the loop detection information that associates the destination port distinguishing information and the first identification information with each other.

The first identification information in this embodiment is a pair of the source $GS_i$, which is node-apparatus-identifying information (more specifically, the node ID), and the $FID_i$ being an FID, which is an example of frame-identifying information for uniquely identifying each of a plurality of frames transmitted by a source node apparatus serving as the source. However, since the loop detection table 105 is for detecting a frame that has looped, it is apparent that any piece of identification information capable of uniquely identifying the frame is usable instead of the pair of the node ID and the FID.

Meanwhile, the routing table 103 is an example of routing information storage means for storing routing information. The routing information associates, with each of the plurality of node apparatuses, state information that is information for indicating whether frame transmission from each of the plurality of ports 101-1 to 101-$x$ of the node apparatus 100 as the first node apparatus is feasible or not.

For instance, focusing on the j-th ($1 \leq j \leq n$) entry in the routing table 103, the states $RP_{1j}$ to $RP_{xj}$ serving as a specific example of the state information is associated with a certain node apparatus identified by the node ID being the destination $GD_j$, among the plurality of node apparatuses. Here, the states $RP_{1j}$ to $RP_{xj}$ represent feasibilities of frame transmission from the respective ports 101-1 to 101-$x$. More specifically, the "U" and "E" states represent "transmittable", and the "L", "D", and "P" states represent "non-transmittable".

The node apparatus 100 as the above-described first node apparatus includes the receiving unit 131 in FIG. 6 that functions as receiving means for receiving a second frame from the above-described second node apparatus, which is an adjacent node apparatus. A specific example of second identification information for uniquely identifying the second frame is a pair of the values of the GS 412 and the FID 414 included in the second frame.

Meanwhile, the routing engine 102 included in the node apparatus 100 also functions as routing information updating means for executing the following processing. In other words, the FPGA 113 serving as the table controller 136 and the port selector 138 is a specific example of the routing information updating means.

The FPGA 113 as the routing information updating means updates the state information when the second identification information is identical with the first identification information (more specifically, when an entry is matched in the loop detection table 105).

That is, the state information associated by the routing information with a destination node apparatus that is the destination of the second frame is updated so as to indicate that frame transmission from the first port is not feasible. In this embodiment, more specifically, in step S223 in FIG. 11D, the state corresponding to the first port is updated to "L" in an entry that is in the routing table 103 and that corresponds to the destination node apparatus, and thereby it is indicated that frame transmission from the first port is not feasible.

In addition, the node apparatus 100 includes the port selector 138, the transmission frame controller 140, and the transmitting unit 141 that function as transmitting means. These elements functioning as the transmitting means execute a process of selecting a second port from which transmission of the second frame is feasible, according to the state information associated by the routing information with the destination node apparatus, and of transmitting the second frame from the second port. In this embodiment, the second port is selected as follows.

In a case where the second identification information is not identical with the first identification information (i.e., in a case where no loop is detected), a port in the "U" or "E" state in the entry that is in the routing table 103 and that corresponds to the destination node apparatus is selected as the second port. As with this embodiment, in consideration with the rate at which a route in the entire network converges, a port in the "U" state may preferentially be selected in step S234.

In contrast, in a case where the second identification information is identical with the first identification information (i.e., in a case where a loop is detected), a port in the "E" state in the entry that is matched in the routing table 103 and that corresponds to the destination node apparatus is selected as the second port.

Meanwhile, the port monitor 137 included in the node apparatus 100 functions as link-down monitoring means for monitoring whether the plurality of ports are in the link-down state or not, and also functions as load monitoring means for monitoring a load on the first node apparatus. The load is measured by, for instance, the usage percentage of the buffer unit 142.

When the receiving unit 131 as the receiving means receives the second frame, the port selector 138 as the routing information updating means updates the state information as follows. That is, the port selector 138 updates the state information associated by the routing information with the destination node apparatus so as to indicate that frame transmission from a port judged to be in the link-down state is not feasible. In this embodiment, as illustrated in steps S222 and S233, the "D" state indicates that frame transmission is not feasible.

Meanwhile, if the load monitored by the port monitor 137 exceeds a predetermined criterion, a first pause frame is generated by the port monitor 137 and is transmitted to the adjacent node apparatus(es) by the transmission frame controller 140 and the transmitting unit 141, which serve as the transmitting means, as illustrated in step S803.

There is also a case where the receiving unit 131 as the receiving means receives the above-described second frame from the above-described second node apparatus (i.e., one of the adjacent node apparatuses) after receiving a second pause frame from one of the adjacent node apparatuses.

In this case, the port selector 138 as the routing information updating means updates the state information as exemplified insteps S222 and S233. That is, the port selector 138 updates the state information associated by the routing information with the destination node apparatus so as to indicate that frame transmission from a third port which is connected to a pause requesting node apparatus being the source of the second pause frame is not feasible. In this embodiment, more specifically, the "P" state indicates that frame transmission is not feasible.

There is also a case where the port selector 138 as the transmitting means judges that there is no port from which transmission of the second frame is feasible, according to the state information associated by the routing information with the destination node apparatus. In this case, the second frame is returned to the second node apparatus by the port selector 138, the transmission frame controller 140, and the transmitting unit 141, which serve as the transmitting means.

Meanwhile, the broadcast management table 104 is a specific example of broadcast management information storage means. The broadcast management table 104 stores, in association with a MAC address being first broadcast source information for identifying the source of a first broadcast frame, time information that indicates a time at which the first broadcast frame is processed.

When the receiving unit 131 as the receiving means receives a second broadcast frame, the second broadcast frame is discarded as in step S211 if the following two conditions hold.

Second broadcast source information for identifying the source of the second broadcast frame is identical with the first broadcast source information.

The difference between the above-described time information and the current time is within a prescribed time period.

In this embodiment, the received frame controller 133 performs the discarding in step S211, while step S211 is a preprocessing of the transmitting processing in terms of relating to judgment of whether to transmit the received frame, for relaying it, from the node apparatus 100 itself or not. That is, the received frame controller 133 also functions as a part responsible for the preprocessing in the transmitting means.

Incidentally, in this embodiment, each branching step in the processing in FIGS. 11A to 11D is a simple judgment of whether the search result is a hit or a mishit, or of whether a prescribed field is set to a prescribed value or not. If the aging time period is 10 ms long, which is the same as the above-mentioned "prescribed time period", step S210 is also resolved into a simple judgment of whether the search result is a hit or a mishit. Accordingly, a switching device (i.e., a logical operation circuit, more specifically, the FPGA 113) is able to realize the branches in FIGS. 11A to 11D.

Due to independence of histories of various pieces of information, the process that the port selector 138 as the transmitting means selects the second port can be realized by a combinational logic circuit, more specifically, by the FPGA 113, which is an example of a programmable logic device. In general, an operation of an FPGA is programmable using a lookup table whose input is a first bit pattern and whose output is a second bit pattern. Accordingly, the FPGA 113 as the above-described transmitting means is programmable using a lookup table whose input and output are the following bit patterns.

The first bit pattern indicates which of a prescribed number of states constituted by one or more prescribed transmittable states and one or more prescribed non-transmittable states each of the plurality of ports is in. For instance, according to the processing logic in a case where no loop is detected, the "transmittable states" include the "E" and "U" states in the routing table 103, and the "non-transmittable states" include the "L", "D", and "P" states in the routing table 103.

The second bit pattern indicates port identification information for identifying each of the plurality of ports.

Likewise, as to the processing logic in a case where a loop is detected, it is sufficient to adopt, as the input, a bit pattern that indicates for each port whether it is in the transmittable state (the "E" state) or in the non-transmittable state (the "L", "U", "P", or "D" state) in the routing table 103.

Incidentally, this embodiment described with reference to FIGS. 1 to 20 has various advantages, which are thus described as follows.

A first advantage of this embodiment is that the time period required to switch a route in case of occurrence of a fault is short. Network faults in a broad sense include not only a physical break in a link but also a case where a certain node apparatus falls into the busy state and becomes substantially incapable of receiving frames.

Comparison with techniques other than this embodiment makes it clearer that the time period required to switch a route in case of occurrence of a fault is short in this embodiment. Accordingly, this embodiment will hereinafter be compared with some techniques.

When configuring a network, redundant lines and the like may be adopted so that the entire network system do not go down even if a fault, such as a failure in a communication node apparatus or a break in a link, occurs. For instance, STP (Spanning Tree Protocol), which is a protocol for preventing a loop and which operates on Layer 2 (i.e., the data link layer) of OSI (Open Systems Interconnection), is applied to a redundant network. OSPF (Open Shortest Path First), which is a routing protocol operating on Layer 3 (i.e., the network layer), is also applied to a redundant network. S-wire is also applicable to a redundant network in a mesh configuration.

STP, OSPF and S-wire realize a function of selecting a route in a network, and a function of recalculating and recovering the route in case of occurrence of a fault. Hereinafter, for the sake of facilitating understanding of advantages of this embodiment, STP, OSPF, and S-wire, which are to be compared, will be described in more detail.

In a redundant configuration which adopts frame switching in Layer 2, network lines are configured in a loop configuration (i.e., annularly).

If frames were not prevented from looping by STP, there would be a possibility that, in a network configured with switching apparatuses physically connected in a loop configuration, each and every piece of communication data, including a broadcast frame, would endlessly loop in the network. This is because the header of the frame on Layer 2 does not include a TTL field.

As a result, there would be a risk that the frame would endlessly loop, the load on the CPU (Central Processing Unit) in each switching apparatus would be caused to increase, and the CPU would run out of control at worst. There would also be a risk that the bandwidth of the network would be wasted by the frame continuing to loop, and as a result, the network would be caused to go down.

According to STP, in order to prevent the above-described dangerous frame circulation, control information referred to as BPDUs (Bridge Protocol Data Units) are exchanged between bridges, according to a given priority order. As a result, each bridge determines a port at which frames are blocked and a port from which frames are forwarded.

Each bridge appropriately sets a certain port to the blocking state, and discards frames received at the port in the blocking state. As a result, even in the network physically connected by cables in a loop configuration, a situation in which a frame continues to endlessly circulate in the loop is prevented.

Meanwhile, in OSPF, each router collects information from all the routers to know the current network topology. The collected information is stored in a database in each router. Each router refers to the database, creates an SPF (Shortest Path First) tree by using SPF algorithm, and creates a routing table from the SPF tree. According to OSPF, a routing loop hardly occurs because the routing table is created after the SPF tree is created.

Meanwhile, in the route creation algorithm according to S-wire (hereinafter, referred to as "S-wire algorithm"), each node apparatus includes a table for managing a weight for each port. The weight is based on the number of node apparatuses (i.e., the number of hops) through which data passes until it reaches a gateway as a goal of the frame forwarding. When forwarding a frame, each node apparatus determines the destination port according to the weight.

When communication fails because of a certain reason, such as a fault in another node apparatus or a break in a line, the node apparatus updates a weight corresponding to a port from which a frame has been transmitted for this failed communication, and retransmits the frame from another port. As a result, as a whole of the network, route finding and route learning are realized by distributed coordination among the node apparatuses.

Here, making comparison and discussion in terms of the time period required to switch a route in case of occurrence of a fault, it is indicated that this embodiment is superior to any of STP, OSPF, and S-wire.

According to STP, a bridge transitions among five states, which are "Disabled", "Blocking", "Listening", "Learning", and "Forwarding" states, when creating an alternative path (i.e., switching the path) in response to a fault. According to a default timer setting, the maximum time period spent in the "Blocking" state is 20 seconds long, each of the forward delays for the "Listening" and "Learning" states is 15 seconds long. Accordingly, in the default timer setting, a communication break for 50 (=20+15+15) seconds at the maximum occurs.

Although the detailed description is omitted, also in RSTP (Rapid Spanning Tree Protocol), which is an improved STP, path switching requires about one second.

Meanwhile, according to OSPF, there may be a case where a time period of tens of seconds is required from occurrence of a fault to recovery because it takes a certain time period to recalculate a routing table that a router includes therewithin. This is because OSPF uses a complicated algorithm (i.e., Dijkstra's algorithm) for calculating an optimum route and thus the CPU and memory resources of the router are significantly consumed.

Also in S-wire algorithm, it takes about one second to switch a route in response to a fault because it takes a certain time period to calculate the weights.

In a mission-critical environment, it is desirable to reduce the time period to switch a route in response to a fault as much as possible. In some applications of a network, even one second may be too long. However, arithmetic calculations, such as the route cost calculation in STP, the calculation according to Dijkstra's algorithm in OSPF, and the weight calculation in S-wire algorithm, apparently require a certain time period.

On the other hand, in this embodiment, no arithmetic calculation is required to update the routing table 103 and the loop detection table 105, as described above. This is because what are managed by the routing table 103 and the loop detection table 105 are not pieces of numeric data, such as the weight and distance, but are the states represented discretely.

The reason why practically sufficient performance is attained although the ports are managed using the states rather than the numeric data is that, in this embodiment, the adjacent nodes are connected to each other in a wired manner and thereby the communication quality is stable. That is, it is not necessary for this embodiment to consider variation in communication quality, while arithmetic operations for making the variation in communication quality reflected are typically performed for wireless communication, which significantly varies in communication quality, because it is preferable to select an appropriate route according to the variation in communication quality.

As described above, in this embodiment, arithmetic calculation is unnecessary to update the routing table 103 and the loop detection table 105. Accordingly, the routing engine 102 can easily be realized by a logical operation circuit (more specifically, e.g., the FPGA 113) performing on/off switching. Thus, the routing engine 102 in this embodiment, compared with that realized by software control by the MPU 114, operates at a higher speed.

Therefore, according to this embodiment, a time period required to switch a route upon occurrence of a fault, in terms of a time period taken to update the routing table 103 in a single certain node apparatus 100, is only several microseconds long.

It is a matter of course that there is a case where backtracking as exemplified in FIG. 2B occurs before a route is switched in the entire wired ad hoc network. In this case, a time period taken to return a frame from a node apparatus to another is not zero. However, in almost every case, the route is switched in the entire wired ad hoc network within a time period much shorter than one second. That is, unless the number of occurrences of backtracking is extraordinarily large, the route is switched within a time period much shorter than one second even from a viewpoint of the entire wired ad hoc network.

According to this embodiment, use of the loop detection table 105 enables each node apparatus 100 to detect a loop with no arithmetic operation and in a self-contained manner and to learn the destination port corresponding to the route where a loop occurs. The expression "in a self-contained manner" herein indicates that information pertaining to the network topology is not exchanged with other node apparatuses.

Thus, even though each node apparatus 100 behaves in a self-contained manner, the depth-first search by distributed coordination as illustrated in FIG. 2B is realized in the entire wired ad hoc network according to step S226 in FIG. 11D or step S238 in FIG. 11C. Then, a new route is found as a result of the depth-first search. In this embodiment, the time period taken to switch to the new route is much shorter than one second as described above.

The route is thus switched within the short time period even when a fault occurs. Therefore, the wired ad hoc network according to this embodiment is preferably applicable to a mission-critical network system. For instance, in a case of applying this embodiment to a sensor network adopting sensors that output data at a frequency of several to several tens of times per second, the probability that data is lost upon occurrence of a fault is low because route switching is completed within a time period much shorter than one second.

There is another advantage of this embodiment. More specifically, the advantage is that, according to this embodiment, a network administrator does not need to preliminarily design the topology of the wired ad hoc network or to set parameters and the like in the node apparatuses 100.

The efforts required for design and setting escalate as the number of node apparatuses included in a network increases. Accordingly, the ready availability without design and setting is a significantly preferable feature in an application field in which a large number of node apparatuses are included in a network, such as for instance a sensor network.

For instance, STP and RSTP are protocols designed so as to be operable without need of preliminary setting. However, there often are cases of requiring preliminary network design in practice. More specifically, it is practically required to design two node apparatuses, which are located in appropriate positions in the network and which have appropriate performance, to be a root bridge and a backup bridge for the root bridge, respectively. This is because, in a network of a certain large scale, the convergence time period taken to reconfigure paths upon a fault is long, and thereby there is a case where the network goes down as a result because data forwarding is not restarted until all the node apparatuses share the same information.

Meanwhile, OSPF requires network design to divide one network into a plurality of areas and to separate intra-area routing and inter-area routing from each other, and further requires work for setting the routers according to the network design.

One reason for requiring such network design is that, the larger the scale of the network is, the higher the probability that a fault or a change in network topology occurs is, and the more frequently recalculation of the SPF tree is required. Another reason is that, as the number of routers increases, the number of LSAs (Link-State Advertisements) exchanged between the routers to construct their databases increases.

Thus, when adopting OSPF, it is prevalent to divide a network into a plurality of areas to construct a network including multiple areas, thereby to divide a range in which an LSA reaches, thereby to confine a change in the network to an area, and thereby to increase the performance.

On the other hand, according to this embodiment, each table is automatically learned from its initial empty state by the node apparatus 100. That is, there is no need to preliminarily set parameters in the respective tables.

In addition, the various processes illustrated in FIGS. 11A to 20 are those realizable irrespective of which node apparatuses are connected to each other, and irrespective of which ports are connected to each other. That is, in this embodiment, only connecting a plurality of node apparatuses in a wired manner and in an arbitrary arrangement constructs a wired ad hoc network, thereby allows a frame to be relayed, while the route being appropriately selected by the distributed coordination.

As described above, according to this embodiment, only a time period much shorter than one second (e.g., several microseconds long) is taken for convergence in which a new route is selected. In other words, this embodiment does not require preliminary network design to keep the convergence time period within an extent that is not problematic in practice. Thus, this embodiment realizes appropriate performance and redundancy without bothersome design and setting operations.

Further, this embodiment also has an advantage that enables network resources to be fully utilized. This advantage is better understood when it is compared with STP and RSTP.

In STP and RSTP, a port connected to a redundant link is set to the blocking state (i.e., is set as a blocking port) in a normal situation in order to prevent a frame from endlessly looping in a network physically connected in a loop configuration. In other words, besides paths used in the normal situation, there are backup paths that are not used in the normal situation but are used only when a fault occurs. Accordingly, the network resources (i.e., the backup paths) are idle in the normal situation.

In contrast, according to this embodiment, the links in the wired ad hoc network are not distinguished between those for the normal situation and those for a situation in which a fault occurs. Accordingly, it is possible to fully utilize the network resources without leaving them idle.

The present invention is not limited to the above embodiment, but may be modified in various manners. Some of examples thereof will be described below.

In the above embodiment, the routing engine 102 is realized by the FPGA 113. However, the routing engine 102 may be realized by an ASIC (Application Specific Integrated Circuit). Instead, the routing engine 102 may be realized by the MPU 114 executing a firmware program. The firmware program may be stored in an arbitrary non-transitory computer-readable storage medium and provided.

In the above embodiment, various data examples are represented in a table format. The table format is exemplified as an example of a preferable data format that enables realization of high speed search using hardware, i.e., the CAM 115. In some embodiments, the node apparatus 100 may hold various pieces of data in a format other than the table format.

The table storage unit 135 in FIG. 6 may be realized by a combination of the CAM 115 and the SRAM 116 as described above, but may also be realized only by the CAM 115 or only by the SRAM 116. The table storage unit 135 can also be realized by a combination of any other one or more types of storage devices.

The format of the ad hoc frame 400 in FIG. 3 is an example. The order of the fields and the length of each field in the ad hoc header 410 are arbitrary according to embodiments. A specific value of the type 413, a method according to which the node apparatus 100 generates the value of the FID 414, an initial value of the TTL 415, and an algorithm for calculating the FCS 417 may arbitrarily be determined according to embodiments.

In FIG. 2A, for instance, the sensor 204 is illustrated outside the node apparatus 100e. However, in some embodiments, a sensor may be built into the node apparatus. For instance, the node apparatus may include a built-in sensor, in addition to pieces of hardware in FIG. 5.

In lieu of the general LAN port 106 in FIG. 5, the built-in sensor may output data (i.e., data of a result sensed by the built-in sensor) in the Ethernet frame format to the L2SW unit 112. Instead, the built-in sensor may output the sensed result data to the MPU 114, and the MPU 114 may generate an Ethernet frame 420 including the data of the result sensed by the built-in sensor and may output the Ethernet frame 420 to the FPGA 113.

In FIG. 2A, the sensor 204 is connected to the node apparatus 100e via the general LAN port 106e. However, the connection interface between the sensor 204 and the node apparatus 100e may be any interface other than the general LAN port 106e.

In the above embodiment, identity between broadcast frames is judged using the broadcast management table 104 in consideration of compatibility between the wired ad hoc network and an external network. However, in a wired ad hoc network that is not connected to an external network and that is used in an isolated manner, each node apparatus may not include the broadcast management table 104, and steps S210, S211, and S214 in FIG. 11B may be omitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. A first node apparatus in a network including a plurality of node apparatuses including the first node apparatus and a second node apparatus that are connected in a wired manner, the first node apparatus comprising:
a plurality of ports, each of which is a port to connect, in the wired manner, the first node apparatus to another different node apparatus other than the first node apparatus among the plurality of node apparatuses;
a storage device that stores:
loop detection information that associates, with first identification information for identifying a first frame, destination port distinguishing information for distinguishing, from among the plurality of ports, a first port that has been used as a destination port when the first node apparatus has transmitted the first frame, and
routing information that associates, with each of one or more of the plurality of node apparatuses, state information for indicating whether frame transmission from each of the plurality of ports is feasible or not;
a receiving circuit
that is connected to the plurality of ports, and
that receives a second frame from the second node apparatus, the second frame including second identification information for identifying the second frame;
an updating circuit that updates, when the second identification information is identical with the first identification information, the state information associated by the routing information with a destination node apparatus that is one of the plurality of node apparatuses and that is a destination of the second frame to make the updated state information indicate that frame transmission from the first port is not feasible; and
a transmitting circuit
that is connected to the plurality of ports,
that selects a second port from which transmission of the second frame is feasible from among the plurality of ports, according to the state information associated by the routing information with the destination node apparatus, and
that transmits the second frame from the second port.

2. The first node apparatus according to claim 1,
further comprising a link-down monitor that monitors whether each of the plurality of ports is in a link-down state or not,
wherein, when the receiving circuit receives the second frame, the updating circuit updates the state information associated by the routing information with the destination node apparatus to make the updated state information indicate that frame transmission from a port judged by the link-down monitor to be in the link-down state is not feasible.

3. The first node apparatus according to claim 1,
further comprising a load monitor that monitors a load on the first node apparatus, wherein
when the load exceeds a predetermined criterion,
the load monitor generates a first pause frame for requesting one or more adjacent node apparatuses connected to the first node apparatus in the wired manner among the plurality of node apparatuses to stop frame transmission to the first node apparatus, and
the transmitting circuit transmits the first pause frame to the one or more adjacent node apparatuses,
when the receiving circuit receives the second frame from the second node apparatus after receiving, from the one or more adjacent node apparatuses, a second pause frame for requesting to stop frame transmission, the updating circuit updates the state information associated by the routing information with the destination node apparatus to make the updated state information indicate that frame transmission from a third port which is one of the plurality of ports and which is connected to a pause requesting node apparatus being a source of the second pause frame is not feasible.

4. The first node apparatus according to claim 1, wherein the transmitting circuit returns the second frame to the second node apparatus when judging that there is no port from which transmission of the second frame is feasible among the plurality of ports according to the state information associated by the routing information with the destination node apparatus.

5. The first node apparatus according to claim 1,
wherein the storage device further stores
first broadcast source information for identifying a source of a first broadcast frame received by the receiving circuit, and
time information that indicates a time at which the first broadcast frame is processed,
wherein when the receiving circuit receives a second broadcast frame, the transmitting circuit discards the second broadcast frame if second broadcast source information for identifying a source of the second broadcast frame is identical with the first broadcast source information and if a difference between the time information and a current time is within a prescribed range.

6. The first node apparatus according to claim 1, wherein the first identification information includes:
first node-apparatus-identifying information for identifying a first source node apparatus that is one of the plurality of node apparatuses and that is a source of the first frame, and
first frame-identifying information for identifying each of a plurality of frames transmitted by the first source node apparatus serving as the source, and
the second identification information includes:
second node-apparatus-identifying information for identifying a second source node apparatus that is one of the plurality of node apparatuses and that is a source of the second frame, and
second frame-identifying information for identifying each of a plurality of frames transmitted by the second source node apparatus serving as the source.

7. The first node apparatus according to claim 1, wherein the state information is information that associates, with each of the plurality of ports,
one of one or more prescribed transmittable states which indicate that transmission is feasible, or
one of one or more prescribed non-transmittable states which indicate that transmission is not feasible,
the transmitting circuit includes a programmable logic device defined by a lookup table
whose input is a first bit pattern that indicates which of a prescribed number of states constituted by the one or more prescribed transmittable states and the one or more prescribed non-transmittable states each of the plurality of ports is in, and
whose output is a second bit pattern that indicates port identification information for identifying each of the plurality of ports, and
using the programmable logic device, the transmitting circuit determines the second port from the state information.

8. A method executed by a first node apparatus in a network including a plurality of node apparatuses including the first node apparatus and a second node apparatus that are connected in a wired manner, the method comprising:
transmitting a first frame from a first port among a plurality of ports that are included in the first node apparatus and that are configured to connect, in the wired manner, the first node apparatus to different node apparatuses other than the first node apparatus among the plurality of node apparatuses;
storing destination port distinguishing information for distinguishing the first port from among the plurality of ports, and first identification information for identifying the first frame;
receiving, at the first node apparatus from the second node apparatus, a second frame including second identification information for identifying the second frame;
updating state information associated by routing information with a destination node apparatus when the second identification information is identical with the first identification information, wherein
the state information indicates whether frame transmission from each of the plurality of ports of the first node apparatus is feasible or not,
the routing information associates the state information with each of one or more of the plurality of node apparatuses,
the destination node apparatus is one of the plurality of node apparatuses and is a destination of the second frame, and
the state information associated by the routing information with the destination node apparatus is updated by the updating to indicate that frame transmission from the first port is not feasible;
selecting a second port from which transmission of the second frame is feasible from among the plurality of ports of the first node apparatus, according to the state information associated by the routing information with the destination node apparatus; and
transmitting the second frame from the second port.

9. A computer-readable non-transitory storage medium storing a program that causes a computer to execute a process, the process comprising:
- transmitting a first frame from a first port among a plurality of ports, wherein
  - the plurality of ports are included in a first node apparatus controlled by the computer,
  - the first node apparatus is one of a plurality of node apparatuses including the first node apparatus and a second node apparatus that are connected in a wired manner, and
  - the plurality of ports are configured to connect, in the wired manner, the first node apparatus to different node apparatuses other than the first node apparatus among the plurality of node apparatuses;
- storing, in a storage device, destination port distinguishing information for distinguishing the first port from among the plurality of ports, and first identification information for identifying the first frame;
- receiving, at the first node apparatus from the second node apparatus, a second frame including second identification information for identifying the second frame;
- updating state information associated by routing information with a destination node apparatus when the second identification information is identical with the first identification information, wherein
  - the state information is stored in the storage device and indicates whether frame transmission from each of the plurality of ports of the first node apparatus is feasible or not,
  - the routing information associates the state information with each of one or more of the plurality of node apparatuses,
  - the destination node apparatus is one of the plurality of node apparatuses and is a destination of the second frame, and
  - the state information associated by the routing information with the destination node apparatus is updated by the updating to indicate that frame transmission from the first port is not feasible;
- selecting a second port from which transmission of the second frame is feasible from among the plurality of ports of the first node apparatus, according to the state information associated by the routing information with the destination node apparatus; and
- transmitting the second frame from the second port.

* * * * *